United States Patent
Yi et al.

(10) Patent No.: US 12,225,522 B2
(45) Date of Patent: Feb. 11, 2025

(54) PUSCH REPETITION VIA A PLURALITY OF TRPS

(71) Applicant: Ofinno, LLC, Reston, VA (US)

(72) Inventors: Yunjung Yi, Vienna, VA (US); Jonghyun Park, Vienna, VA (US); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 596 days.

(21) Appl. No.: 17/575,294

(22) Filed: Jan. 13, 2022

(65) Prior Publication Data
US 2022/0225362 A1 Jul. 14, 2022

Related U.S. Application Data

(60) Provisional application No. 63/136,985, filed on Jan. 13, 2021.

(51) Int. Cl.
*H04W 72/1268* (2023.01)
*H04L 5/00* (2006.01)
*H04W 72/23* (2023.01)

(52) U.S. Cl.
CPC ....... *H04W 72/1268* (2013.01); *H04L 5/0032* (2013.01); *H04W 72/23* (2023.01)

(58) Field of Classification Search
CPC .............................. H04W 72/12; H04W 72/23
USPC ......................................................... 370/329
See application file for complete search history.

(56) References Cited

PUBLICATIONS

3GPP TS 38.211 V16.3.0 (Sep. 2020); Technical Specification; 3rd Generation Partnership Project; Technical Specification Group Radio Access Network; NR; Physical channels and modulation; (Release 16).
3GPP TS 38.212 V16.3.0 (Sep. 2020); Technical Specification; 3rd Generation Partnership Project; Technical Specification Group Radio Access Network; NR; Multiplexing and channel coding; (Release 16).
3GPP TS 38.213 V16.3.0 (Sep. 2020); Technical Specification; 3rd Generation Partnership Project; Technical Specification Group Radio Access Network; NR; Physical layer procedures for control; (Release 16).
3GPP TS 38.214 V16.3.0 (Sep. 2020); Technical Specification; 3rd Generation Partnership Project; Technical Specification Group Radio Access Network; NR; Physical layer procedures for data; (Release 16).

(Continued)

*Primary Examiner* — Angel T Brockman
(74) *Attorney, Agent, or Firm* — Jacob L. Mangan; Kavon Nasabzadeh; Patrick Moon

(57) ABSTRACT

A method for a physical uplink shared channel (PUSCH) repetition via a plurality of transmission and reception points (TRPs) including receiving, by a wireless device, one or more configuration parameters indicating a time gap for switching between different spatial domain filters for uplink repetitions. The method may include receiving downlink control information (DCI) scheduling repetitions of a transport block. In an example, the DCI indicates a first spatial domain filter for a first repetition of the repetitions and a second spatial domain filter for a second repetition of the repetitions. The method may include transmitting, with the second spatial domain filter, the second repetition starting from a starting symbol determined based on a last symbol of the first repetition and the time gap.

20 Claims, 29 Drawing Sheets

(56) References Cited

PUBLICATIONS

3GPP TS 38.300 V16.3.0 (Sep. 2020); Technical Specification; 3rd Generation Partnership Project; Technical Specification Group Radio Access Network; NR; NR and NG-RAN Overall Description; Stage 2; (Release 16).
3GPP TS 38.321 V16.2.1 (Sep. 2020); Technical Specification; 3rd Generation Partnership Project; Technical Specification Group Radio Access Network; NR; Medium Access Control (MAC) protocol specification; (Release 16).
3GPP TS 38.331 V16.2.0 (Sep. 2020); Technical Specification; 3rd Generation Partnership Project; Technical Specification Group Radio Access Network; NR; Radio Resource Control (RRC) protocol specification; (Release 16).
R1-2007540; 3GPP TSG RAN WG1 #103-e; e-Meeting, Oct. 26-Nov. 13, 2020; Agenda Item: 8.1.2.1; Source: FUTUREWEI; Title: Multi-TRP/panel for non-PDSCH; Document for: Discussion/Decision.
R1-2007587; 3GPP TSG RAN WG1 Meeting #103-e; E-meeting, Oct. 26-Nov. 13, 2020; Agenda Item: 3.1.2.1; Source: Huawei, HiSilicon; Title: Enhancements on multi-TRP for reliability and robustness in Rel-17; Document for: Discussion and Decision.
R1-2007627; 3GPP TSG RAN WG1 #103-e; e-Meeting, Oct. 26-Nov. 13, 2020; Agenda Item: 8.1.2.1; Source: InterDigital, Inc.; Title: Reliability Enhancements for PDCCH, PUCCH, and PUSCH; Document for: Discussion and Decision.
R1-2007645; 3GPP TSG RAN WG1 #103-e; e-Meeting, Oct. 26-Nov. 13, 2020; Source: vivo; Title: Further discussion on enhancement of MTRP operation; Agenda Item: 8.1.2.1; Document for: Discussion and Decision.
R1-2007764; 3GPP TSG RAN WG1 Meeting #103-e; e-Meeting, Oct. 26-Nov. 13, 2020; Source: ZTE; Title: Multi-TRP enhancements for PDCCH, PUCCH and PUSCH; Agenda Item: 8.1.2.1; Document for: Discussion and Decision.
R1-2007783; 3GPP TSG RAN WG1 #103-e; e-Meeting, Oct. 26-Nov. 13, 2020; Agenda Item: 8.1.2.1; Source: Fujitsu; Title: Enhancements on Multi-TRP for PDCCH, PUCCH and PUSCH; Document for: Discussion.
R1-2007825; 3GPP TSG RAN WG1 Meeting #103-e; e-Meeting, Oct. 26-Nov. 13, 2020; Source: CATT; Title: Discussion on enhancements on multi-TRP/panel for PDCCH, PUCCH and PUSCH; Agenda Item: 8.1.2.1; Document for: Discussion and Decision.
R1-2008001; 3GPP TSG RAN WG1 #103-e; e-Meeting, Oct. 26-Nov. 13, 2020; Agenda item: 8.1.2.1; Title: Enhancements on Multi-TRP for PDCCH, PUCCH and PUSCH; Source: CMCC; Document for: Discussion and Decision.
R1-2008218; 3GPP TSG RAN WG1 #103-e; e-Meeting, Oct. 26-Nov. 13, 2020; Source: OPPO; Title: Enhancements on multi-TRP for PDCCH, PUCCH and PUSCH; Agenda Item: 8.1.2.1; Document for: Discussion and Decision.
R1-2008347; 3GPP TSG RAN WG1 Meeting #103-e; e-Meeting, Oct. 26-Nov. 28, 2020; Agenda Item: 8.1.2.1; Source: Sony; Title: Considerations on Multi-TRP for PDCCH, PUCCH, PUSCH; Document for: Discussion and Decision.
R1-2008439; 3GPP TSG-RAN WG1 Meeting #103-e; e-Meeting, Oct. 26-Nov. 13, 2020; Agenda Item: 3.1.2.1; Source: Apple Inc.; Title: On Multi-TRP Reliability Enhancement; Document for: Discussion/Decision.
R1-2008898; 3GPP TSG RAN WG1 Meeting #103-e; E-meeting, Nov. 2-13, 2020; Agenda Item: 8.1.2.1—Enhancements on Multi-TRP for PDCCH, PUCCH and PUSCH; Source: Fraunhofer IIS, Fraunhofer HHI; Title: On multi-TRP enhancements for PDCCH and PUSCH; Document for: Decision.
R1-2008904_M-TRP_URLLC; 3GPP TSG RAN WG1 #103 Meeting; e-Meeting, Oct. 26-Nov. 13, 2020; Agenda item: 8.1.2.1; Source: Nokia, Nokia Shanghai Bell; Title: Enhancements for Multi-TRP URLLC schemes; Document for: Discussion and Decision.
R1-2008911; 3GPP TSG RAN WG1 #103-e; e-Meeting, Oct. 26-Nov. 13, 2020; Agenda Item: 8.1.2.1; Source: Lenovo, Motorola Mobility; Title: Enhancements on Multi-TRP for PDCCH, PUCCH and PUSCH; Document for: Discussion.
R1-2008958; 3GPP TSG RAN WG1 #103-e; e-Meeting, Oct. 26-Nov. 13, 2020; Agenda Item: 8.1.2.1; Source: MediaTek Inc.; Title: Enhancements on Multi-TRP for PDCCH, PUSCH and PUCCH; Document for: Discussion & Decision.
R1-2008978; 3GPP TSG RAN WG1 #103-e; e-Meeting, Oct. 26-Nov. 13, 2020; Agenda Item: 8.1.2.1; Source: Intel Corporation; Title: Multi-TRP enhancements for PDCCH, PUCCH and PUSCH; Document for: Discussion/Decision.
R1-2009028; 3GPP TSG RAN WG1 #103-e; e-Meeting, Oct. 26-Nov. 13, 2020; Agenda Item: 8.1.2.1; Source: Xiaomi; Title: Enhancements on Multi-TRP for PDCCH, PUCCH and PUSCH; Document for: Discussion and Decision.
R1-2009054; 3GPP TSG-RAN WG1 #103-e; e-Meeting, Oct. 26-Nov. 13, 2020; Source: Asia Pacific Telecom; Title: Discussion on enhancements on multi-TRP for uplink channels; Agenda item: 8.1.2.1; Document for: Discussion and Decision.
R1-2009130; 3GPP TSG RAN WG1 #103-e; e-Meeting, Oct. 26-Nov. 13, 2020; Source: Sharp; Title: Enhancements on multi-TRP for PUSCH; Agenda Item: 8.1.2.1; Document for: Discussion and Decision.
R1-2009142; 3GPP TSG RAN WG1 #103-e; e-Meeting, Oct. 26-Nov. 13, 2020; Agenda Item: 8.1.2.1; Source: Spreadtrum Communications; Title: Discussion on enhancements on Multi-TRP for PDCCH, PUCCH and PUSCH; Document for: Discussion and decision.
R1-2009159; 3GPP TSG-RAN WG1#103-e; e-Meeting, Oct. 26-Nov. 13, 2020; Agenda item: 8.1.2.1; Title: Multi-TRP Enhancements for PDCCH, PUCCH and PUSCH; Source: Convida Wireless; Document for: Discussion.
R1-2009175; 3GPP TSG RAN WG1 #103-e; e-Meeting, Oct. 26-Nov. 13, 2020; Source: NTT DOCOMO, Inc; Title: Discussion on MTRP for reliability; Agenda Item: 8.1.2.1; Document for: Discussion and Decision.
R1-2009223; 3GPP TSG-RAN WG1 Meeting #103; eMeeting, Oct. 26-Nov. 13, 2020; Agenda Item: 8.1.2.1; Source: Ericsson; Title: On PDCCH, PUCCH and PUSCH enhancements with multiple TRPs; Document for: Discussion.
R1-2009251; 3GPP TSG-RAN WG1 Meeting #103-e; e-Meeting, Oct. 26-Nov. 13, 2020; Agenda item: 8.1.2.1; Source: Qualcomm Incorporated; Title: Enhancements on Multi-TRP for PDCCH, PUCCH and PUSCH; Document for: Discussion/Decision.
R1-2009480; 3GPP TSG RAN WG1 #103; e-Meeting, Oct. 26-Nov. 13, 2020; Agenda item: 8.1.2.1; Source: Moderator (Nokia, Nokia Shanghai Bell); Title: Summary of Multi-TRP URLLC for PUCCH and PUSCH; Document for: Discussion and Decision.
R1-2009683; 3GPP TSG RAN WG1 Meeting #103-e; e-Meeting, Oct. 26-Nov. 13, 2020; Agenda item: 8.1.2.1; Source: Moderator (Qualcomm); Title: Summary of email discussions [103-e-NR-feMIMO-02] for mTRP PDCCH enhancements; Document for: Discussion/Decision.
R1-2009757; 3GPP TSG RAN WG1 #103; e-Meeting, Oct. 26-Nov. 13, 2020; Agenda item: 8.1.2.1; Source: Moderator (Nokia, Nokia Shanghai Bell); Title: Summary of Multi-TRP URLLC for PUCCH and PUSCH; Document for: Discussion and Decision.
R1-2009807; 3GPP TSG RAN WG1 Meeting #103-e; e-Meeting, Oct. 26-Nov. 13, 2020; Title: LS on Beam switching gaps for Multi-TRP UL transmission; Response to:; Release: Rel-17; Work Item: NR_feMIMO-Core.

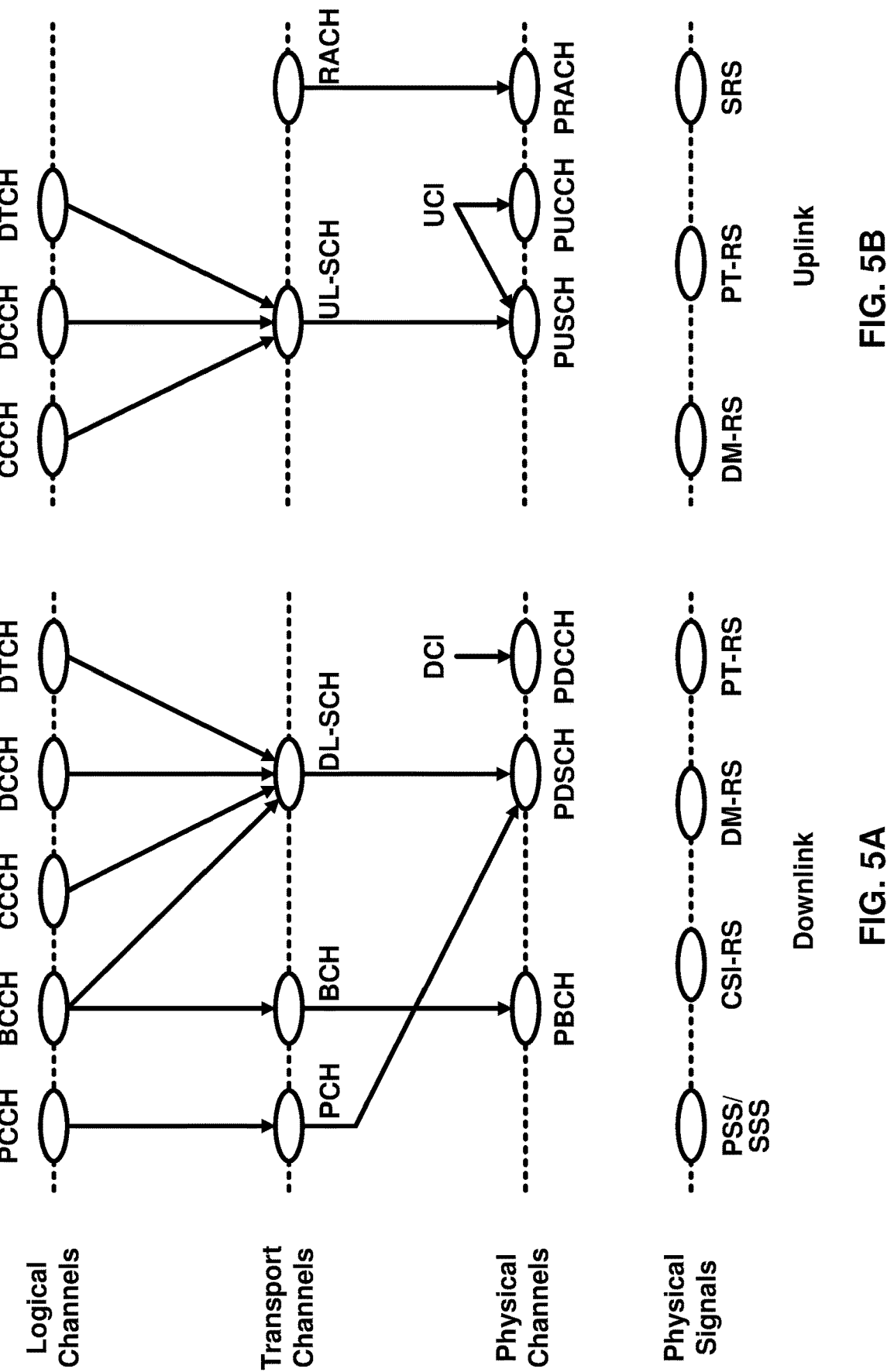

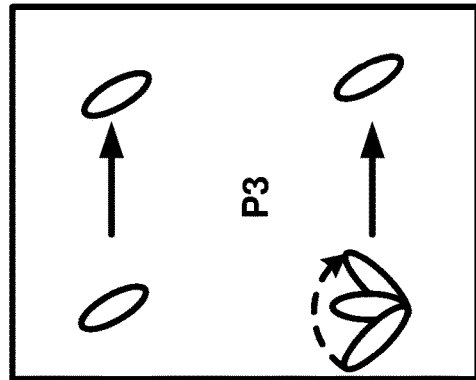
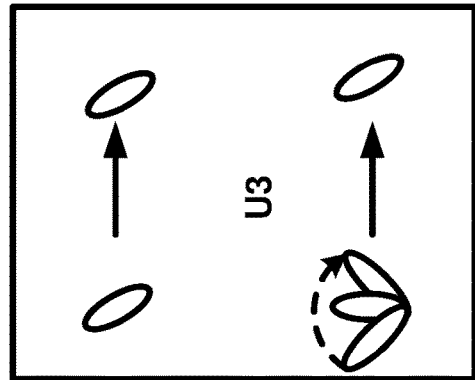
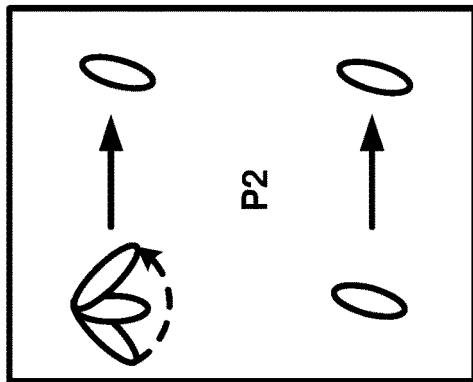
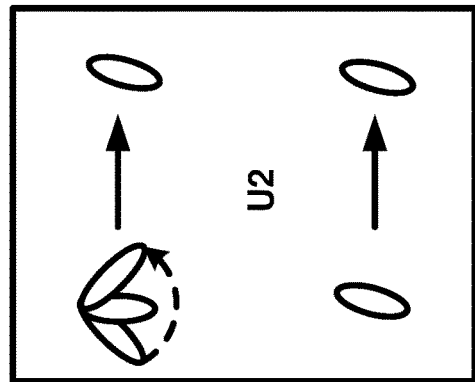
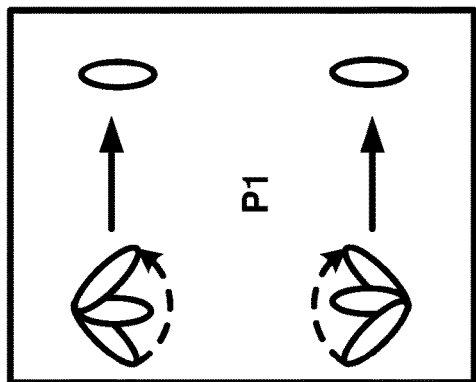
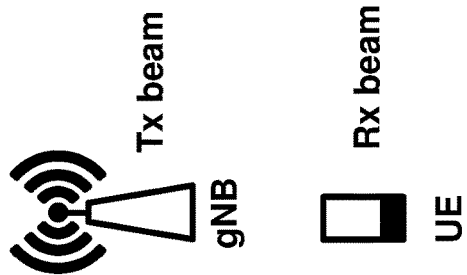
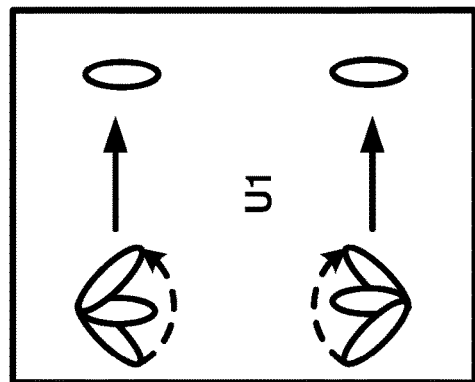
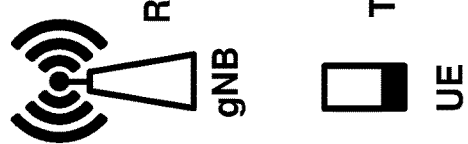
FIG. 12A
FIG. 12B

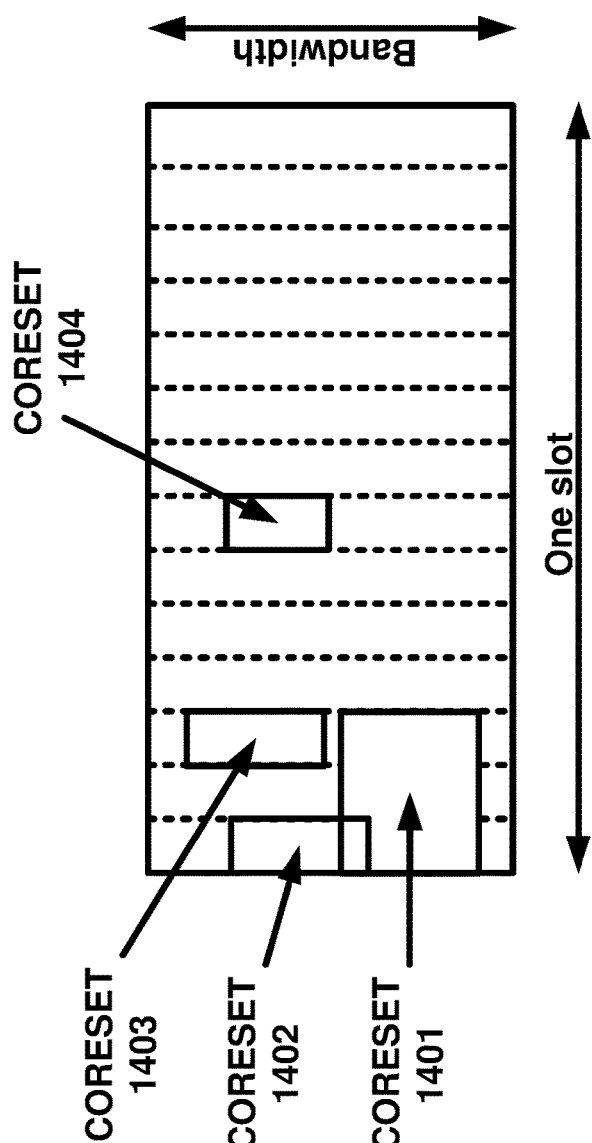
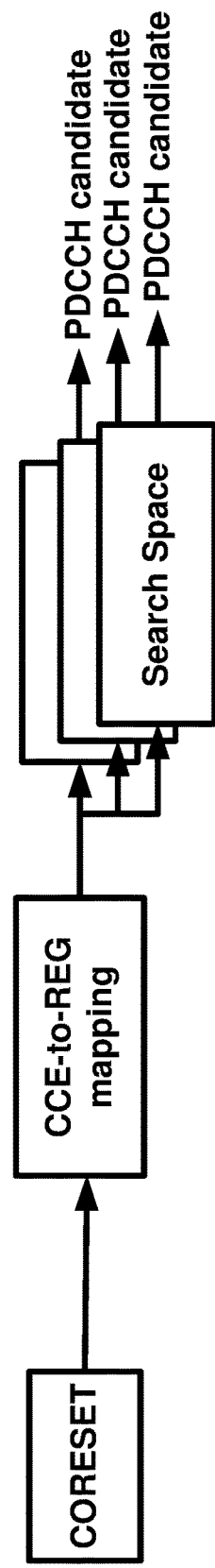
FIG. 14A
FIG. 14B

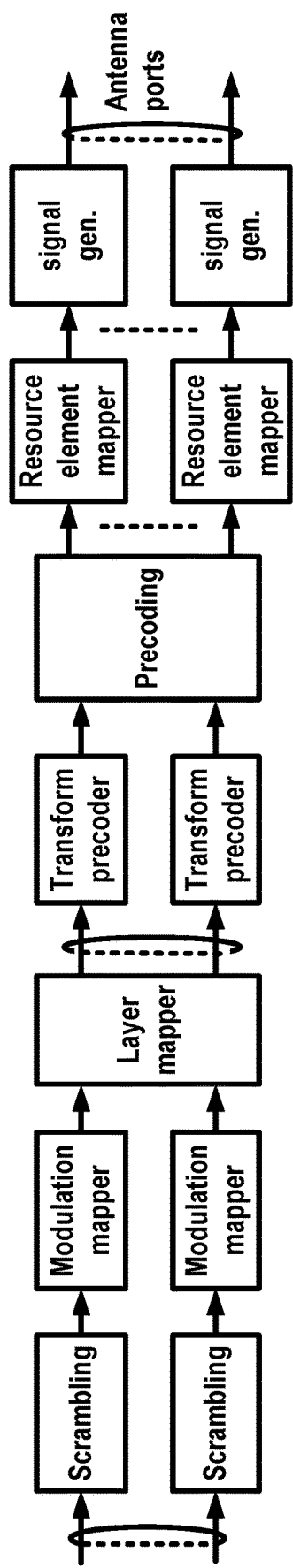
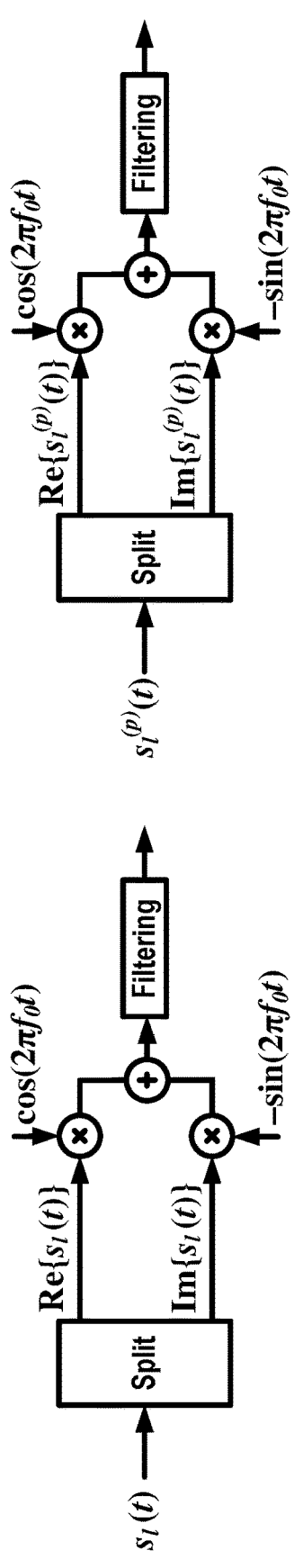
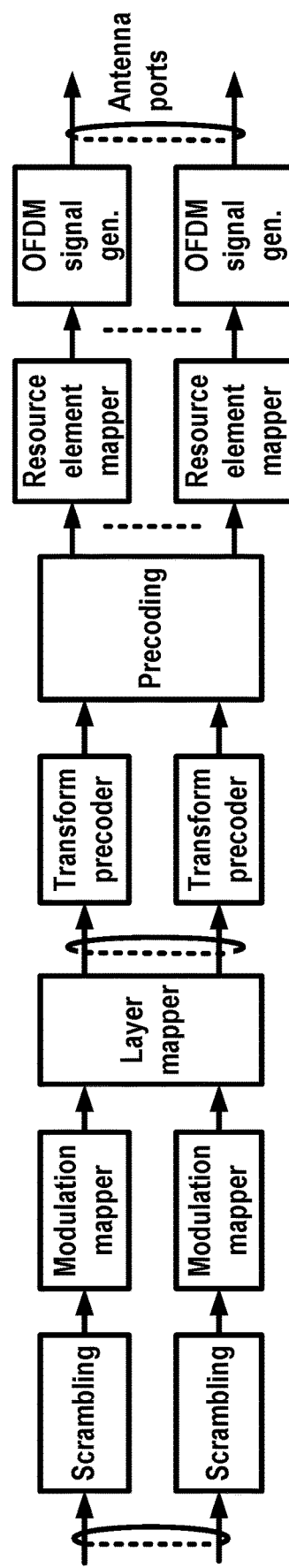
FIG. 16A
FIG. 16B
FIG. 16C
FIG. 16D

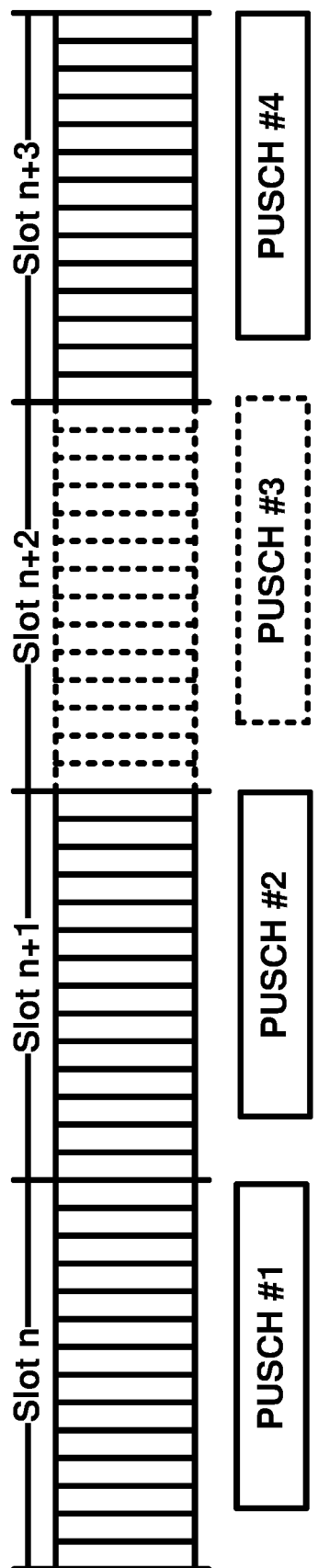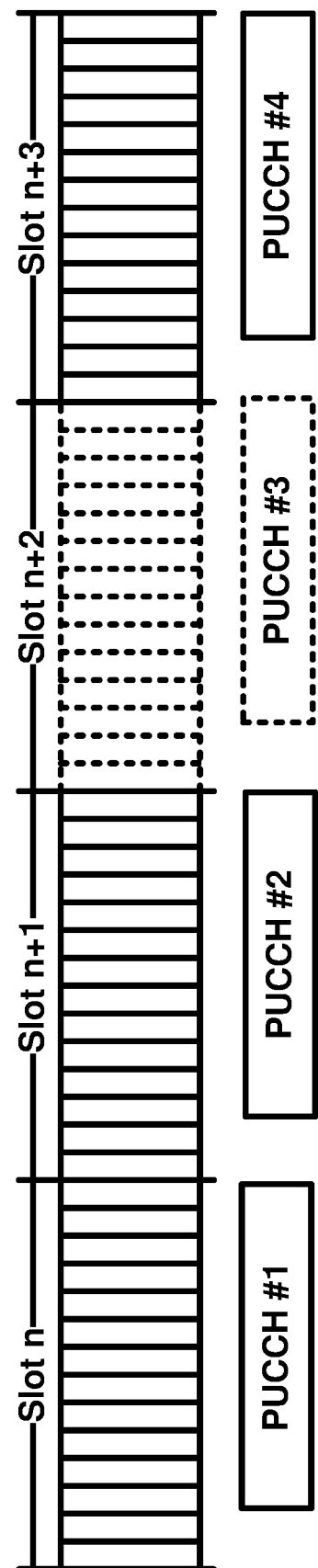
FIG. 21A
FIG. 21B

PUSCH REPETITION VIA A PLURALITY OF TRPS

CROSS-REFERENCE TO RELATED APPLICATIONS

This application claims the benefit of U.S. Provisional Application No. 63/136,985, filed Jan. 13, 2019, which is hereby incorporated by reference in its entirety.

BRIEF DESCRIPTION OF THE DRAWINGS

Examples of several of the various embodiments of the present disclosure are described herein with reference to the drawings.

FIG. 5A and FIG. 5B respectively illustrate a mapping between logical channels, transport channels, and physical channels for the downlink and uplink.

FIG. 12A and FIG. 12B respectively illustrate examples of three downlink and uplink beam management procedures.

FIG. 14A illustrates an example of CORESET configurations for a bandwidth part.

FIG. 14B illustrates an example of a CCE-to-REG mapping for DCI transmission on a CORESET and PDCCH processing.

FIG. 16A, FIG. 16B, FIG. 16C, and FIG. 16D illustrate example structures for uplink and downlink transmission.

FIG. 21A illustrates TypeA repetition for an uplink transmission as per an aspect of an example embodiment of the present disclosure.

FIG. 21B illustrates TypeA repetition for an uplink transmission as per an aspect of an example embodiment of the present disclosure.

DETAILED DESCRIPTION

Figure 1A:
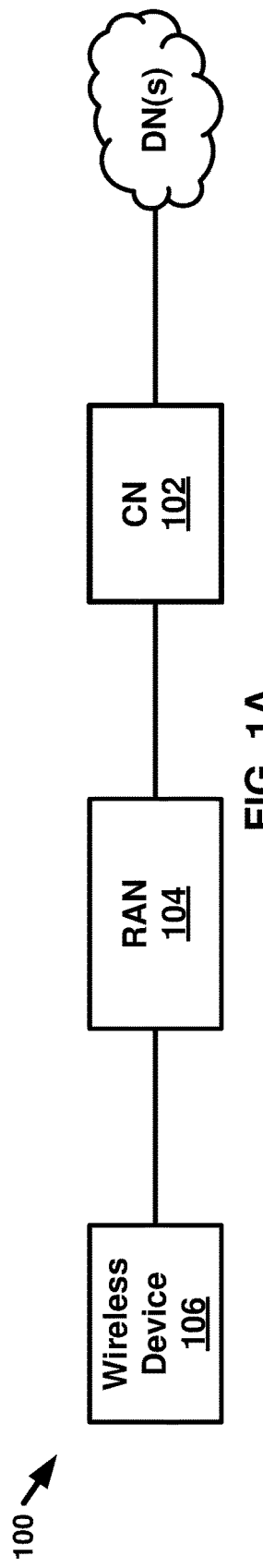
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
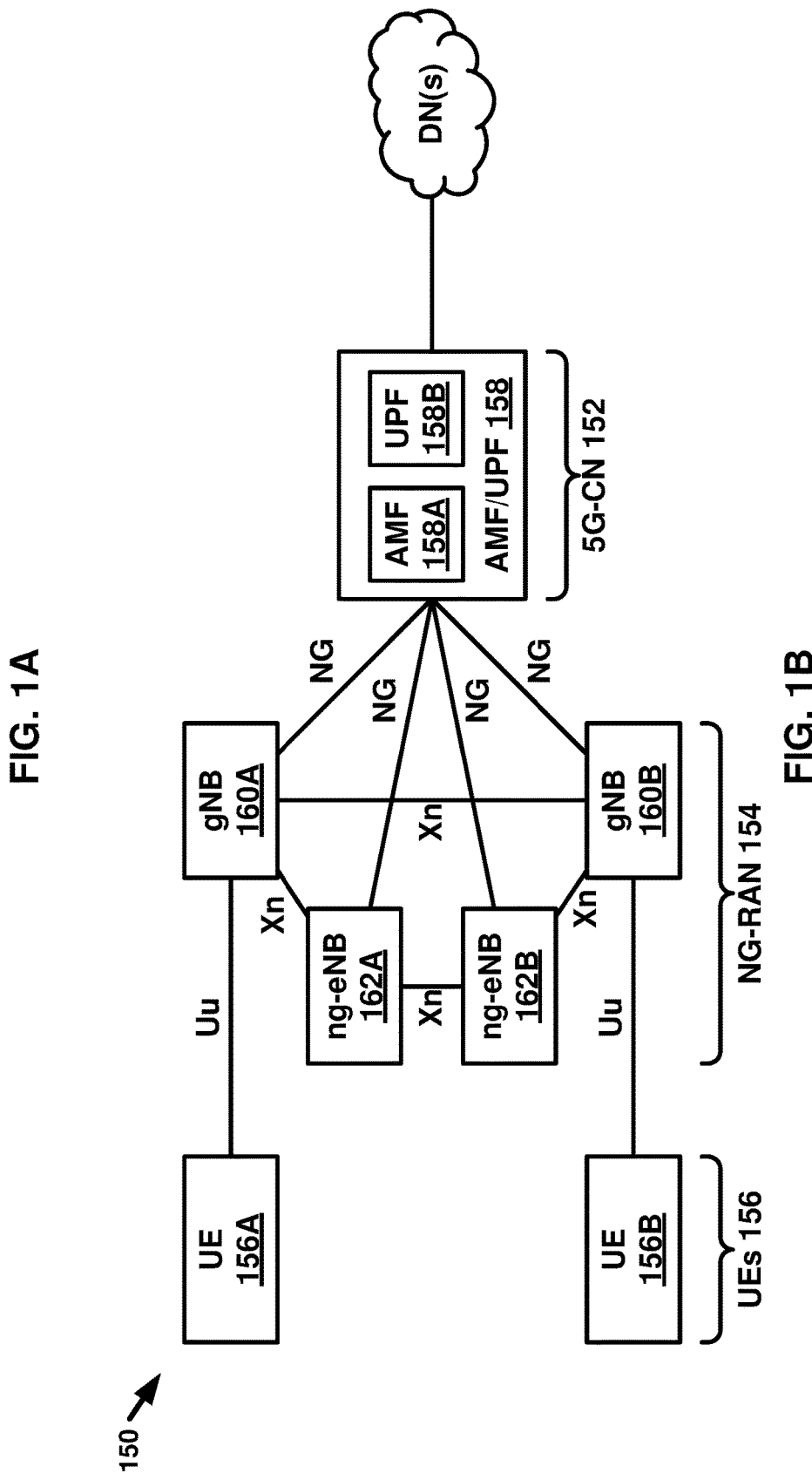

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
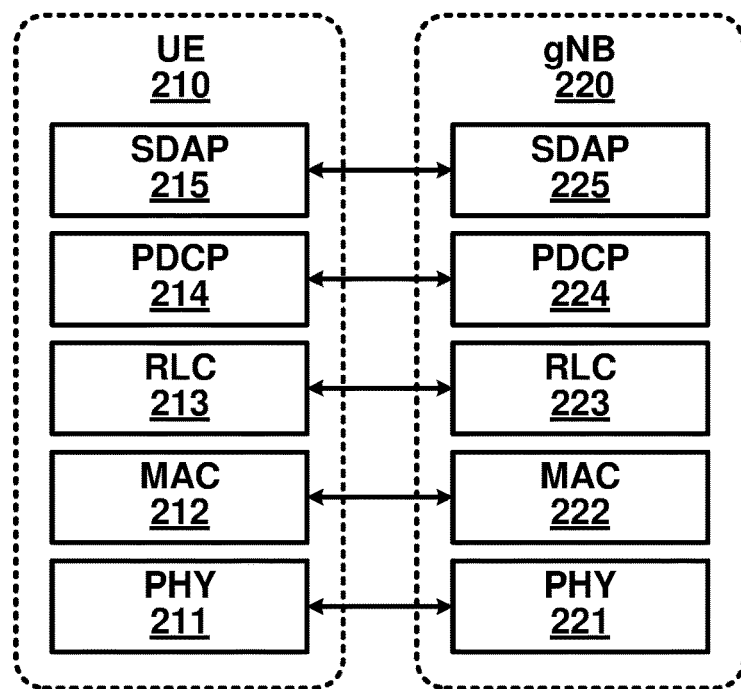
FIG. 2A and FIG. 2B respectively illustrate a New Radio (NR) user plane and control plane protocol stack.
Figure 2B:
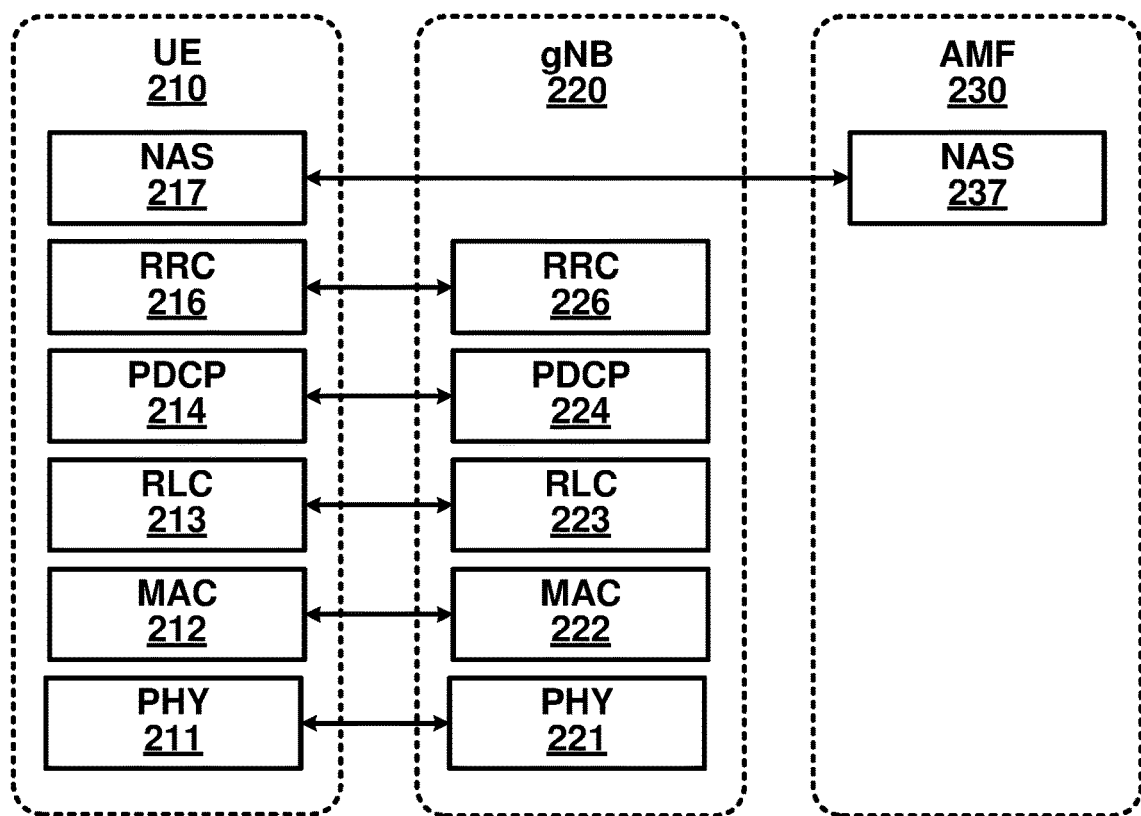

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
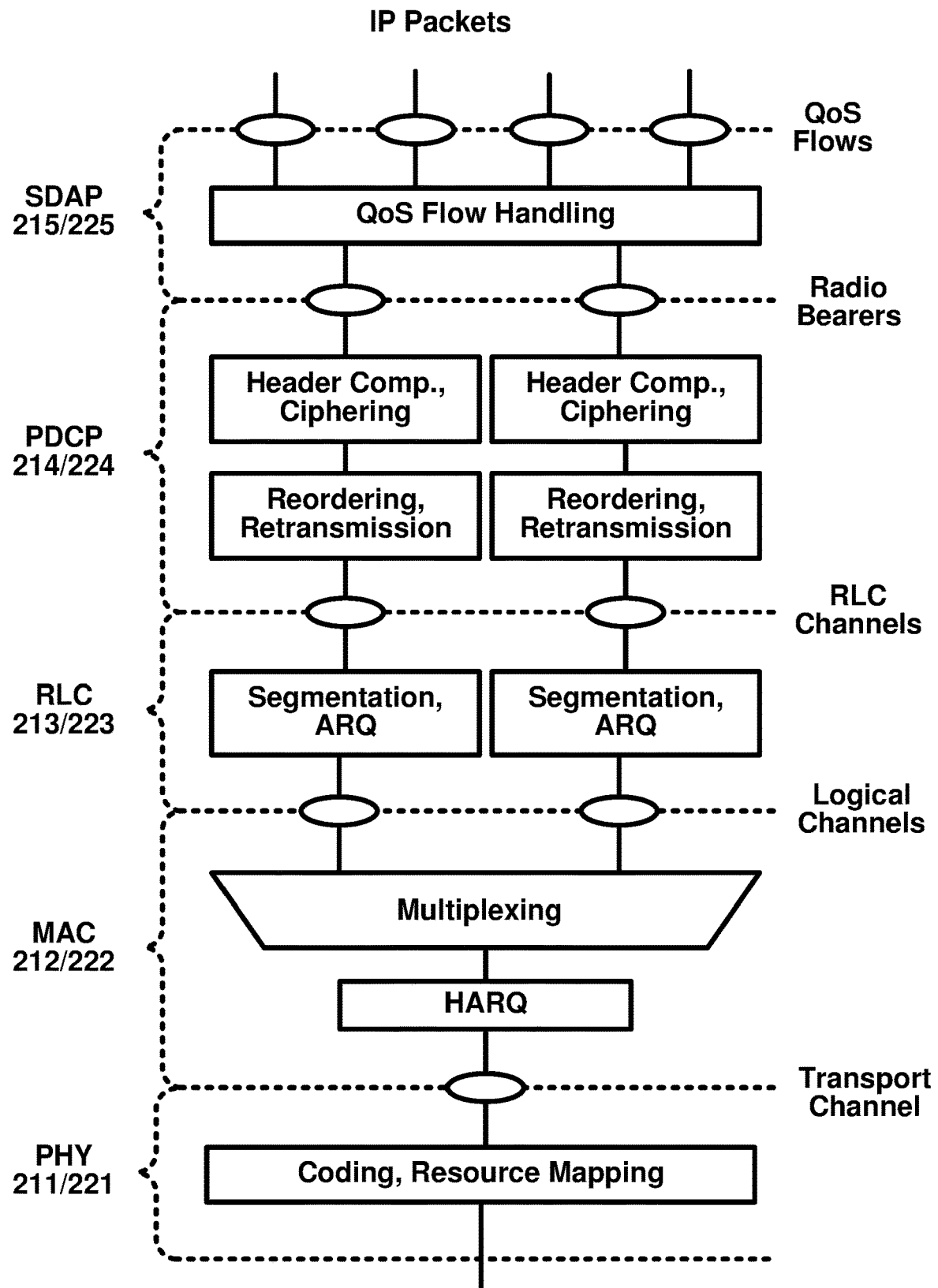
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
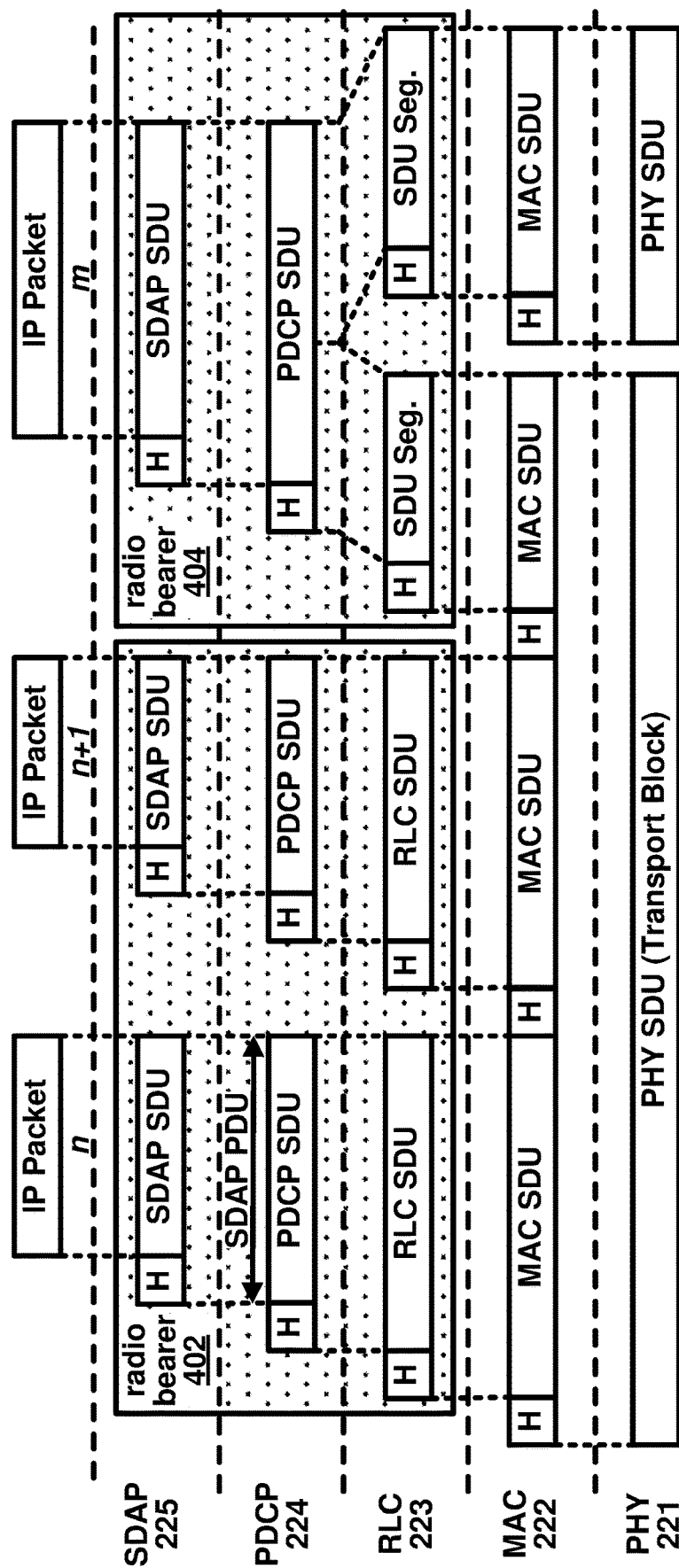
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
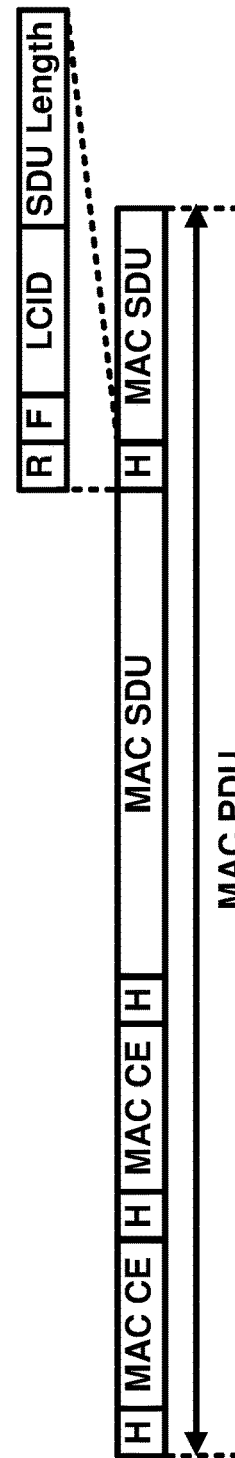
FIG. 4B illustrates an example format of a MAC sub-header in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As defined in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
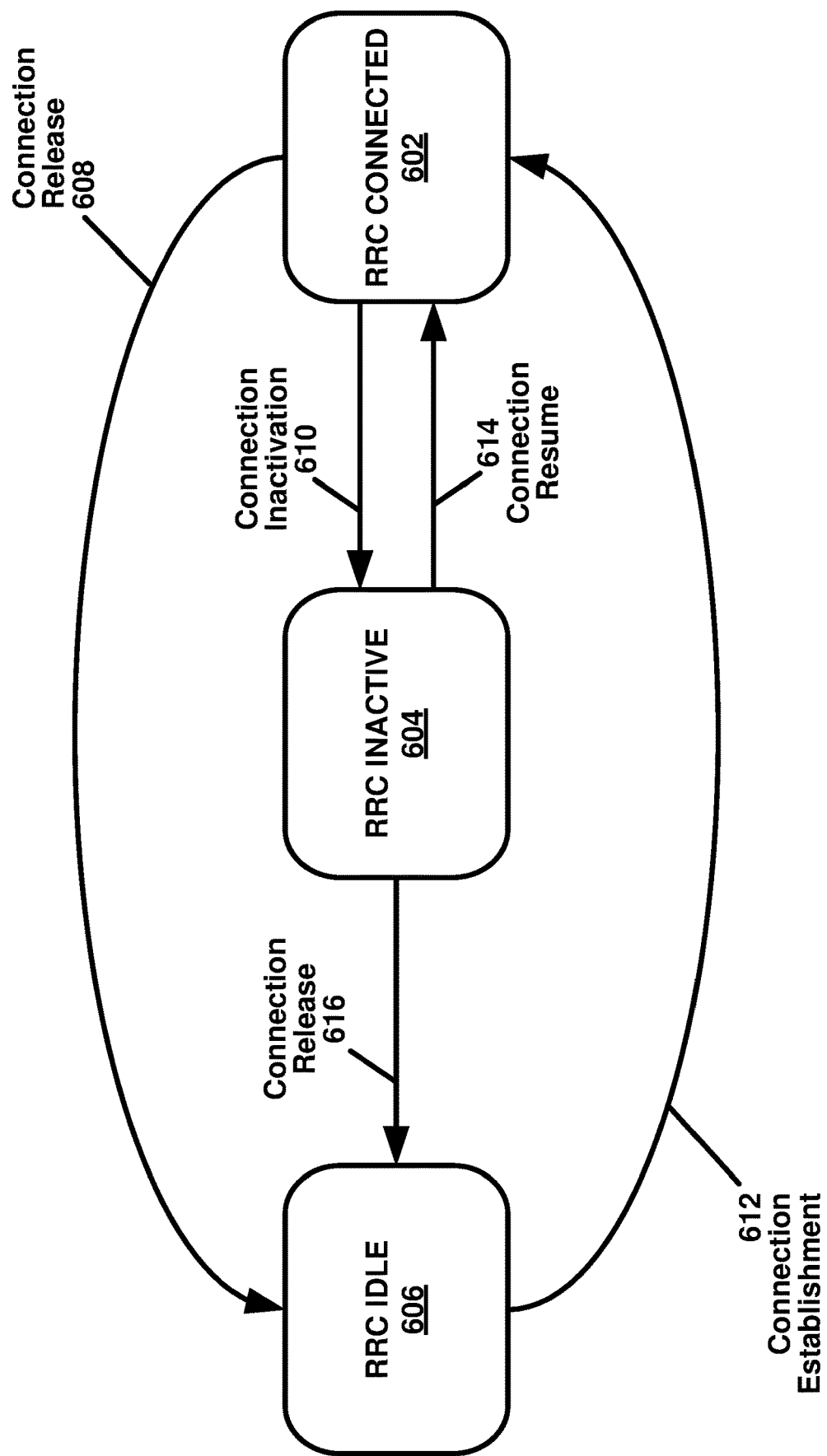
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
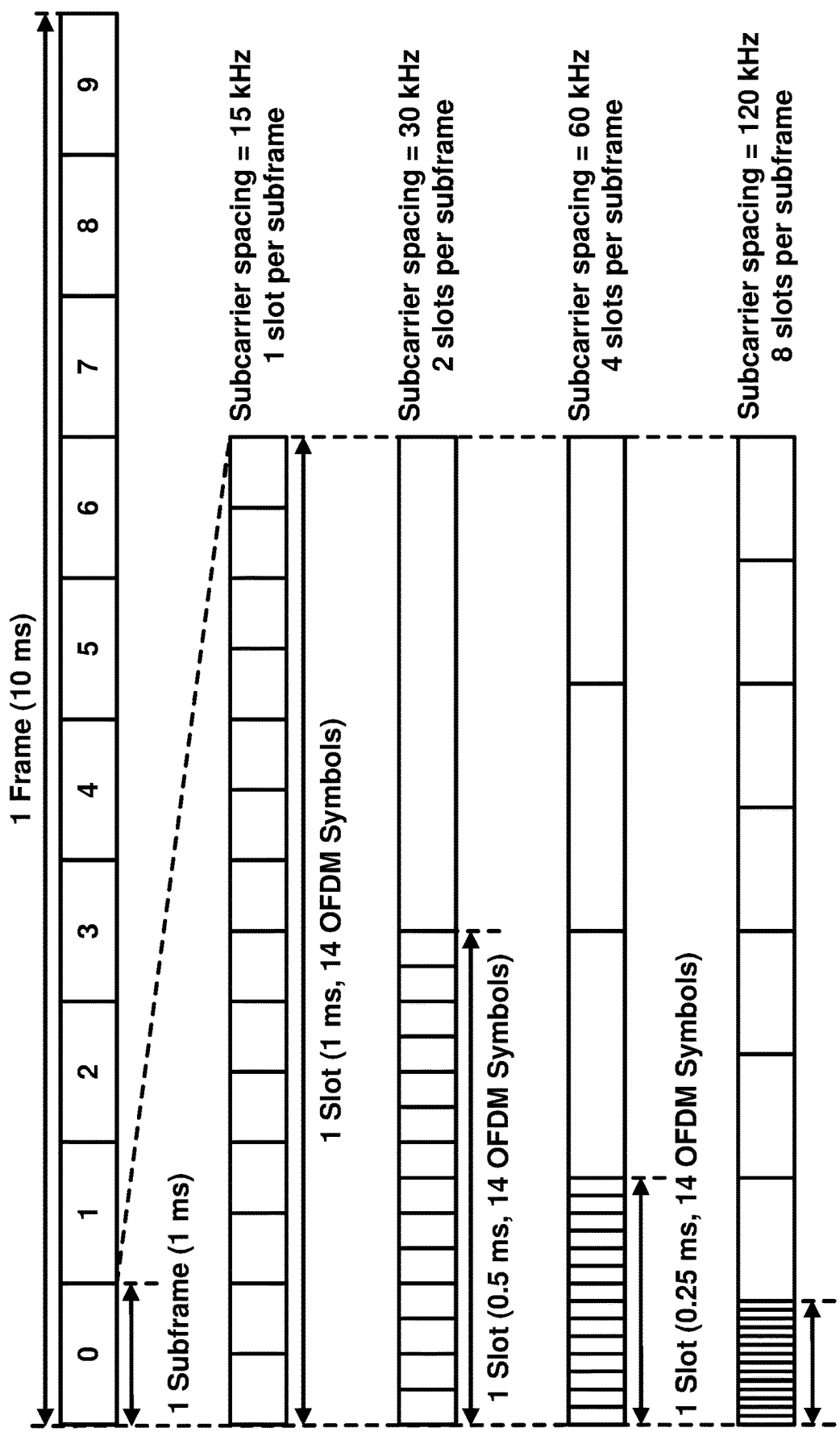
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
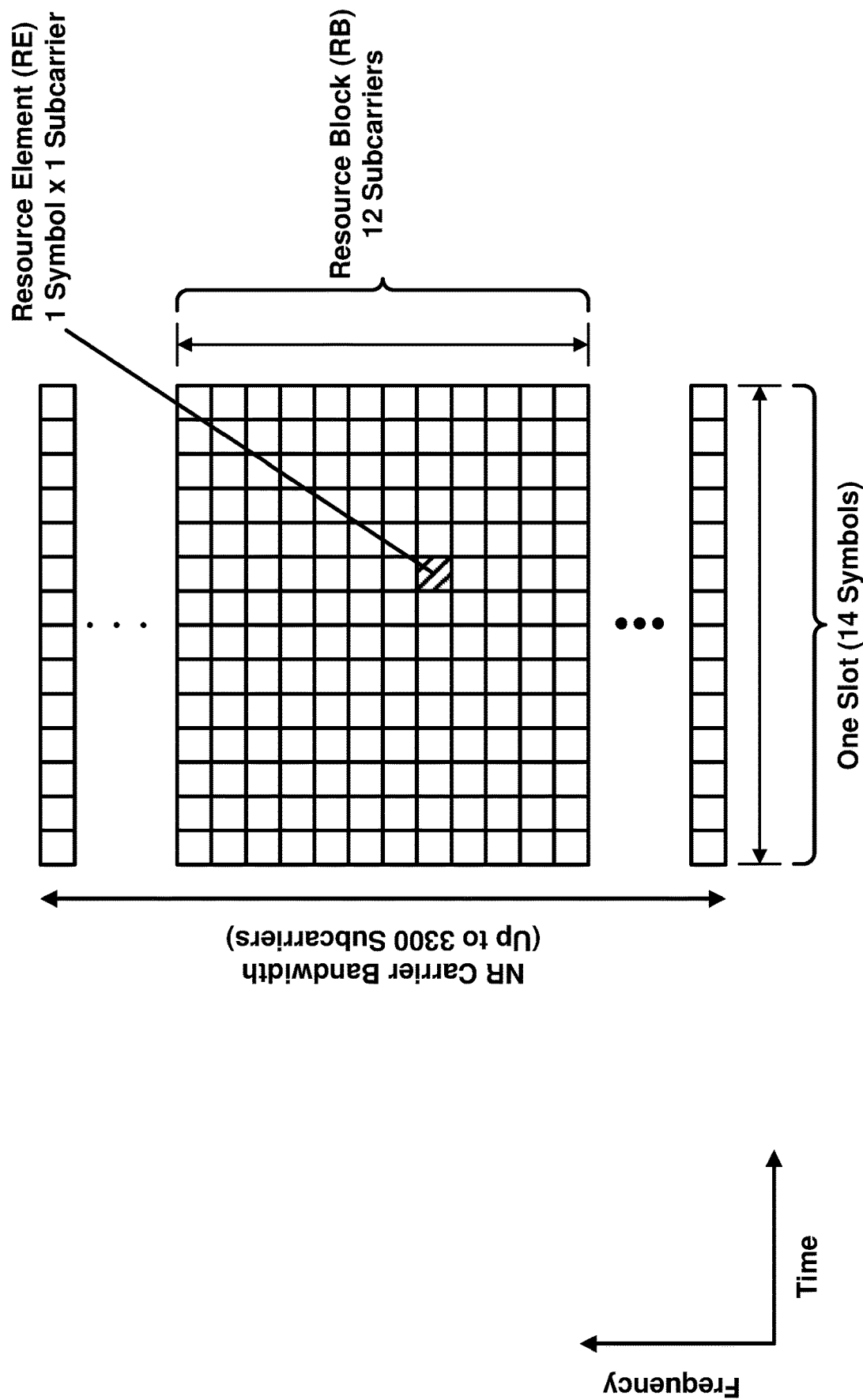
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
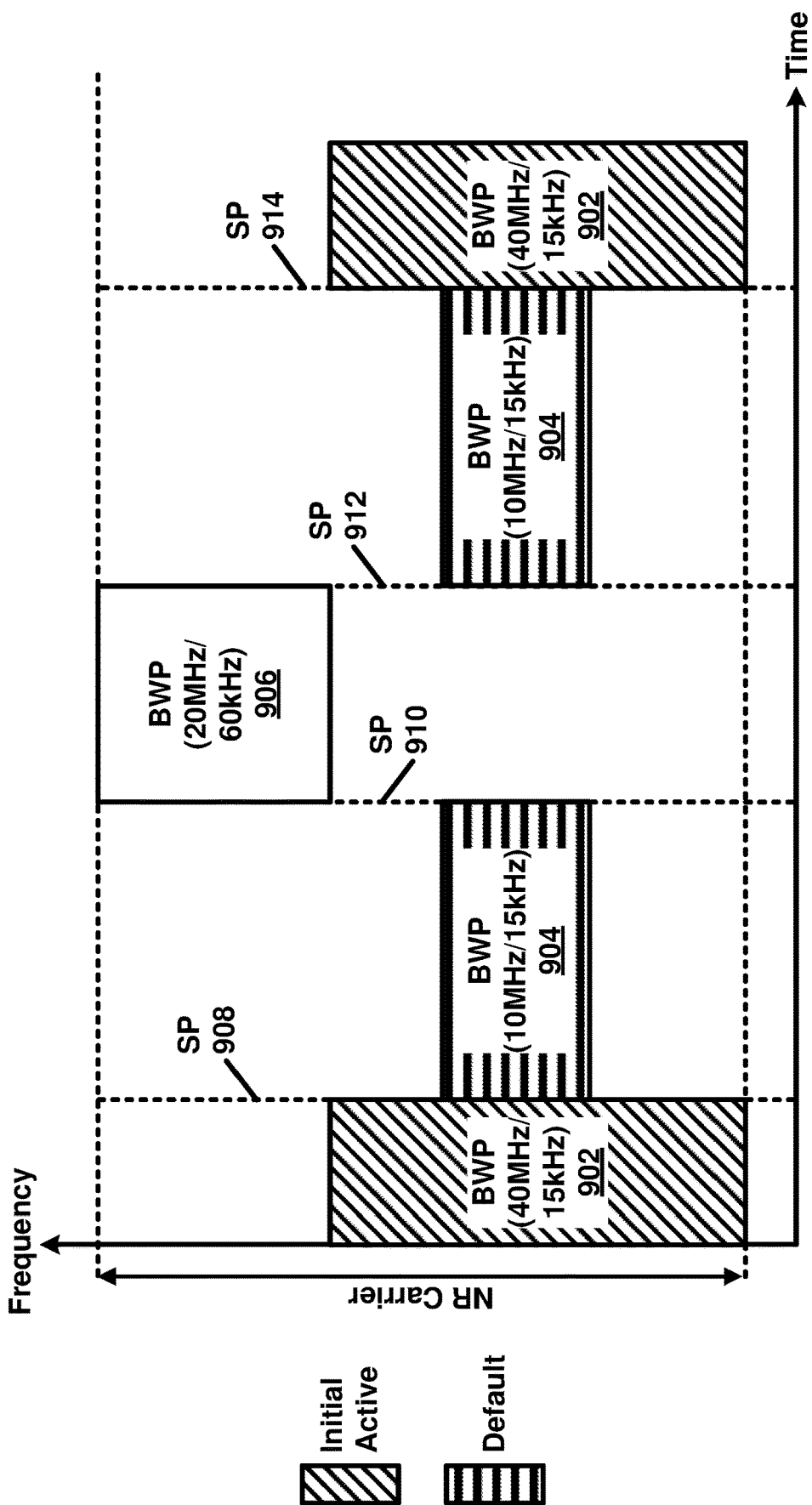
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
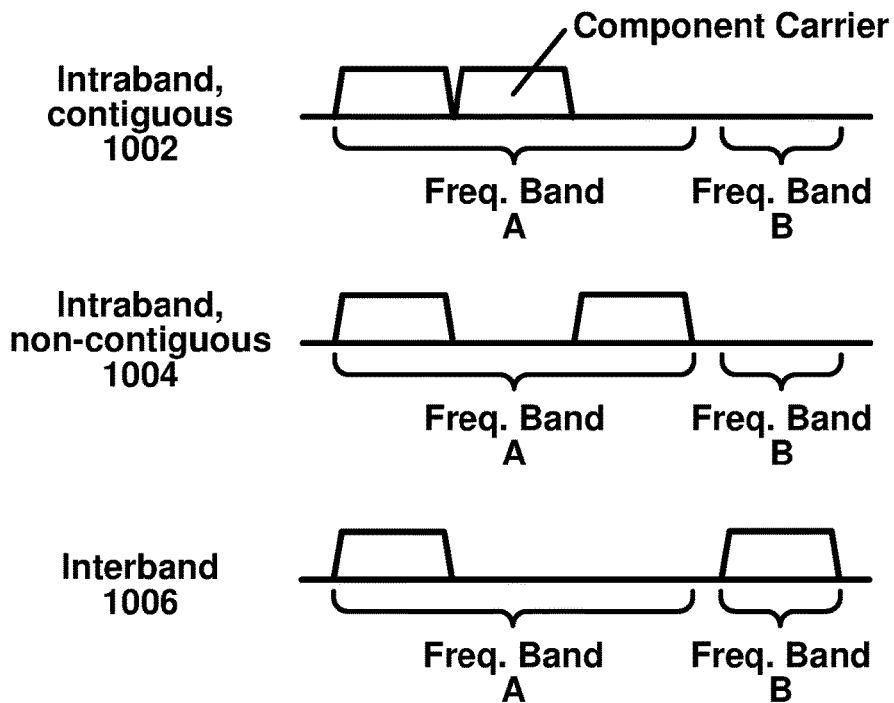
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
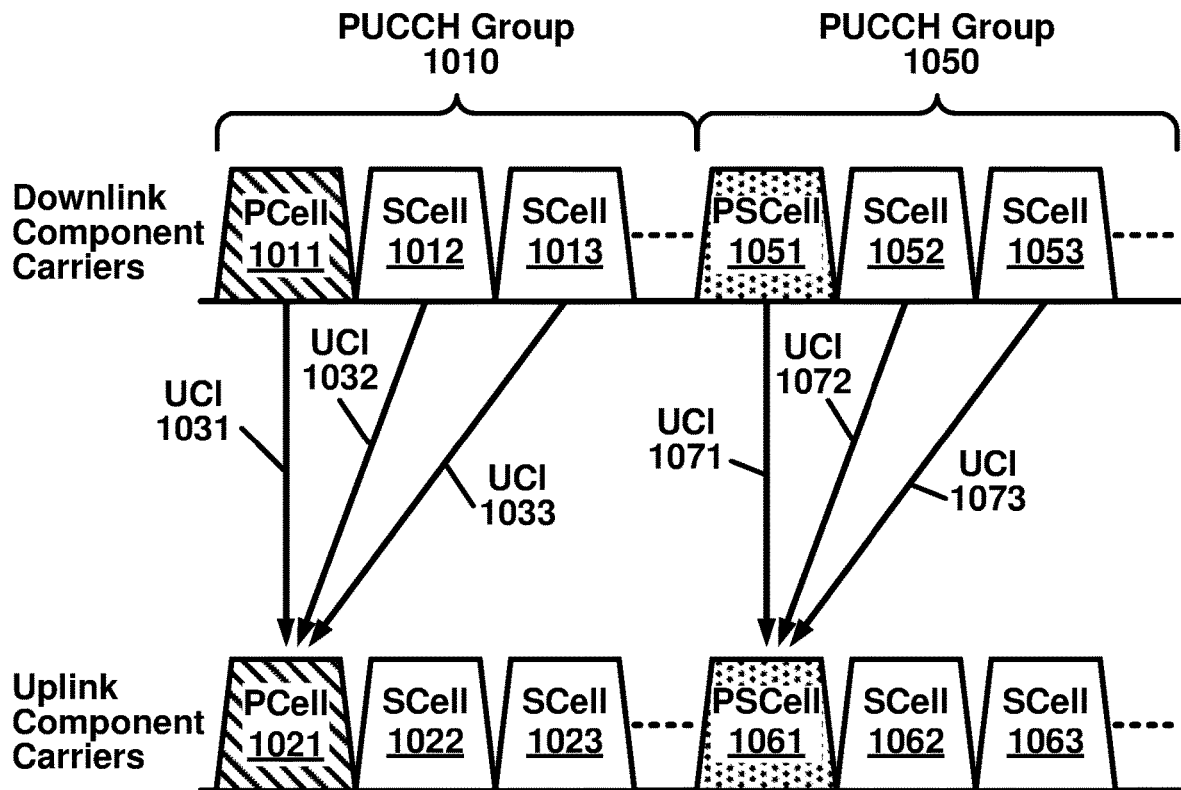
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
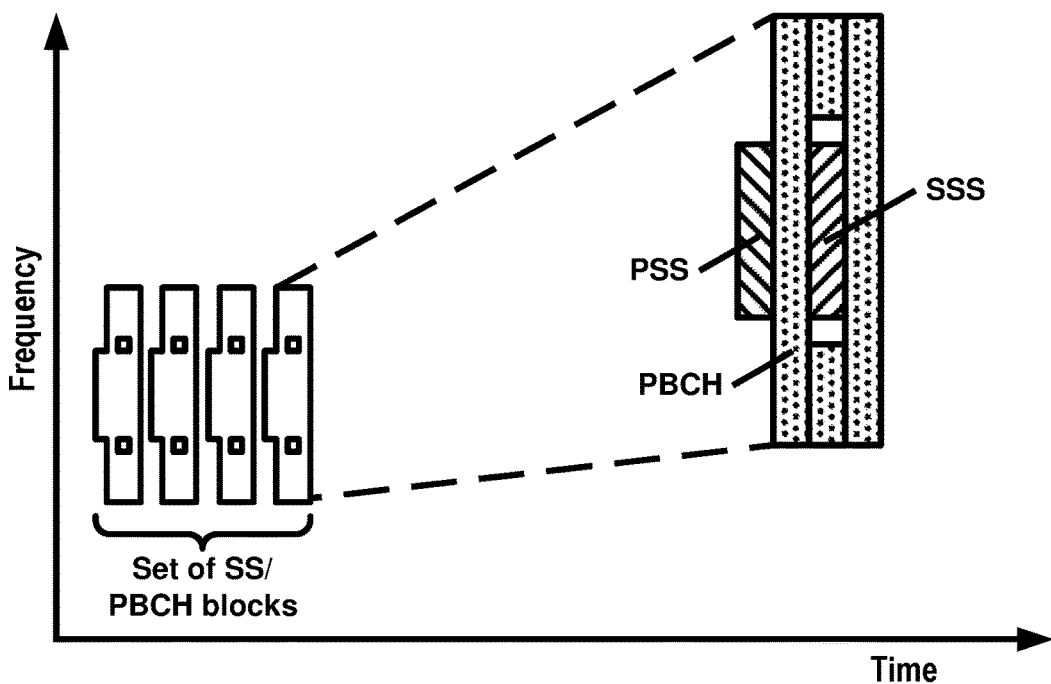
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
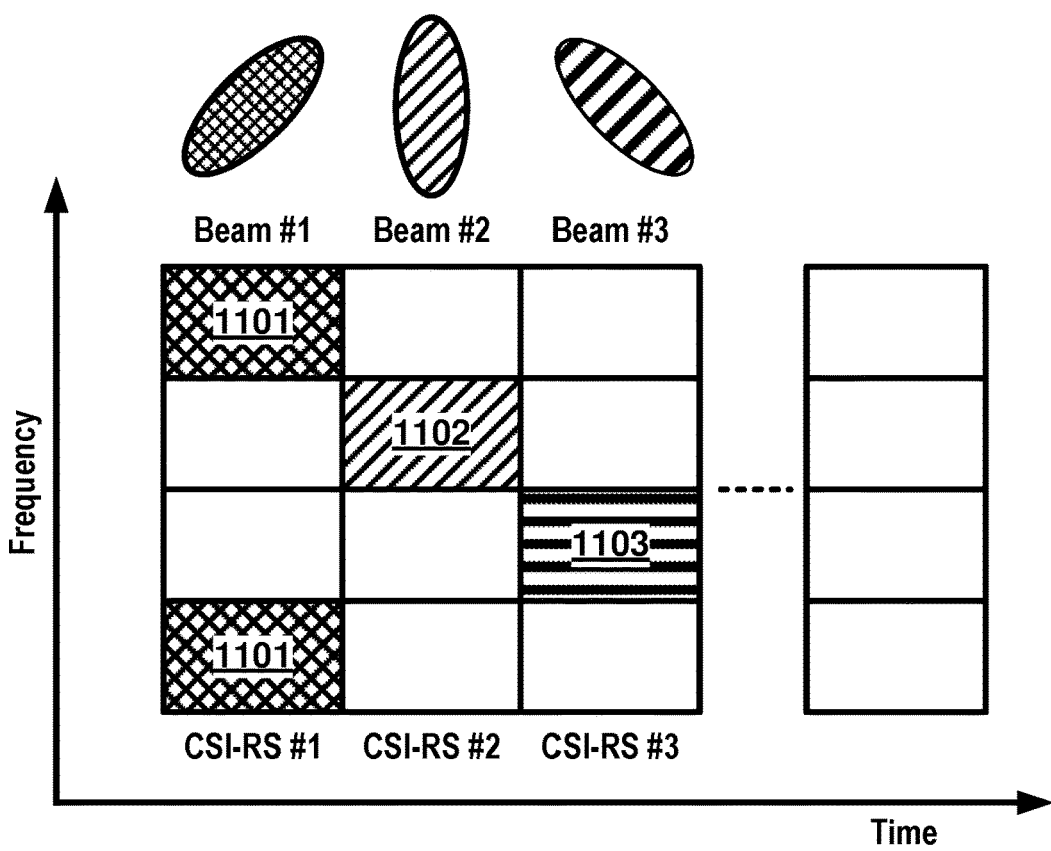
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
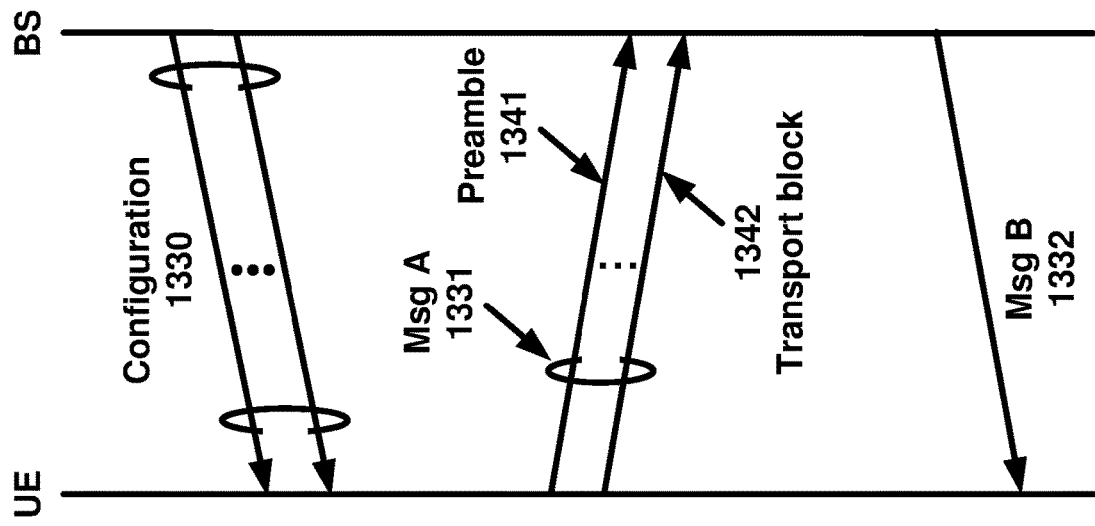
FIG. 13A, FIG. 13B, and FIG. 13C respectively illustrate a four-step contention-based random access procedure, a two-step contention-free random access procedure, and another two-step random access procedure.
Figure 13B:
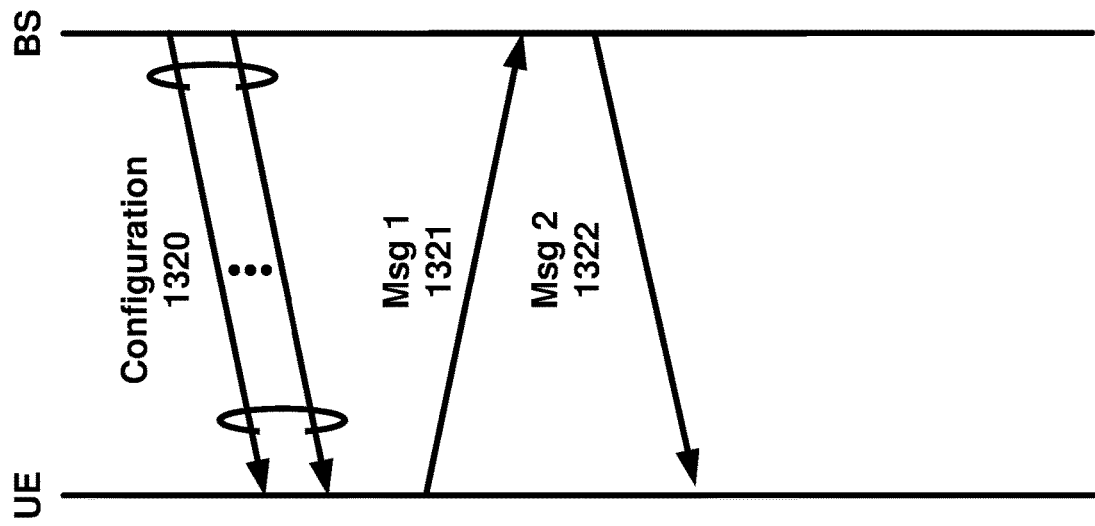
Figure 13A:
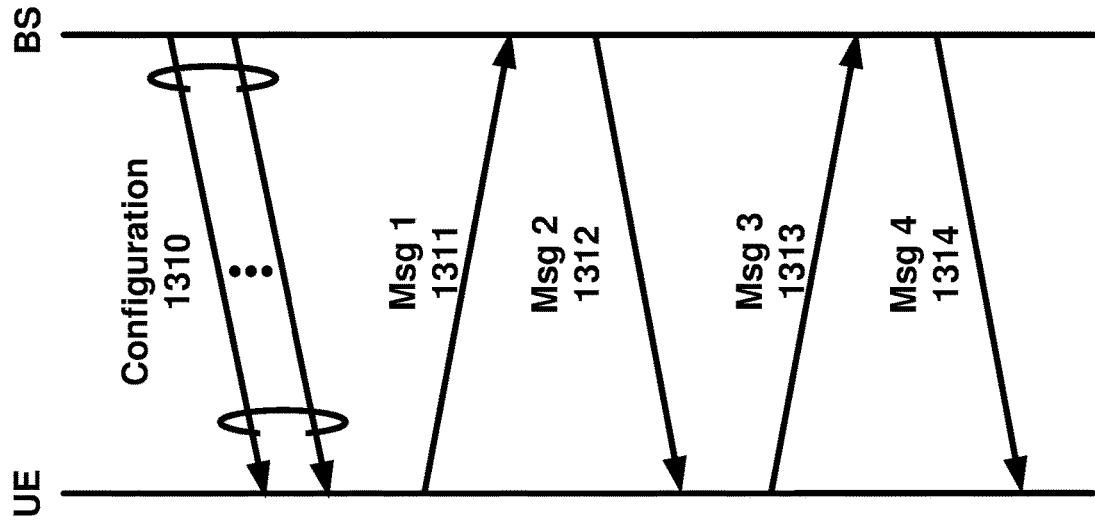

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1

1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI} = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0<t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
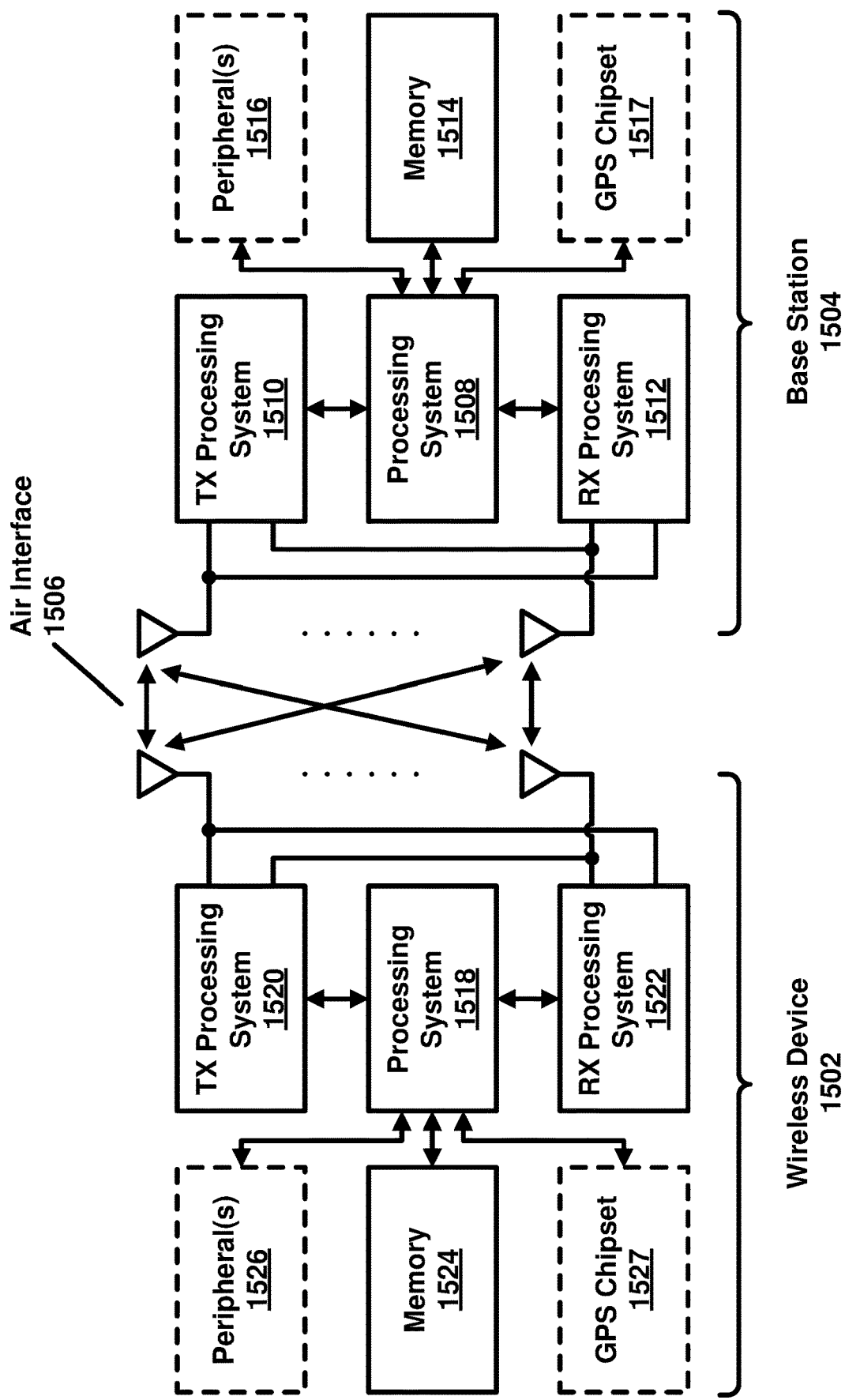
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP- OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/ window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17:
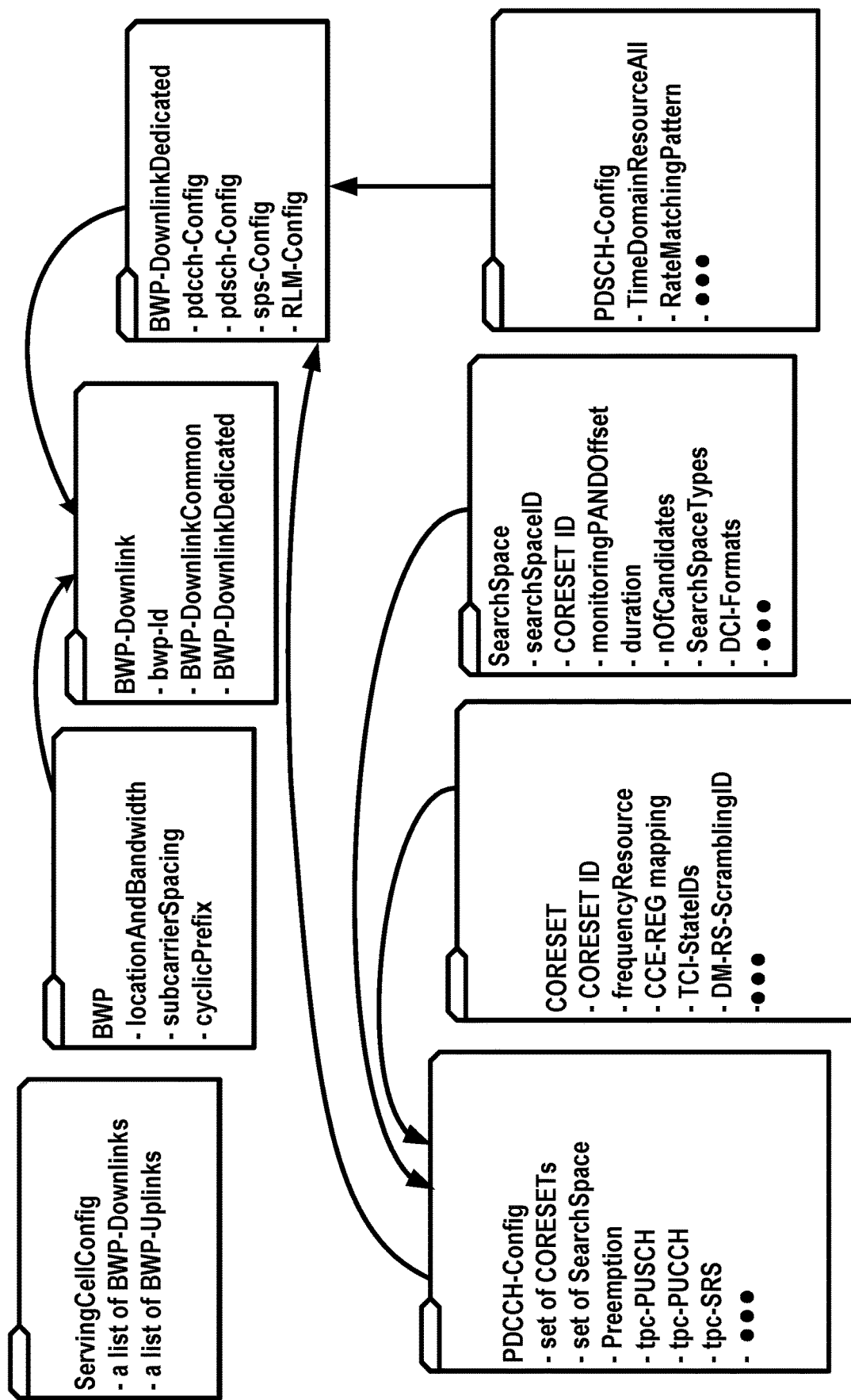
FIG. 17 illustrates configuration parameters for a wireless device to receive control and/or data from a base station as per an aspect of an example embodiment of the present disclosure.

FIG. 17 illustrates example configuration parameters for a wireless device to receive control and/or data from a base station. A wireless device may receive one or more radio resource control (RRC) messages comprising configuration parameters of a cell. The configuration parameters may comprise one or more parameters of a serving cell configuration (e.g., ServingCellConfig). The one or more parameters of the serving cell configuration may comprise one or more downlink bandwidth parts (e.g., a list of BWP-Downlinks). The one or more parameters of the serving cell configuration may comprise one or more uplink bandwidth parts (e.g., a list of BWP-Uplinks). A downlink bandwidth part (e.g., BWP-Downlink) and/or an uplink bandwidth part (e.g., BWP-Uplink) may comprise a bandwidth part index (e.g., bwp-Id), configuration parameters of a cell-common downlink bandwidth part (e.g., BWP-DownlinkCommon, BWP-UplinkCommon), and/or a UE-specific downlink bandwidth part (e.g., BWP-DownlinkDedicated, BWP-UplinkDedicated). For example, the bandwidth part index (bwp-Id) may indicate a bandwidth part configuration. For example, an index of the bandwidth part is the bandwidth part index. The bandwidth part configuration may comprise a location and bandwidth information (locationAndBandwidth). The locationAndBandwidth may indicate a starting resource block (RB) of the bandwidth part and a bandwidth of the bandwidth part, based on a reference point (e.g., a pointA of a carrier/cell for the bandwidth part). The bandwidth part configuration may comprise a subcarrier spacing (e.g., subcarrierSpacing) and a cyclic prefix (e.g., cyclicPrefix). For example, the subcarrier spacing may be one of 15 kHz, 30 kHz, 60 kHz, 120 kHz, 240 kHz, 480 kHz, and 960 kHz. For example, the cyclic prefix may be one of a normal cyclic prefix and an extended cyclic prefix.

For example, configuration parameters of the cell-specific downlink bandwidth (e.g., BWP-DownlinkCommon) may indicate/comprise genericParameters, pdcch-ConfigCommon, and/or pdsch-ConfigCommon. For example, pdcch-ConfigCommon may comprise cell-specific parameters for receiving downlink control information (DCIs) via the cell-specific downlink bandwidth part (e.g., an initial BWP). For example, pdsch-ConfigCommon may comprise cell-specific parameters for receiving PDSCHs of transport blocks (TBs) via the cell-specific downlink bandwidth part. Configuration parameters of the UE-specific downlink bandwidth part (e.g., BWP-DownlinkDedicated) may comprise pdcch-Config, pdsch-Config, sps-Config, and/or radioLinkMonitoring-Config (e.g., RLM-Config). The configuration parameters may comprise sps-ConfigList and/or beamFailureRecovery-SCellConfig. For example, beamFailureRecoverySCellConfig may comprise reference signal parameters for beam failure recovery for secondary cells. For example, pdcch-Config may comprise parameters for receiving DCIs for the UE-specific downlink bandwidth part. For example, pdsch-Config may comprise parameters for receiving PDSCHs of TBs for the UE-specific downlink bandwidth part. For example, sps-Config may comprise parameters for receiving semi-persistent scheduling PDSCHs. The base station may configure a SPS for a BWP or a list of SPS for the BWP. For example, radioLinkMonitoringConfig may comprise parameters for radio link monitoring.

Configuration parameters of pdcch-Config may indicate/comprise at least one of a set of coresets, a set of search spaces, a downlink preemption (e.g., downlinkPreemption), a transmission power control (TPC) for PUSCH (e.g. tpc-PUSCH), a TPC for PUCCH and/or a TPC for SRS. The configuration parameters may comprise a list of search space switching groups (e.g., searchsSpaceSwitchingGroup), a search space switching timer (e.g., searchSpaceSwitching-Timer), an uplink cancellation, and/or a monitoring capability configuration (e.g., monitoringCapabilityConfig). The base station may configure the list of search space switching groups, where the wireless device may switch from a first search space group to a second search space group based on the search space switching timer or a rule, an indication, or an event. The base station may configure up to K (e.g., K=3) coresets for a BWP of a cell. The downlink preemption may indicate whether to monitor for a downlink preemption indication for the cell. The monitoring capability config may indicate whether a monitoring capability of the wireless device would be configured for the cell, where the capability is based on a basic capability or an advanced capability. The base station may configure up to M (e.g., M=10) search spaces for the BWP of the cell. The tpc-PUCCH, tpc-PUSCH, or tpc-SRS may enable and/or configure reception of TPC commands for PUCCH, PUSCH or SRS respectively. The uplink cancellation may indicate to monitor uplink cancellation for the cell.

Configuration parameters of pdcch-ConfigCommon may comprise a control resource set zero (e.g., controlResource-SetZero), a common control resource set (e.g., common-ControlResourceSet), a search space zero (e.g., searchSpaceZero), a list of common search space (e.g., commonSearchSpaceList), a search space for SIB1 (e.g., searchSpaceSIB1), a search space for other SIBs (e.g., searchSpaceOtherSystemInformation), a search space for paging (e.g., pagingSearchSpace), a search space for random access (e.g., ra-SearchSpace), and/or a first PDCCH monitoring occasion. The control resource set zero may comprise parameters for a first coreset with an index value zero. The coreset zero may be configured for an initial bandwidth part of the cell. The wireless device may use the control resource set zero in a BWP of the cell, wherein the BWP is not the initial BWP of the cell based on one or more conditions. For example, a numerology of the BWP may be same as the numerology of the initial BWP. For example, the BWP may comprise the initial BWP. For example, the BWP may comprise the control resource set zero. The common control resource set may be an additional common coreset that may be used for a common search space (CSS) or a UE-specific search space (USS). The base station may configure a bandwidth of the common control resource set where the bandwidth is smaller than or equal to a bandwidth of the control resource set zero. The base station may configure the common control resource set such that it is contained within the control resource set zero (e.g., CORESET #0). The list of common search space may comprise one or more CSSs. The list of common search space may not comprise a search space with index zero (e.g., SS #0). The first PDCCH monitoring occasion may indicate monitoring occasion for paging occasion. The base station may configure a search space for monitoring DCIs for paging (e.g., paging-SearchSpace), for RAR monitoring (e.g., ra-SearchSpace), for SIB1 (e.g., searchSpaceSIB1) and/or for other SIBs than SIB1 (e.g., searchSpaceOtherSystemInformation). The search space with index zero (e.g., searchSpaceZero, SS #0) may be configured for the initial BWP of the cell. Similar to the coreset/CORESET #0, the SS #0 may be used in the BWP of the cell based on the one or more conditions.

Figure 18:
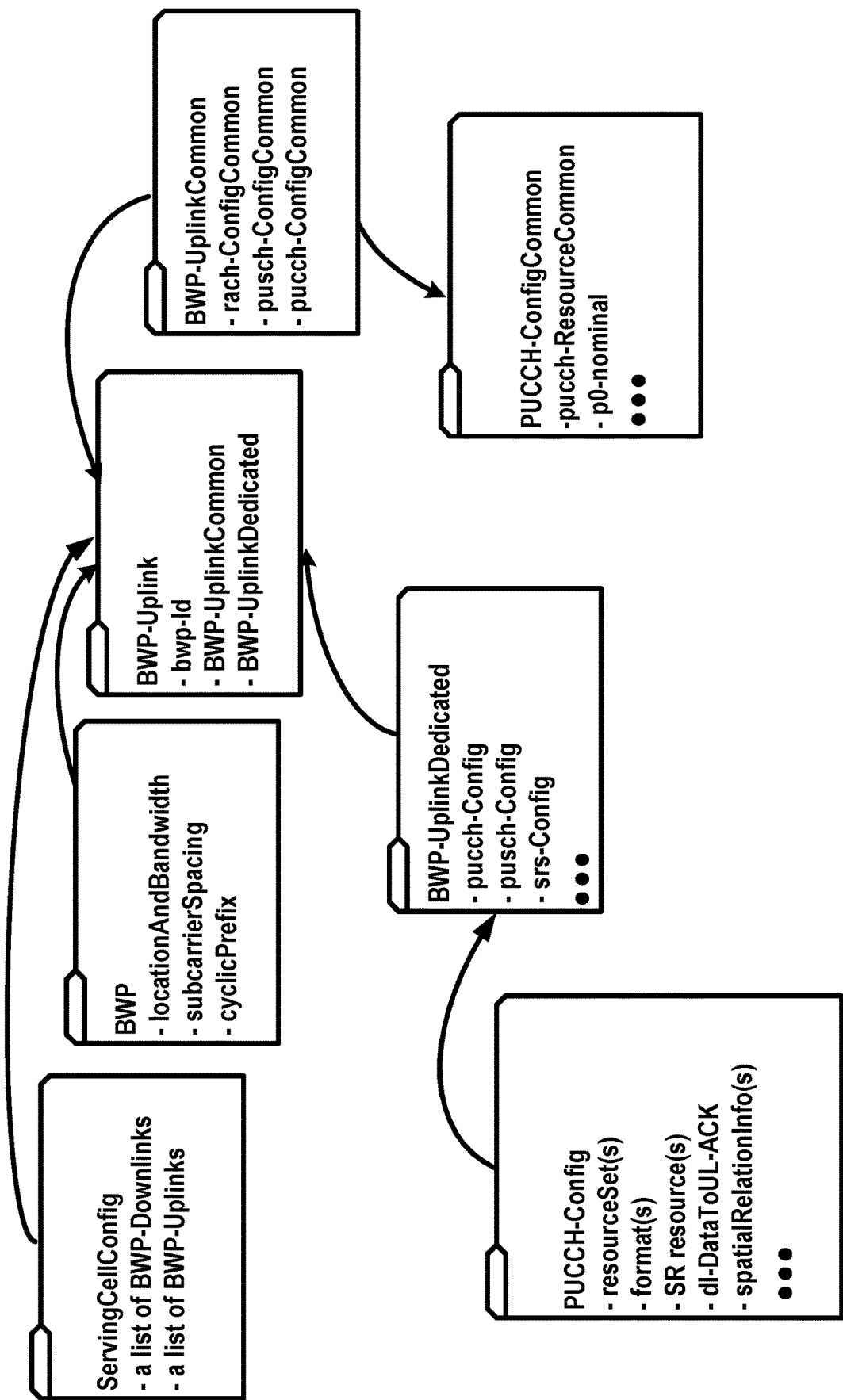
FIG. 18 illustrates configuration parameters for a wireless device to transmit control and/or data from a base station as per an aspect of an example embodiment of the present disclosure.

FIG. 18 illustrates example configuration parameters for a wireless device to transmit control and/or data from a base station. A wireless device may receive one or more radio resource control (RRC) messages comprising configuration parameters of a cell. The configuration parameters may comprise one or more parameters of a serving cell configuration (e.g., ServingCellConfig). The one or more parameters of the serving cell configuration may comprise one or more downlink bandwidth parts (e.g., a list of BWP-Downlinks). The one or more parameters of the serving cell configuration may comprise one or more uplink bandwidth parts (e.g., a list of BWP-Uplinks). An uplink BWP may comprise a bandwidth part index (bwp-id), one or more common uplink BWPs (e.g., configured via SIB/MIB, BWP-UplinkCommon), and/or one or more dedicated uplink BWPs (e.g., configured via RRC signaling, BWP-UplinkDedcated).

For example, configuration parameters of a cell-specific uplink bandwidth (e.g., BWP-UplinkCommon) may indicate/comprise rach-ConfigCommon, pusch-ConfigCommon and pucch-ConfigCommon. For example, pucch-Config-Common may comprise cell-specific parameters for transmitting uplink control information (UCIs) via the cell-specific uplink bandwidth part (e.g., initial UL BWP). For example, pusch-ConfigCommon may comprise cell-specific parameters for transmitting PUSCHs of transport blocks (TBs) via the cell-specific uplink bandwidth part. Configuration parameters of the UE-specific uplink bandwidth part (e.g., BWP-UplinkDedicated) may comprise pucch-Config, pusch-Config, srs-Config. For example, pucch-Config may comprise one or more PUCCH resource sets, one or more PUCCH formats (format), one or more scheduling request (SR) resources, one or more values for an offset between a PDSCH to a PUCCH or a HARQ-ACK feedback corresponding to the PDSCH (e.g., dl-DataToUL-ACK), and/or spatial domain filter parameters (spatialRelationInfo).

In an example, a base station and a wireless device may use a plurality of downlink control information (DCI) formats to communicate control information to schedule downlink data and/or uplink data and/or to deliver control information. For example, a DCI format 0_0 may be used to schedule an uplink resource for a PUSCH over a cell. A DCI format 0_1 may be used to schedule one or more PUSCHs in one cell or may be used to indicate downlink feedback information for configured grant PUSCH (CG-DFI). A DCI format 0_2 may be used to schedule a resource for a PUSCH in one cell. Similarly, for downlink scheduling, a DCI format 1_0 may schedule a resource for a PDSCH in one cell. A DCI format 1_1 may be used to schedule a PDSCH in one cell or trigger one shot HARQ-ACK feedback. A DCI format 1_2 may be used to schedule a resource for a PDSCH in one cell. There are one or more DCI formats carrying non-scheduling information. For example, a DCI format 2_0 may be used to indicate a slot formation information for one or more slots of one or more cells. A DCI format 2_2 may be used to indicate one or more transmit power control commands for PUCCH and PUSCH. A DCI format 2_3 may be used to indicate one or more transmit power control for SRS. A DCI format 2_4 may be used to indicate an uplink cancellation information. A DCI format 2_5 may be used to indicate a preemption information. A DCI format 2_6 may be used to indicate a power saving state outside of DRX active time. A DCI format 3_0 or 3_1 may be used to schedule NR sidelink resource or LTE sidelink resource in one cell.

In an example, a DCI format 0_0 and a DCI format 1_0 may be referred as a fallback DCI format for scheduling uplink and downlink respectively. In an example, a DCI format 0_1 and a DCI format 1_1 may be referred as a non-fallback DCI format scheduling uplink and downlink respectively. In an example, a DCI format 0_2 and a DCI format 1_2 may be referred as a compact DCI format for scheduling uplink and downlink respectively. A base station may configure one or more DCI formats for scheduling downlink and/or uplink resources. For example, a DCI format 0_0, 0_1 and 0_2 may be used to schedule uplink resource(s) for one or more PUSCHs. A DCI format 1_0, 1_1 and 1_2 may be used to schedule downlink resource(s) for one or more PDSCHs. A DCI format 2_0, 2_1, 2_2, 2_3, 2_4, 2_5 and 2_6 may be used for a group-common DCI transmission. Each format of DCI format 2_x may be used for different information. For example, the DCI format 2_4 may be used to indicate uplink resources for a group of wireless devices. In response to receiving a DCI based on the DCI format 2_4, a wireless device may cancel any uplink resource, scheduled prior to the receiving, when the uplink resource may be overlapped with the indicated uplink resources.

A DCI format may comprise one or more DCI fields. A DCI field may have a DCI size. A wireless device may determine one or more bitfield sizes of one or more DCI fields of the DCI format based on one or more radio resource control (RRC) configuration parameters by a base station. For example, the one or more RRC configuration parameters may be transmitted via master information block (MIB). For example, the one or more RRC configuration parameters may be transmitted via system information blocks (SIB s). For example, the one or more RRC configuration parameters may be transmitted via one or more a wireless device specific messages. For example, the wireless device may determine one or more DCI sizes of one or more DCI fields of a DCI format 0_0 based on the one or more RRC configuration parameters transmitted via the MIB and/or the SIB s. The wireless device may be able to determine the one or more DCI sizes of the DCI format 0_0 without receiving any the wireless device specific message. Similarly, the wireless device may determine one or more DCI sizes of one or more second DCI fields of a DCI format 1_0 based on the one or more RRC configuration parameters transmitted via the MIB and/or the SIB s.

Figure 19:
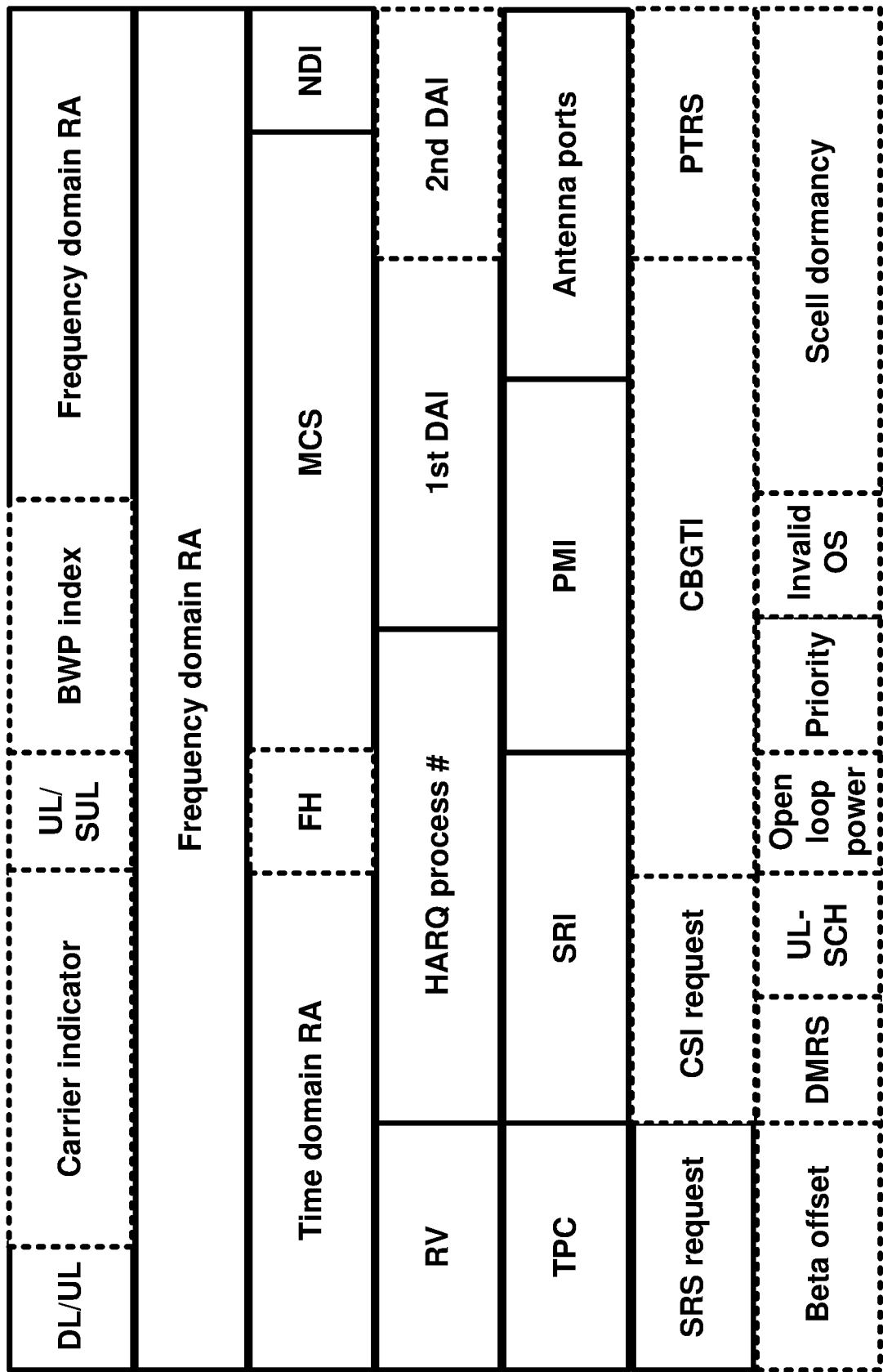
FIG. 19 illustrates an example DCI format for scheduling uplink resource of a single cell as per an aspect of an example embodiment of the present disclosure.

For example, the wireless device may determine one or more first DCI sizes of one or more first DCI fields of a DCI format 0_2 based on one or more RRC configuration parameters transmitted via the MIB and/or the SIBs and/or the wireless device specific RRC message(s). The wireless device may determine one or more bitfield sizes of the one or more first DCI fields based on the one or more RRC configuration parameters. For example, FIG. 19 may illustrate the one or more first DCI fields of the DCI format 0_2. In FIG. 19, there are one or more second DCI fields that may present in the DCI format 0_2 regardless of the wireless device specific RRC message(s). For example, the one or more second DCI fields may comprise at least one of DL/UL indicator, frequency domain resource allocation, MCS, NDI, and TPC fields. For example, the one or more first DCI fields may comprise the one or more second DCI fields and one or more third DCI fields. A DCI field of the one or more third DCI fields may be present or may not be present based on one or more configuration parameters transmitted by the base station. For example, the one or more third DCI fields may comprise at least one of a BWP index, RV, HARQ process #, PMI, antenna ports, and/or beta offset.

For example, the DCI format 0_2 may comprise a 1-bit DL/UL indicator where the bit is configured with zero ('0') to indicate an uplink grant for the DCI format 0_2. DCI field(s) shown in dotted boxes may not be present or a size of the DCI field(s) may be configured as zero. For example, a carrier indicator may be present when the DCI format 0_2 is used to schedule a cell based on cross-carrier scheduling. The carrier indicator may indicate a cell index of a scheduled cell by the cross-carrier scheduling. For example, UL/SUL indicator (shown UL/SUL in FIG. 19) may indicate whether a DCI based on the DCI format 0_2 schedules a resource for an uplink carrier or a supplemental uplink. The UL/SUL indicator field may be present when the wireless device is configured with a supplemental uplink for a scheduled cell of the DCI. Otherwise, the UL/SUL indicator field is not present.

A field of BWP index may indicate a bandwidth part indicator. The base station may transmit configuration parameters indicating one or more uplink BWPs for the scheduled cell. The wireless device may determine a bit size of the field of BWP index based on a number of the one or more uplink BWPs. For example, 1 bit may be used. The number of the one or more uplink BWPs (excluding an initial UL BWP) is two. The field of BWP index may be used to indicate an uplink BWP switching. The wireless device may switch to a first BWP in response to receiving the DCI indicating an index of the first BWP. The first BWP is different from an active uplink BWP (active before receiving the DCI).

A DCI field of frequency domain resource allocation (frequency domain RA in FIG. 19) may indicate uplink resource(s) of the scheduled cell. For example, the base station may transmit configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. In an example, a length may be a multiple of K1 resource blocks. For example, the configuration parameters may comprise a resource allocation type1 granularity for the DCI format 0_2 (e.g., K1). A default value of the K1 may be one ('1'). The base station may transmit configuration parameters indicating a dynamic change between the resource allocation type 0 and the resource allocation type 1 (e.g., 'dynamicswitch'). The wireless device may determine a field size of the frequency domain RA field based on the configured resource allocation type and a bandwidth of an active UL BWP of the scheduled cell. The wireless device may further determine the field size of the frequency domain RA field based on the K1 value, when the resource allocation type 1 may be used/configured. For example, when the resource allocation type 0 is configured, the bitmap may indicate each of the one or more RBGs covering the bandwidth of the active UL BWP. A size of the bitmap may be determined based on a number of the one or more RBGs of the active UL BWP. For example, the wireless device may determine the size of the frequency domain RA field based on the resource allocation type 1 based on the bandwidth of the active uplink BWP (e.g., ceil (log 2(BW/K1(BW/K1+1)/2) and the resource allocation type1 granularity. E.g., the BW is the bandwidth of the active uplink BWP. E.g., the K1 is the resource allocation type1 granularity).

The wireless device may determine a resource allocation indicator value (RIV) table, where an entry of the table may comprise a starting PRB index and a length value. The wireless device may determine the RIV table based on the resource allocation type1 granularity. For example, when the dynamic change between the resource allocation type 0 and the resource allocation type 1 is used, a larger size between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1. For example, the frequency domain RA field may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil(log 2(BW/K1(BW/K1+1)/2)–K bits to indicate the uplink resource(s) based on the resource allocation type 1, when frequency hopping is enabled. Otherwise, the base station/wireless device may use ceil(log 2(BW/K1(BW/K1+1)/2) bits to indicate the uplink resource(s) based on the resource allocation type 1.

In an example, a base station may transmit one or more messages comprising configuration parameters of a BWP of a cell. The configuration parameters may indicate/comprise a resource allocation type for one or more PUSCHs scheduled by one or more DCIs, based on a first RNTI. The resource allocation type may be a resource allocation type 0 or a resource allocation type 1 or a dynamic switching between the resource allocation type 0 and the resource allocation type 1. For example, the first RNTI is a C-RNTI. The configuration parameters may indicate/comprise a configured grant configuration or a SPS configuration. The configuration parameters may indicate a resource allocation type for the configured grant configuration or the SPS configuration. The resource allocation type may be a resource allocation type 0 or a resource allocation type 1 or a dynamic switching between the resource allocation type 0 and the resource allocation type 1.

A DCI field of time domain resource allocation (time domain RA shown in FIG. 19) may indicate time domain resource of one or more slots of the scheduled cell. The base station may transmit configuration parameters indicating one or more time domain resource allocation lists of a time domain resource allocation table for an uplink BWP of the scheduled cell. The wireless device may determine a bit size of the time domain RA field based on a number of the one or more time domain resource allocation lists of the time domain resource allocation table. The base station may indicate a frequency hopping flag by a FH flag (shown as FH in FIG. 19). For example, the FH flag may present when the base station may enable a frequency hopping of the scheduled cell or the active UL BWP of the scheduled cell. A DCI field of modulation and coding scheme (MCS) (shown as MCS in FIG. 19) may indicate a coding rate and a modulation scheme for the scheduled uplink data. In an example, a bit size of the MCS field may be predetermined as a constant (e.g., 5 bits). A new data indicator (NDI) field may indicate whether the DCI schedules the uplink resource(s) for a new/initial transmission or a retransmission. A bit size of the NDI may be fixed as a constant value (e.g., 1 bit). A redundancy version (RV) field may indicate one or more RV values (e.g., a RV value may be 0, 2, 3, or 1) for one or more PUSCHs scheduled over the one or more slots of the scheduled cells. For example, the DCI may schedule a single PUSCH via one slot, a RV value is indicated. For example, the DCI may schedule two PUSCHs via two slots, two RV values may be indicated. A number of PUSCHs scheduled by a DCI may be indicated in a time domain resource allocation list of the one or more time domain resource allocation lists. The configuration parameters may indicate/comprise a bit size of the RV field. For example, the bit size may be 0, 1 or 2 bits for a single PUSCH. When the bit size is configured as zero ('0'), the wireless device may apply a RV=0 for any uplink resource scheduled by a DCI based on the DCI format 0_2.

A DCI field of hybrid automatic repeat request (HARQ) process number (HARQ process # in FIG. 19) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The configuration parameters may indicate/comprise a bit size for the HARQ process # field. For example, the bit size may be 0, 1, 2, 3 or 4 bits for a single PUSCH. The wireless device may assume that a HARQ process index=0 in case the bit size is configured as zero. The wireless device may assume that a HARQ process index in a range of [0, 1] when the bit size is configured as one. The wireless device may assume that a HARQ process index in a range of [0, . . . , 3] when the bit size is configured as two. The wireless device may assume that a HARQ process index in a range of [0, . . . , 7] when the bit size is configured as three. For the 4 bits of bit size, the wireless device may use a HARQ process in a range of [0, . . . , 15].

The DCI format 0_2 may have a first downlink assignment index (1st DAI) and/or a second DAI (2nd DAI). The configuration parameters may indicate/comprise a parameter to indicate whether to use DAI for the DCI format 0_2 (e.g., Downlinkassignmentindex-ForDCIFormat0_2). The first DAI may be used to indicate a first size of bits of first HARQ-ACK codebook group. The second DAI may be present when the base station may transmit configuration parameters indicating a plurality of HARQ-ACK codebook groups. When there is no HARQ-ACK codebook group configured, the wireless device may assume the first HARQ-ACK codebook group only. The second DAI may indicate a second size of bits of second HARQ-ACK codebook group. The first DAI may be 1 bit when a semi-static HARQ-ACK codebook generation mechanism is used. The first DAI may be 2 bits or 4 bits when a dynamic HARQ-ACK codebook generation mechanism is used.

A field of transmission power control (TPC shown in FIG. 19) may indicate a power offset value to adjust transmission power of the one or more scheduled PUSCHs. A field of sounding reference signal (SRS) resource indicator (SRI) may indicate an index of one or more configured SRS resources of an SRS resource set. A field of precoding information and number of layers (shown as PMI in FIG. 19) may indicate a precoding and a MIMO layer information for the one or more scheduled PUSCHs. A field of antenna ports may indicate DMRS pattern(s) for the one or more scheduled PUSCHs. A field of SRS request may indicate to trigger a SRS transmission of a SRS resource or skip SRS transmission. A field of CSI request may indicate to trigger a CSI feedback based on a CSI-RS configuration or skip CSI feedback. A field of phase tracking reference signal (PTRS)-demodulation reference signal (DMRS) association (shown as PTRS in FIG. 19) may indicate an association between one or more ports of PTRS and one or more ports of DM-RS. The one or more ports may be indicated in the field of antenna ports. A field of beta_offset indicator (beta offset in FIG. 19) may indicate a code rate for transmission of uplink control information (UCI) via a PUSCH of the one or more scheduled PUSCHs. A field of DM-RS sequence initialization (shown as DMRS in FIG. 19) may present based on a configuration of transform precoding. A field of UL-SCH indicator (UL-SCH) may indicate whether a UCI may be transmitted via a PUSCH of the one or more scheduled PUSCHs or not. A field of open loop power control parameter set indication (open loop power in FIG. 19) may indicate a set of power control configuration parameters. The wireless device is configured with one or more sets of power control configuration parameters. A field of priority indicator (priority) may indicate a priority value of the one or more scheduled PUSCHs. A field of invalid symbol pattern indicator (invalid OS) may indicate one or more unavailable/not-available OFDM symbols to be used for the one or more scheduled PUSCHs.

Note that additional DCI field(s), although not shown in FIG. 19, may be present for the DCI format 0_2. For example, a downlink feedback information (DFI) field indicating for one or more configured grant resources may present for an unlicensed/shared spectrum cell. For example, the unlicensed/shared spectrum cell is a scheduled cell. When the DCI format 0_2 is used for indicating downlink feedback information for the one or more configured grant resources, other DCI fields may be used to indicate a HARQ-ACK bitmap for the one or more configured grant resources and TPC commands for a scheduled PUSCH. Remaining bits may be reserved and filled with zeros ('0's).

Figure 20:
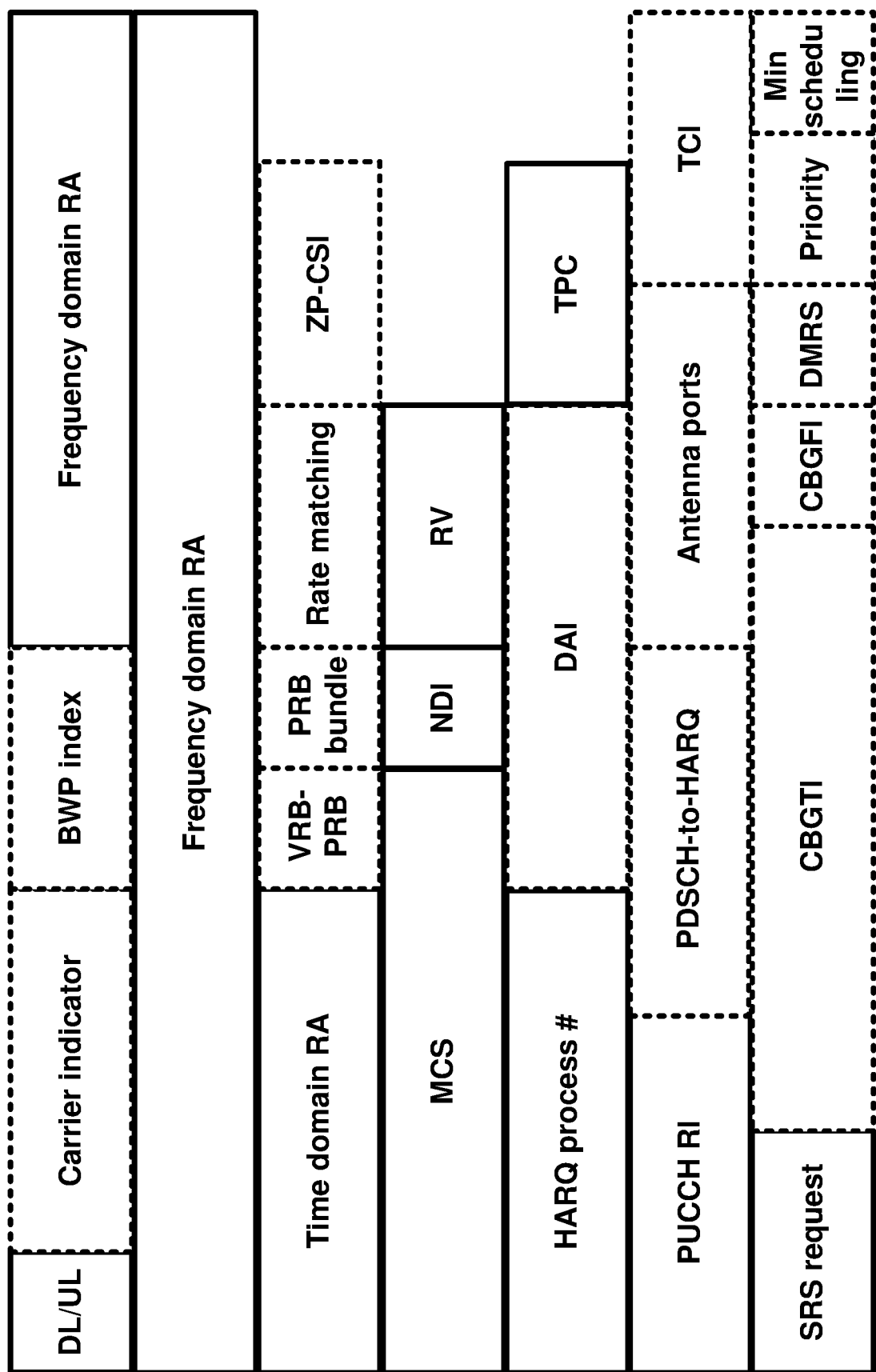
FIG. 20 illustrates an example DCI format for scheduling downlink resource of a single cell as per an aspect of an example embodiment of the present disclosure

FIG. 20 shows an example of a DCI format 1_2. The DCI format 1_2 may schedule a downlink resource for a scheduled downlink cell. The DCI format 1_2 may comprise one or more DCI fields such as an identifier for DCI formats (DL/UL), a carrier indicator, bandwidth part indicator (BWP index), a frequency domain resource assignment (frequency domain RA), a time domain resource assignment (time domain RA), a virtual resource block to physical resource block mapping (VRB-PRB), Physical resource block (PRB) bundling size indicator (PRB bundle), rate matching indicator (rate matching), zero power CSI-RS (ZP-CSI), a MCS, a NDI, a RV, a HARQ process number, a downlink assignment index (DAI), a TPC command for a PUCCH, a PUCCH resource indicator (PUCCH-RI), a PDSCH-to-HARQ feedback timing indicator (PDSCH-to-HARQ in FIG. 20), an antenna ports, a transmission configuration indication (TCI), a SRS request, DMRS sequence initialization (DMRS), and a priority indicator (priority).

The base station may transmit one or more messages indicating configuration parameters for the DCI format 1_2. Similar to the DCI format 0_2 of FIG. 19, one or more DCI fields shown in dotted lined boxes may be present or may not be present based on the configuration parameters. The configuration parameters may indicate/comprise one or more DCI bit sizes and/or related configuration parameters/values for the one or more DCI fields.

For example, the VRB-PRB field may indicate whether a mapping is based on a virtual RB or a physical RB. For example, the PRB bundle may indicate a size of PRB bundle when a dynamic PRB bundling is enabled. For example, the rate matching may indicate one or more rate matching resources where the scheduled data may be mapped around based on the rate matching. For example, the ZP-CSI field may indicate a number of aperiodic ZP CSI-RS resource sets configured by the base station. For example, the DCI format 1_2 may also include MCS, NDI and RV for a second transport block, in response to a max number of codewords scheduled by DCI may be configured as two. The DCI format 1_2 may not include MCS, NDI and RV field for the second transport block. For example, the DAI field may indicate a size of bits of HARQ-ACK codebook. The TPC field may indicate a power offset for the scheduled PUCCH. The wireless device may transmit the scheduled PUCCH comprising HARQ-ACK bit(s) of the scheduled downlink data by the DCI. The PUCCH-RI may indicate a PUCCH resource of one or more PUCCH resources configured by the base station. The PDSCH-to-HARQ field may indicate a timing offset between an end of a scheduled PDSCH by the DCI and a starting of the scheduled PUCCH. The field of antenna ports may indicate DMRS patterns for the scheduled PDSCH. The TCI field may indicate a TCI code point of one or more active TCI code points/active TCI states. The base station may transmit configuration parameters indicating one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states.

In an example, a wireless device may receive a DCI indicating an activation, a release, or a retransmission for one or more configured grant configurations or one or more semi-persistent scheduling configurations. The DCI may be cyclic redundancy check (CRC) scrambled with a first radio network temporary identifier (RNTI). The wireless device may receive a second DCI indicating one or more resources for scheduling downlink and/or uplink data. The second DCI may be CRC scrambled with a second RNTI. For example, the second RNTI may be a cell RNTI (C-RNTI) and/or MCS-C-RNTI. For example, the first RNTI may be configured scheduling RNTI (CS-RNTI) for an uplink configured grant configuration. The first RNTI may be semi-persistent scheduling RNTI (SPS-RNTI). The DCI and the second DCI may be based on a DCI format. For example, the DCI and the second DCI may be based on a DCI format 0_2 for uplink (e.g., uplink grant and/or configured grant (CG)). For example, the DCI and the second DCI may be based on a DCI format 1_2 for downlink (e.g., downlink scheduling and/or semi-persistent scheduling (SPS)).

For example, the wireless device may determine whether the DCI indicates the activation, the release or the retransmission for the one or more CG configurations or for the one or more SPS configurations based on determining one or more values of one or more DCI fields of the DCI format used for the DCI. For example, the wireless device may determine the DCI indicates the activation in response to receiving the DCI with a HARQ process # (HARQ process number) field of the DCI format indicating zero(s) (e.g., '0, . . . , 0') and a RV (redundancy version) field of the DCI indicating zero(s). The wireless device may first determine whether a NDI field of the DCI may indicate a new data or not. In response to receiving the DCI with the NDI field of the new data, the wireless device may further determine the HARQ process number field and the redundancy version field of the DCI. In response to determining the HARQ process number field being set to a predetermined value (e.g., zero(s)) and the redundancy version field being set to a predetermined value (e.g., zero(s)), the wireless device may determine the DCI may indicate the activation or the release of at least one CG configuration or at least one SPS configuration. For example, the wireless device may further check/determine a MCS (modulation and coding scheme) field of the DCI and/or a FDRA (frequency domain resource assignment) field of the DCI to differentiate between the activation and the release. In response to the MCS field being set to a second predetermined value (e.g., one(s), '1, . . . , 1') and the FDRA field being set to a third predetermined value (e.g., zero(s) for resource allocation type 0 or a resource allocation type 2 with mu=1, one(s) for resource allocation type 1 or the resource allocation type 2 with mu=0), the wireless device may determine the DCI indicates the release for the at least one CG configuration or the at least one SPS configuration. In response to the MCS field being set to different value from the second predetermined value and/or the FDRA field being set to the third predetermined value, the wireless device may determine the DCI may indicate the activation for the at least one CG configuration or the at least one SPS configuration.

For example, a DCI format 0_0/0_1/0_2, CRC scrambled with the first RNTI, may be used to indicate an activation, a release and/or retransmission for a configured grant (CG) based on setting one or more DCI fields with one or more predetermined values. For example, a DCI format 1_0/1_2, CRC scrambled with a third RNTI (e.g., SPS-RNTI), may be used to indicate an activation, a release and/or retransmission for a semi-persistent scheduling (SPS) on setting the one or more DCI fields with one or more predetermined values.

In an example, two downlink resource allocation schemes, type 0 and type 1, are supported. A wireless device may determine a frequency domain resource based on a DCI based on a fallback DCI format such as DCI format 0_1 based on a resource allocation type 1. A base station may transmit configuration parameters indicating a dynamic switch between the type 0 and the type 1 resource allocation via an indication in a DCI. The configuration parameters may comprise 'dynamicswitch' to enable dynamic switching between the type 0 and the type 1 via the DCI. The dynamic switching may be supported for a DCI based on a non-fallback DCI format such as DCI format 1_1 or DCI format 1_2. The configuration parameters may comprise/indicate either the type 0 or the type 1 as a resource allocation type via an RRC signaling. The wireless device may determine a frequency domain resource based on a DCI based on the resource allocation configured via the RRC signaling, in response to 'dynamicswitch' being not configured. The wireless device may determine a frequency domain resource based on a frequency domain resource assignment field of a DCI based on an active downlink BWP of a cell. The cell is a scheduled cell. The DCI may indicate a BWP index. The wireless device may determine the frequency domain resource based on one or more configuration parameters of an indicated BWP by the BWP index. For a PDSCH scheduled with a DCI based on a fallback DCI format (e.g., DCI format 1_0) via any common search space, a RB numbering, to determine a frequency domain resource, may start from a lowest RB of a coreset. For example, the DCI has been received via the coreset. In other cases, the RB numbering may start from a lowest RB of an active BWP of the scheduled cell.

For example, a resource allocation type 0 may use a bitmap to indicate a frequency domain resource. The bitmap may indicate one or more resource block groups (RBGs) that may allocate the frequency domain resource. One RBG may represent a set of consecutive virtual resource blocks defined by a rgb-Size. For example, the rbg-Size may be indicated as a parameter of a PDSCH-Config under a servingCellConfig. For example, the rbg-Size may be determined based on a parameter of 'Configuration 1' or 'Configuration 2' and a bandwidth of an active BWP of a scheduled cell. For example, when the bandwidth of the active BWP is between 1 to 36 RBs, 'Configuration 1' indicates the rbg-Size of 2 and 'Configuration 2' indicates the rbg-Size of 4. For example, when the bandwidth of the active BWP is between 37 to 72 RB s, 'Configuration 1' indicates the rbg-Size of 4 and 'Configuration 2' indicates the rbg-Size of 8. For example, when the bandwidth of the active BWP is between 73 to 144 RBs, 'Configuration 1' indicates the rbg-Size of 8 and 'Configuration 2' indicates the rbg-Size of 16. For example, when the bandwidth of the active BWP is between 145 to 275 (or 550) RBs, 'Configuration 1' indicates the rbg-Size of 16 and 'Configuration 2' indicates the rbg-Size of 16. A number of RBGs (N_RBG) for a downlink BWP may present. A DCI field size of a frequency domain resource allocation based on the resource allocation type 0 would be ceil (N_RBG+(N_start_BWP mode P))/P) where a size of a first RBG is P−N_start_BWP mode P, a size of a last RBG is (N_start_BWP+bandwidth) mode P wherein is (N_start_BWP+bandwidth) mode P is greater than zero, a size of other RBGs are P, and P is the rbg-Size. The bitmap of N_RBG bits with one bitmap bit per a corresponding RBG, such that the corresponding RBG may be scheduled. The one or more RBGs may be indexed in an order of increasing frequency, and indexing may start from a lowest frequency of the active BWP. The order of the bitmap may be determined such that RBG #0 to RBG # N_RBG−1 may be mapped to most significant bit to least significant bit of the bitmap. The wireless device may assume an RBG is allocated in response to a corresponding bit of the bitmap being allocated/assigned as 1. The wireless device may assume a second RBG is not allocated in response to a corresponding bit of the bitmap being allocated/assigned as 0.

When a virtual RB to a physical RB mapping is enabled, the wireless device may determine one or more physical RBGs based on the indicated bitmap for the virtual RBGs. Otherwise, the indicated bitmap may determine the one or more physical RBGs.

For example, a resource allocation type 1, a frequency domain resource allocation may indicate a set of contiguously allocated non-interleaved or interleaved virtual resource blocks within an active bandwidth part of a scheduled cell. For example, a DCI may be scheduled via a USS. The frequency domain resource allocation field based on the resource allocation type 1 may use a resource allocation value (RIV). The RIV may indicate a starting virtual RB (RB_start) and a length in terms of contiguously allocated virtual RBs (L_rbs). The RIV value may be determined as the RIV=bandwidth (L_rbs−1)+RB_start when (L_rbs−1) is smaller than or equal to floor (bandwidth/2), or the RIV=bandwidth (bandwidth−L_rbs+1)+(bandwidth−1−RB_start) otherwise. The bandwidth may represent a bandwidth of the active BWP.

A base station may enable a PRB bundling. A wireless device may assume a same precoding over a number RBs of the PRB bundle (e.g., two PRBs, four PRBs or the bandwidth). The base station may schedule the PRB bundle or not, and may not schedule partial PRB bundle to the wireless device.

Similar to downlink, for an uplink transmission, a few resource allocation types are supported. For the uplink transmission, a resource allocation type 0, resource allocation type 1 or resource allocation type 2 may be supported. The resource allocation type 0 may be used in response to a transform precoding being disabled. The resource allocation type 1 or the resource allocation type 2 may be used in response to the transform precoding being enabled or being disabled. For the uplink transmission, a 'dynamicswitch' may be configured. In response to the 'dynamicswitch', the wireless device may switch between the resource allocation type 0 and the resource allocation type 1 based on a DCI.

The base station may configure a resource allocation type via an RRC signaling in response to the 'dynamicswitch' being not configured/enabled. The resource allocation type 2 may be used in response to an interlaced PUSCH being enabled. The wireless device may apply the resource allocation type 1 for a DCI based on a fallback DCI format such as a DCI format 0_0. The interlaced PUSCH is disabled for the fallback DCI format. When the interlaced PUSCH is enabled, the wireless device may apply the resource allocation type 2 for the DCI. The wireless device may determine a frequency domain resource based on a frequency domain resource allocation field of a DCI based on an active uplink BWP of a scheduled cell. The DCI may not comprise a BWP index. The wireless device may determine the frequency domain resource based on an indicated BWP by a BWP index when the DCI comprises the BWP index.

In an example, a resource allocation type 0 for an uplink transmission may use a bitmap indicating one or more RBGs within an active UL BWP of a scheduled cell. One RBG may represent a set of consecutive virtual resource blocks defined by a rbg-Size. The rbg-Size may be indicated as a parameter of a PYSCH-Config under a servingCellConfig. For example, the rbg-Size may be determined based on a parameter of 'Configuration 1' or 'Configuration 2' and a bandwidth of an active UL BWP of a scheduled cell. For example, when the bandwidth of the active UL BWP is between 1 to 36 RBs, 'Configuration 1' indicates the rbg-Size of 2 and 'Configuration 2' indicates the rbg-Size of 4. For example, when the bandwidth of the active UL BWP is between 37 to 72 RBs, 'Configuration 1' indicates the rbg-Size of 4 and 'Configuration 2' indicates the rbg-Size of 8. For example, when the bandwidth of the active UL BWP is between 73 to 144 RBs, 'Configuration 1' indicates the rbg-Size of 8 and 'Configuration 2' indicates the rbg-Size of 16. For example, when the bandwidth of the active UL BWP is between 145 to 275 (or 550) RBs, 'Configuration 1' indicates the rbg-Size of 16 and 'Configuration 2' indicates the rbg-Size of 16. A number of RBGs (N_RBG) for a uplink BWP may present. Determination of a bit of the bitmap of the uplink resource allocation type 1 is same as that of the downlink resource allocation type 1. In frequency range 1 (e.g., below 7 GHz), almost contiguous allocation may be supported. In frequency range 2 (e.g., above 7 GHz and below 52.6 GHz), contiguous resource allocation may be supported.

The resource allocation type 0 for an uplink transmission may follow similar procedure to the resource allocation type 0 for an downlink transmission.

The resource allocation type 2 may be used to indicate an interlaced resource allocation, wherein M is a number of interlaces. For example, a frequency domain resource allocation field may comprise a RIV. For the RIV between 0 and M (M+1)/2 (e.g., 0<=RIV<M(M+1)/2), the RIV may indicate a starting interlace index m_0 and a number of contiguous interlace indices L (L>=1). For example, when (L−1)<=floor (M/2), the RIV may define M (L−1)+m_0. Otherwise, the RIV may define M (M−L+1)+(M−1−m_0). For the RIV larger than or equal to M(M+1)/2 (e.g., RIV>=M(M+1)/2), the RIV may indicate a starting interlace index m_0 and a set of values 1 based on one or more set of values. For example, an entry may represent {RIV−M(M+1)/2, m_0, 1}. For example, the one or more set of values may comprise {0, 0, {0, 5}}, {1, 0, {0, 1, 5, 6}}, {2, 1, {0, 5}}, {3, 1, {0, 1, 3, 5, 6, 7, 8}}, {4, 2, {0, 5}}, {5, 2, {0, 1, 2, 5, 6, 7}}, {6, 3, {0, 5}}, and/or {7, 4, {0, 5}}.

Resource allocation type and mechanism based on a DCI may be also applied to a configured grant configuration or semi-persistent scheduling configuration.

In an example, a base station may transmit a DCI. The DCI may comprise a time domain resource allocation field. A value of the time domain resource allocation field (e.g., m) may indicate a row index m+1 of a time domain resource allocation lists/a time domain resource allocation table. The base station may transmit configuration parameters indicating one or more time domain resource allocation tables. For example, a first time domain resource allocation table may be used for a fallback DCI format scheduled via a CSS. For example, a second time domain resource allocation table may be used for a fallback DCI format and/or a non-fallback DCI format via a USS. The wireless device may determine a time domain resource allocation table from the one or more time domain resource allocation tables for the DCI in response to receiving the DCI. The configuration parameters may comprise one or more time domain resource allocation entries for a time domain resource allocation table. One time domain resource allocation entry may comprise a starting and a length indicator value (SLIV), a PUSCH mapping type, and K2 value. The K2 may represent a scheduling offset between a scheduling DCI of a PUSCH and a starting slot index of the PUSCH. The one time domain resource allocation (TDRA) entry may comprise a repetition number (numberOfRepetitions). The one TDRA entry may comprise a starting symbol (startSymbol) and a length addition to the SLIV. For a PUSCH, scheduled by a non-fallback DCI format such as DCI format 0_1, a base station may transmit, to a wireless device, configuration parameters indicating PUSCHRepTypeIndicator-ForDCIFormat0_1 to 'puschRepTypeB' indicating a repetition type B. In response to being configured with 'puschRepTypeB', the wireless device may determine a resource based on a procedure for the repetition type B and a time domain resource allocation field of a DCI based on the DCI format 0_1. Similarly, the configuration parameters may comprise PUSCHRepTypeIndicator-ForDCIformat0_2 to 'puschRepTypeB' to apply the repetition type B for a second DCI based on a DCI format 0_2. When the base station may not configure PUSCHRepTypeIndicaor-ForDCIFormat0_1 indicating 'puschRepTypeB', the wireless device may determine a time domain resource based on a DCI based on a repetition type A.

For example, when the repetition type A is configured/enabled, the wireless device may determine a starting symbol S in a starting slot and a number of consecutive symbols L from the starting symbol S based on a SLIV value. For example, the SLIV value may define SLIV=14*(L−1)+S when (L−1) is smaller than or equal to 7 (half slot based on a normal CP). The SLF value may define SLIV=14*(14−L+1)+(14−1−S) when (L−1) is larger than 7. For example, L would be greater than 0, and may be smaller than or equal to 14−S. In an uplink BWP with an extended CP, 12 OFDM symbols may be assumed for a slot. A SLIV value may be determined by 12*(L−1)+S or 12*(12−L+1)+(14−1−S) respectively based on L−1 being smaller than/equal to 6 or larger than 6. For the repetition type A, the configuration parameters may comprise/indicate a TypeA or Type B for a PUSCH mapping type. For example, the base station may determine a first OFDM symbol comprising a DM-RS based on a fixed location (e.g., a first symbol of a slot) when the TypeA is configured for the PUSCH mapping type. For example, the base station may determine a first OFDM symbol comprising a DM-RS based on a starting OFDM symbol of the PUSCH in response to the typeB being configured for the PUSCH mapping type.

For example, when the repetition type B is configured/enabled, the wireless device may determine a starting OFDM symbol S in a starting slot, and a number of consecutive OFDM symbols L based on a row of a time domain resource allocation table. For example, the row of the time domain resource allocation table may comprise startSymbol for the starting OFDM symbol S and length for the number of consecutive OFDM symbols L. For the repetition type B, the wireless device may assume that the TypeB is configured for the PUSCH mapping type. For example, when a TypeA is configured for a PUSCH mapping type, a staring OFDM symbol S, a length L, and S+L may represent one or more values. For example, {S, L, S+L} may be {0, {4, . . . , 14}, {4, . . . , 14}} for a normal CP, and {0, {4, . . . , 12}, {4, . . . , 12}} for an extended CP. When a TypeB is configured for the PUSCH mapping type, {S, L, S+L} may be {{0, . . . , 13}, {1, . . . , 14}, {1, . . . , 14} for a repetition type A, {1, . . . , 27} fora repetition type B} for the normal CP, and {{0, . . . , 11}, {1, . . . , 12}, {1, . . . , 12}} for the extended CP.

For a repetition type A, a wireless device may determine a repetition number K based on a row of a time domain resource allocation table. The row may comprise a number of repetitions. The wireless device may determine based on an RRC parameter, 'pusch-AggregationFactor' when the row may not comprise the number of repetitions. The wireless device may determine a single transmission based on the row may not comprise the number of repetitions nor the 'pusch-AggregationFactor' is not configured. The wireless device may determine the single transmission for a PUSCH scheduled by a fallback DCI such as a DCI format 0_0.

For a repetition type A with a repetition number K being larger than 1, a wireless device may apply a starting OFDM symbol S and a length L in a slot across K consecutive slots based on a single transmission layer. The wireless device may repeat a TB across the K consecutive slots applying same OFDM symbols in each slot. A redundancy version (RV) applied on a i-th transmission of the K consecutive slots may be determined based on a repetition type. For example, when a RV value indicated by a DCI is 0, a second RV value for i-th transmission occasion (when a repetition type A is configured) or i-th actual repetition (when a repetition type B is configured) may be determined as 0 for i mod 4=0, 2 for i mod 4=1, 3 for i mod 4=2, 4 for i mod 4=3. When the RV value is 2, the second RV value may be determined as 2 for i mod 4=0, 3 for i mod 4=1, 1 for i mod 4=2, 0 for i mod 4=3. When the RV value is 3, the second RV value may be determined as 3 for i mod 4=0, 1 for i mod 4=1, 0 for i mod 4=2, 0 for i mod 4=2. When the RV value is 1, the second RV value may be determined as 1 for i mod 4=0, 0 for i mod 4=1, 2 for i mod 4=2, 3 for i mod 4=3.

For a repetition type A, a PUSCH transmission of a slot over a plurality of slots may be omitted when the slot may not have a sufficient number of uplink OFDM symbols for the PUSCH transmission. For a repetition type B, a wireless device may determine one or more slots for a number of nominal repetition number N. For a i-th nominal repetition, wherein i is 0, . . . , N−1, wherein N may be configured by a base station via an RRC signaling or a time domain resource allocation of a DCI. The wireless device may determine a slot. The i-th nominal repetition may start, wherein a slot index would be Ks+floor ((S+iL)/N_slot_symbol), and a starting symbol in the slot may be given by mod (S+iL, N_slot_symbol). The N_slot_symbol may be 14 with a normal CP and 12 with an extended CP. The S may represent a starting OFDM symbol indicated by a time domain resource allocation field of a DCI and L may represent a length indicated by the time domain resource allocation field of the DCI. The wireless device may determine a second slot wherein the i-th nominal repetition may end wherein a second slot index of the second slot may be determined as Ks+floor ((S+(i+1)*L−1)/N_slot_symbol), and an ending symbol in the second slot may be determined as mod (S+(i+1)*L−1, N_slot_symbol). The Ks may be determined as a starting slot indicated by the time domain resource allocation field of the DCI.

When the wireless device is configured with the repetition type B, the wireless device may determine invalid OFDM symbol for PUSCH repetitions based on a tdd-UL-DL-ConfigurationCommon/a tdd-UL-DL-ConfigurationDedicated and/or an InvalidSymbolPattern indicated by an RRC signaling. For example, the wireless device may determine a downlink symbol based on the tdd-UL-DL-ConfigurationCommon or the tdd-UL-DL-ConfigurationDedicated as an invalid OFDM symbol for the repetition type B. The base station may transmit the InvalidSymbolPattern, a bitmap of OFDM symbols over one slot or two slots. A bit of the bitmap may indicate '1' to invalidate a corresponding OFDM symbol. The base station may further configure periodicityAndPattern. A bit of the periodicityAndPattern may correspond to a unit equal to a duration of the bitmap of the InvalidSymbolPattern. The wireless device may determine invalid OFDM symbol(s) based on the InvalidSymbolPattern and the periodicityAndPattern. For example, when a PUSCH is scheduled/activated by a non-fallback DCI format such as a DCI format 0_1/0_2 and InvalidSymbolPatternIndicator-ForDCIFormat0_1/0_2 is configured, a invalid symbol pattern indicator field may indicate 1, the wireless device may apply an invalid symbol pattern (e.g., InvalidSymbolPattern). Otherwise, the wireless device may not apply the invalid symbol pattern. When the InvalidSymbolPatternIndicator-ForDCIFormat0_1/0_2 is not configured, the wireless device may not apply the invalid symbol pattern. The wireless device may determine remaining OFDM symbols. The remaining OFDM symbols may not comprise invalid OFDM symbol(s), the wireless device may consider the remaining OFDM symbols as valid OFDM symbols. When there is a sufficient number of valid OFDM symbols in a slot to transmit a PUSCH based on a scheduling DCI, the wireless device may determine an actual repetition of a slot wherein the slot may have consecutive sufficient valid consecutive OFDM symbols. The wireless device may skip the actual repetition based on a slot formation indication. The wireless device may apply a redundancy version based on the actual repetition.

In an example, a row of a time domain resource allocation may comprise one or more resource assignments for one or more contiguous PUSCHs. A K2 of the row may indicate a first PSCH of the one or more contiguous PUSCHs. Each PUSCH of the one or more contiguous PUSCHs may be indicated/scheduled with a separate SLIV value and a PUSCH mapping type.

FIG. 21A and FIG. 21B illustrate examples of TypeA repetition for an uplink transmission as per an aspect of an example embodiment of the present disclosure. FIG. 21A illustrates a TypeA PUSCH mapping type for a PUSCH repetition. FIG. 21B illustrates a TypeA PUCCH mapping type for a PUCCH repetition. TypeA repetition may be called as a slot aggregation.

For example, FIG. 21A and FIG. 21B may illustrate 4 times of repetition. The wireless device may determine four PUSCHs (in FIG. 21A) or four PUCCHs (in FIG. 21B), where a set of OFDM symbols in each slot of four slots is identical. For example, slot n+2 may be a downlink slot. The wireless device may drop a third PUSCH or PUCCH in the slot n+2. A resource in each slot may be referred as a PUSCH resource of the slot or a PUCCH resource of the slot. The resource in each slot may be identical in a time domain (e.g., a same set of OFDM symbols in a slot) and may or may not be same in a frequency domain based on a hopping pattern. For example, when hopping is not used/enabled, the resource may be identical in each slot in the frequency domain. When hoping is enabled/used, the resource may be different (based on a hopping offset) in each slot.

Figure 22A:
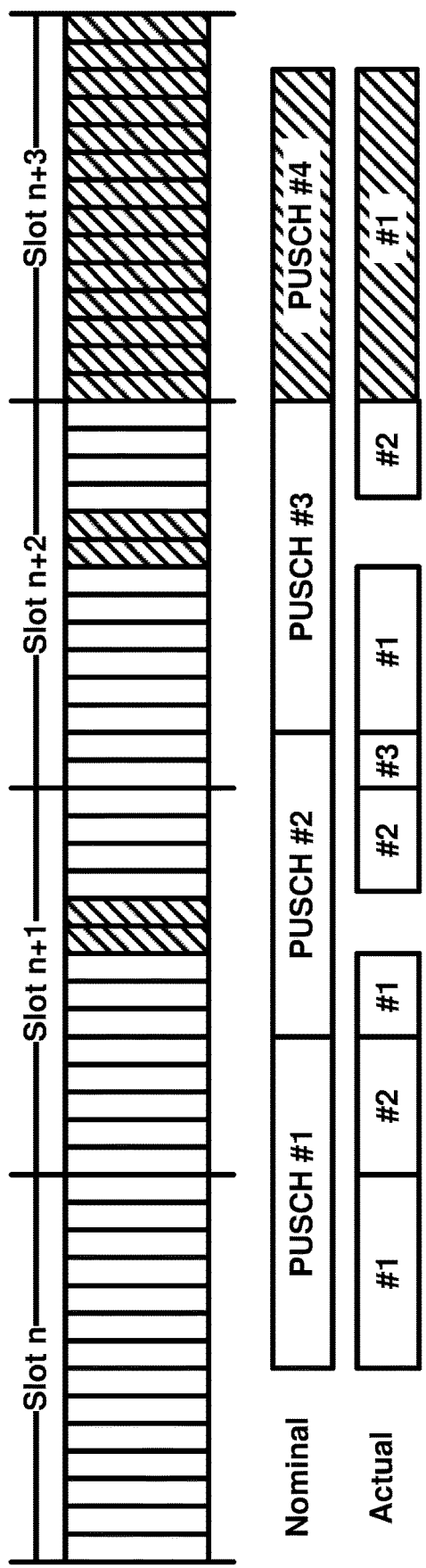
FIG. 22A illustrates TypeB repetition for an uplink transmission as per an aspect of an example embodiment of the present disclosure.
Figure 22B:
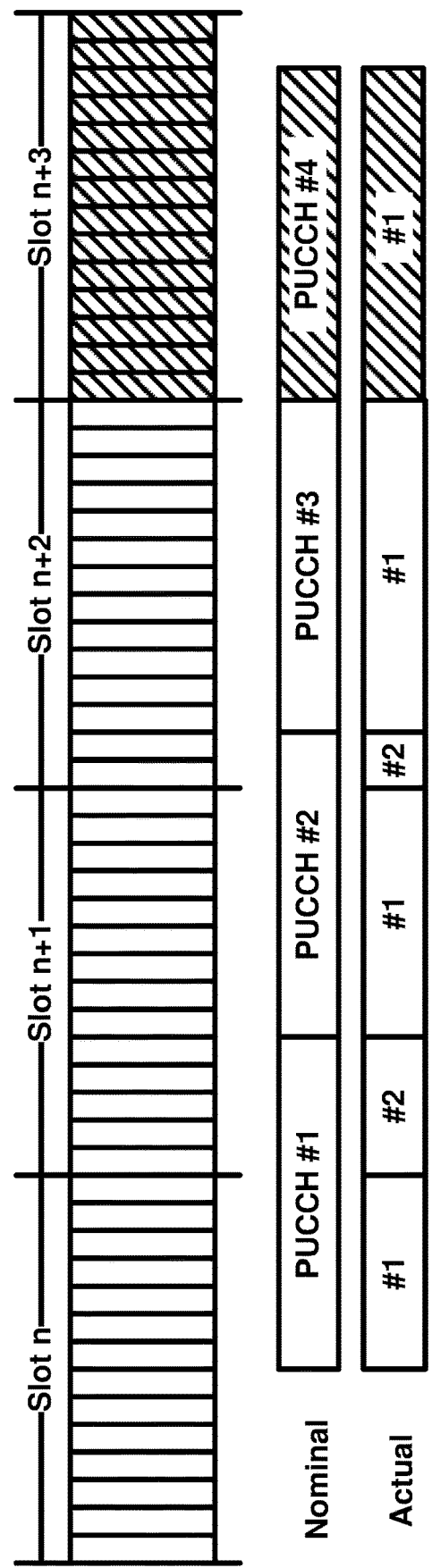
FIG. 22B illustrates TypeB repetition for an uplink transmission as per an aspect of an example embodiment of the present disclosure.

FIG. 22A and FIG. 22B illustrate examples of typeB repetition for an uplink transmission as per an aspect of an example embodiment of the present disclosure. FIG. 21A illustrates a TypeB PUSCH mapping type for a PUSCH repetition. FIG. 21B illustrates a TypeB PUCCH mapping type for a PUCCH repetition. TypeB repetition may be called as an enhanced uplink repetition.

For example, FIG. 22A and FIG. 22B may illustrate 4 times of nominal repetition. The wireless device may determine four nominal PUSCHs (in FIG. 22A) or four nominal PUCCHs (in FIG. 22B), where a number of OFDM symbols in each nominal repetition may be identical. Within each nominal repetition, the wireless device may determine one or more actual repetition (if any). For example, the wireless device may not determine any actual repetition in a slot n+3 wherein the slot n+3 is a downlink slot. In a first nominal PUSCH repetition or PUCCH repetition (PUSCH #1 or PUCCH #1), the wireless device may determine two actual repetitions (#1 and #2). The wireless device may determine to end an actual repetition in response to a slot boundary or an unavailable symbol. The wireless device may determine three actual repetitions for a second PUSCH.

In FIG. 22A, the wireless device may determine two OFDM symbols of the slot n+1 are unknown or unavailable or downlink. The wireless device may split a first actual repetition (#1) of the second nominal repetition and a second actual repetition (#2) of the second nominal repetition around the two OFDM symbols. The two OFDM symbols may be indicated by a scheduling uplink grant.

In FIG. 22A, the wireless device may determine two actual repetition of a third nominal repetition based on unavailable/downlink OFDM symbols in the middle of slot n+2. The wireless device may determine one actual repetition of a fourth nominal repetition, which may be dropped due to the slot 4 being a downlink slot.

In FIG. 22B, the wireless device may determine two actual repetitions for a first PUCCH nominal repetition, two actual repetitions for a second PUCCH nominal repetition, one actual repetition for a third PUCCH nominal repetition, and drop a fourth nominal repetition. The wireless device may drop the fourth nominal repetition in response to the slot n+4 being a downlink slot.

A similar mechanism may be used to schedule a time domain resource for a downlink data.

In an example, a carrier or a cell (e.g., an uplink carrier/cell or a downlink carrier/cell) may comprise a plurality of resource blocks (RBs). A resource block may comprise a set of subcarriers (e.g., 1 RB=12 subcarriers). The carrier may be configured with one or more uplink BWPs. An uplink BWP may comprise a plurality of consecutive RBs and a numerology. A wireless device may transmit a TB via the carrier, whereas the wireless device may transmit a part of TB (e.g., a modulation symbol) via a subcarrier.

In an example, a wireless device may transmit a first PUSCH of a TB via a first uplink carrier/cell and a second PUSCH of the TB via the second uplink carrier/cell simultaneously based on the first uplink carrier may operate in a first frequency range and the second uplink (UL) carrier may operate in a second frequency range. For example, a wireless device may receive a first PDSCH of a TB via a first downlink (DL) carrier/cell and a second PDSCH of the TB via the second downlink carrier/cell simultaneously based on the first downlink carrier may operate in a first frequency range and the second downlink carrier may operate in a second frequency range. For example, the first frequency range may be different from the second frequency range. The first frequency range may belong to a frequency range 1, a frequency range 2 or a frequency range 3. The second frequency range may belong to the frequency range 1, the frequency range 2 or the frequency range 3.

For example, the first UL carrier may be a non-supplemental uplink carrier of a cell and the second UL carrier may be a supplemental uplink carrier of the cell. For example, the first uplink carrier is associated with a first uplink panel and/or a first transmission and reception point (TRP) (e.g., a first coreset pool, a first coreset group) of the cell, and the second uplink carrier is associated with a second uplink panel and/or a second TRP (e.g., a second coreset pool, a second coreset group) of the cell. The first UL carrier may be associated with a first cell. The second UL carrier may be associated with a second cell. The first cell and the second cell may be different. For example, the first DL carrier may be a non-supplemental downlink carrier of a cell and the second DL carrier may be a supplemental downlink carrier of the cell. For example, the first downlink carrier is associated with a first uplink panel and/or a first transmission and reception point (TRP) (e.g., a first coreset pool, a first coreset group) of the cell, and the second downlink carrier is associated with a second uplink panel and/or a second TRP (e.g., a second coreset pool, a second coreset group) of the cell. The first DL carrier may be associated with a first cell. The second DL carrier may be associated with a second cell. The first cell and the second cell may be different.

In the specification, a first uplink signal is associated with a TRP in response to a TCI state used for the first uplink signal is associated with/configured with the TRP. The uplink signal is associated with a TRP may correspond to the uplink signal is associated with a panel, a coreset pool or a group associated with the TRP.

In an example, a base station may transmit one or more RRC messages comprising/indicating configuration parameters. The configuration parameters may indicate/comprise an invalid symbol pattern (e.g., InvalidSymbolPattern). The invalid symbol pattern may comprise a bitmap of one slot or two slots and/or a periodicity (e.g., one value of 2 slots, 4 slots, 5 slots, 8 slots, 10 slots, 20 slots, and 40 slots). The wireless device may determine one or more unavailable (OFDM) symbols for each slot based on the invalid slot pattern when the configuration parameters comprises the invalid symbol pattern and an uplink grant scheduling a TypeB repetition or a PUSCH repetition may indicate to use/enable the invalid symbol pattern (e.g., 1 (or 0 or a predetermined value) is indicated in an invalid symbol pattern indicator field of a DCI format 0_1 or a DCI format 0_2).

For example, a field of invalid symbol pattern indictor of a DCI format 0_2 (or a DCI format 0_1) shown in FIG. 19 may indicate to enable or use the invalid symbol pattern for one or more PUSCHs scheduled via an uplink grant based on the DCI format 0_2 (or the DCI format 0_1). A bitmap of the slot or two slots may be repeated based on the periodicity information. If the periodicity is given, one shot of applying the bitmap starting slot of the PUSCH repetition may be determined.

In existing mechanisms, a single invalid symbol pattern may be configured for an uplink carrier/serving cell. When a wireless device receives an uplink grant scheduling a plurality of PUSCHs associated with a plurality of TRPs, based on the existing mechanisms, the wireless device may apply the single invalid symbol pattern for one or more first PUSCHs associated with a first TRP of the plurality of TRPs and for one or more second PUSCHs associated with a second TRP of the plurality of TRPs. Existing mechanisms may lead unnecessary resource waste for example for the one or more second PUSCHs, when the single invalid symbol pattern may be configured based on the first TRP.

In an example, a base station may configure a first invalid symbol pattern for the first TRP. The base station may configure a second invalid pattern for the second TRP. This may increase flexibility of configuration of invalid symbol patterns, and may reduce resource waste and unnecessary segmentation of a nominal PUSCH to a plurality of actual PUSCHs.

In existing technologies, a DCI comprises a frequency domain resource assignment and a time domain resource assignment for a plurality of PUSCHs based on a TypeB repetition. For example, the DCI may indicate one or mor resource blocks of the frequency resource assignment of an uplink BWP for the plurality of PUSCHs. The DCI may indicate one or more OFDM symbols (e.g., a starting OFDM symbol and a duration) in a slot for the time domain resource assignment. The wireless device may determine a frequency resource of a PUSCH of the plurality of PUSCHs based on the frequency domain resource assignment and a hopping pattern. The wireless device may determine a time resource of the PUSCH based on the time domain resource assignment. The wireless device may determine resources of the plurality of PUSCHs in consecutive symbols in a time domain.

Existing technologies may not allow a TRP/panel switching latency between a first PUSCH associated with a first TRP and a second PUSCH associated with a second TRP. The first PUSCH and the second PUSCH may occur consecutively in time domain and belong to the plurality of PUSCHs of a PUSCH repetition. Existing technologies may lead overlapping between the first PUSCH and the second PUSCH for example when a first timing advance (TA) value for the first PUSCH is smaller than a second TA value for the second PUSCH. Existing technologies may lead biases unavailable symbols between one or more first PUSCHs associated with the first TRP and one or more second PUSCHs associated with the second TRP. Enhancements to handle inter-TRP repetition may be needed.

In an example, a base station may transmit one or more RRC messages comprising/indicating configuration parameters. The configuration parameters may comprise/indicate a gap (e.g., an offset, a scheduling gap, a scheduling offset) between one or more PUSCHs associated with a first TRP and one or more PUSCHs associated with a second TRP. The gap may be used for a first uplink signal associated with the first TRP and a second uplink signal associated with the second TRP.

For example, the base station may transmit an UL grant scheduling a plurality of PUSCHs comprising the one or more PUSCHs and the one or more second PUSCHs, based on a TypeB repetition. The wireless device may add a gap between a first PUSCH of the first TRP and a second PUSCH of the second TRP. The wireless device may determine resources of the plurality of PUSCHs based on the uplink grant and the gap.

In an example, the wireless device may determine resources of the one or more first PUSCHs based on a time domain resource assignment indicated by the uplink grant. The wireless device may determine resources of the one or more second PUSCHs starting in a slot based on the time domain resource assignment. The wireless device may determine the slot that is a next slot of a first slot, where the wireless device may have a latest PUSCH of the one or more first PUSCHs. For example, the wireless device may determine resources of the one or more first PUSCHs first and then determine resources of the one or more second PUSCHs where the one or more second PUSCHs occur after the one or more first PUSCHs.

For example, a wireless device may be scheduled with a first PUSCH (or PUCCH) associated with the first TRP. The wireless device may be scheduled with a second PUCCH (or PUSCH) associated with the second TRP. When a difference/time duration between a last symbol of the first PUSCH and a first symbol of the second PUCCH is smaller than the gap, the wireless device may consider the first PUSCH and the second PUCCH are overlapped. The wireless device may determine to drop the first PUSCH or the second PUCCH.

Example embodiments may allow a gap to absorb a TRP/panel switching latency. Embodiments may allow balanced distribution of unavailable symbols across the one or more first PUSCHs and the one or more second PUSCHs. Embodiments may allow to prioritize/determine uplink signals (e.g., select one uplink signal) considering a switching latency where uplink signals may not overlap in time but the wireless device may not be capable of transmitting the uplink signals due to the switching latency.

In an example, a wireless device may be scheduled with a first uplink signal via a first carrier, where the first uplink signal is associated with a first TRP/panel. The wireless device may be scheduled with a second uplink signal via a second carrier, where the second uplink signal is associated with a second TRP/panel. In existing technologies, the wireless device may be required to support simultaneous transmission of the first uplink signal transmission and the second uplink signal transmission. This may increase a complexity of the wireless device. This may increase power consumption of the wireless device.

In an example, the wireless device may or may not support the first uplink signal transmission simultaneously with the second uplink signal transmission in response to the first TRP/panel being different from the second TRP/panel. When the wireless device may not support a simultaneous transmission of the first uplink signal and the second uplink signal when the first uplink signal and the second uplink signals are associated with different TRP/panels, the wireless device may determine to drop the first uplink signal or the second uplink signal based on a rule. For example, the rule may be based on a priority (e.g., compare a first priority of the first uplink signal and a second priority of the second uplink signal). For example, the rule may be based on a cell index.

Example embodiments may reduce a complexity of the wireless device. They may reduce scheduling constraints of the base station in scheduling resources.

In existing technologies, an uplink grant, scheduling a plurality of PUSCHs, may comprise an index of one or more TCIs, where a TCI of the one or more TCIs may comprise a first TCI state and a second TCI state. The first TCI state may be one of one or more first TCI states associated with a first TRP/panel. The second TCI state may be one of one or more second TCI states associated with a second TRP/panel. Based on the uplink grant, the wireless device may update a first uplink TCI state (e.g., an uplink common beam for the first TRP) based on the first TCI state. The wireless device may update a second uplink TCI state (e.g., an uplink common beam for the second TRP) based on the second TCI state. Based on existing technologies, the wireless device may not determine whether the uplink grant schedules the plurality of PUSCHs associated with a single TRP (e.g., the first TRP or the second TRP) or associated with a plurality of TRPs. Enhancements are needed.

In an example, a base station may transmit an uplink grant comprising a first field and a second field. The first field may indicate a TCI of one or more TCIs, where the TCI may comprise a first TCI state for a first uplink TCI state (e.g., for a first TRP) and a second TCI state for a second uplink TCI state (e.g., for a second TRP). The second field may indicate whether a plurality of PUSCHs may be scheduled via a first TRP only, a second TRP only or both the first TRP and the second TRP. Example embodiments may allow a common beam update of the plurality of TRPs and flexibly indicate a PUSCH repetition based on a single uplink grant.

In an example, a base station may transmit one or more RRC messages comprising/indicating configuration parameters. The configuration parameters may indicate/comprise an invalid symbol pattern (e.g., InvalidSymbolPattern). The invalid symbol pattern may comprise a bitmap of one slot or two slots and/or a periodicity (e.g., one value of 2 slots, 4 slots, 5 slots, 8 slots, 10 slots, 20 slots, and 40 slots). The wireless device may determine one or more unavailable (OFDM) symbols for each slot based on the invalid slot pattern when the configuration parameters comprises the invalid symbol pattern and an uplink grant scheduling a TypeB repetition or a PUSCH repetition may indicate to use/enable the invalid symbol pattern (e.g., 1 (or 0 or a predetermined value) is indicated in an invalid symbol pattern indicator field of a DCI format 0_1 or a DCI format 0_2).

For example, a field of invalid symbol pattern indictor of a DCI format 0_2 (or a DCI format 0_1) shown in FIG. 19 may indicate to enable or use the invalid symbol pattern for one or more PUSCHs scheduled via an uplink grant based on the DCI format 0_2 (or the DCI format 0_1). A bitmap of the slot or two slots may be repeated based on the periodicity information. If the periodicity is given, one shot of applying the bitmap starting slot of the PUSCH repetition may be determined.

When a PUSCH repetition is scheduled via a plurality of TRPs/coreset pools/panels/groups, the configuration parameters may comprise/indicate a first invalid symbol pattern for a first TRP/coreset pool/panel/group of the plurality of TRPs/coreset pools/panels/groups. The configuration parameters may comprise/indicate a second invalid symbol pattern for a second TRP/coreset pool/panel/group of the plurality of TRPs/coreset pools/panels/groups. When an uplink grant based on a DCI format 0_1 or a DCI format 0_2 comprises/indicates to use/enable an invalid symbol pattern (e.g., set to a predetermined value) for a field of invalid symbol indicator of the DCI format 0_1 or the DCI format 0_2), the wireless device may determine/apply one or more first unavailable symbols of one or more first PUSCHs of the PUSCH repetition based on the first invalid symbol pattern. The one or more first PUSCHs may be scheduled via/associated with the first TRP/coreset pool/panel/group of the plurality of TRPs/coreset pools/panels/groups. The wireless device may determine the one or more first unavailable symbols based on a staring slot of the one or more first PUSCHs in response to a periodicity is not given for the first invalid symbol pattern.

Similarly, the wireless device may determine/apply one or more second unavailable symbols of one or more second PUSCHs of the PUSCH repetition based on the second invalid symbol pattern. The one or more second PUSCHs may be scheduled via/associated with the second TRP/coreset pool/panel/group of the plurality of TRPs/coreset pools/panels/groups. The wireless device may determine the one or more second unavailable symbols based on a staring slot of the one or more second PUSCHs in response to a periodicity is not given for the second invalid symbol pattern.

In an example, an uplink grant of a plurality of PUSCHs via a plurality of TRPs may comprise a first DCI field/bit and a second DCI field/bit. The first DCI field/bit may indicate enabling/disabling of a first unavailable symbol pattern for a first TRP of the plurality of TRPs. The second DCI field/bit may indicate enabling/disabling of a second unavailable symbol pattern for a second TRP of the plurality of TRPs. Example embodiments may allow flexible configuration of invalid symbol pattern(s) for each TRP.

In an example, the configuration parameters may comprise a single unavailable symbol pattern for a cell regardless of whether the cell is associated with a plurality of TRPs or a single TRP. The wireless device may receive an uplink grant indicating enabling the single unavailable symbol pattern and indicating a plurality of PUSCHs associated with the plurality of TRPs. The wireless device may apply the single unavailable symbol pattern for one or more first PUSCHs of the plurality of PUSCHs. The wireless device may apply the single unavailable symbol pattern for one or more second PUSCHs of the plurality of PUSCHs. The one or more first PUSCHs may be associated with a first TRP of the plurality of TRPs. The one or more second PUSCHs may be associated with a second TRP of the plurality of TRPs. This may reduce signaling overhead.

In an example, the wireless device may apply the single unavailable symbol pattern for the first TRP (e.g., for the one or more first PUSCHs).

In an example, the configuration parameters may indicate whether to apply the single unavailable symbol pattern for a first TRP only, a second TRP only or both the first TRP and the second TRP. Based on the configuration, the wireless device may determine the unavailable symbol pattern for the first TRP only (e.g., the one or more first PUSCHs), for the second TRP only (e.g., the one or more second PUSCHs) or for both TRPs (e.g., the plurality of PUSCHs).

In an example, an uplink grant may indicate (e.g., via a DCI field, via a plurality of DCI fields, via a plurality of bits) whether to apply the single unavailable symbol pattern for a first TRP only, a second TRP only or both the first TRP and the second TRP. Based on the uplink grant, the wireless device may determine the unavailable symbol pattern for the first TRP only (e.g., the one or more first PUSCHs), for the second TRP only (e.g., the one or more second PUSCHs) or for both TRPs (e.g., the plurality of PUSCHs). This may reduce signaling overhead and may not cause ambiguity for the second TRP.

Example embodiments allow a flexible configuration of one or more invalid patterns for each TRP/panel/coreset group/coreset pool/group when a wireless device is configured with a plurality of TRPs/panels/coreset groups/coreset pools/groups.

In an example, a wireless device may transmit one or more RRC messages. The one or more RRC messages may comprise/indicate a minimum gap (e.g., a number of OFDM symbols, a duration in msec or a duration in a time unit) that the wireless device may require to switch from a first TRP/panel to a second TRP/panel between two consecutive uplink transmissions. For example, the minimum gap may comprise a beam/panel switching/activation latency. For example, the minimum gap may comprise a timing advance adjustment. For example, the minimum gap may comprise a power adjustment latency. For example, the minimum gap may comprise a power transient period/gap between two TRPs/panels.

For example, a first transmission power of one or more PUSCHs associated with the first TRP/panel may be determined independently from a second transmission power of one or more second PSCHs associated with the second TRP/panel. With potentially different transmission power between the first transmission power and the second transmission power, the power transient period between two transmissions may be needed. A power transient period may be needed for a first uplink transmission of a first frequency and a second uplink transmission of a second frequency for example based on an inter-repetition frequency hopping.

A base station may transmit one or more RRC messages comprising/indicating configuration parameters. The configuration parameters may indicate/comprise a first gap (e.g., in terms of OFDM symbols, in terms of a time unit, in terms of a few msec, and/or the like). The first gap may be used for a TypeB PUSCH repetition and/or a Type A PUSCH repetition. The first gap may represent a minimum gap between a last symbol of a first uplink transmission associated with a first TRP/coreset pool/panel/group and a first symbol of a second uplink transmission associated with a second TRP/coreset pool/panel/group. The first uplink transmission and the second uplink transmission may belong to a PUSCH repetition. The first uplink transmission and the second uplink transmission may be scheduled by a single uplink grant. The first uplink transmission and the second uplink transmission may be scheduled via a plurality of DCIs. The first uplink transmission and the second uplink transmission may be transmitted via a plurality of uplink carriers/cells.

The wireless device may receive an uplink grant scheduling a plurality of PUSCHs comprising a first PUSCH and a second PUSCH. The first PUSCH may be associated with a first TRP. The second PUSCH may be associated with a second TRP. Resources of the plurality of PUSCHs may be determined based on a TypeB repetition. The wireless device may determine a starting OFDM symbol of the second PUSCH based on a time domain resource assignment of the uplink grant and the first gap.

The configuration parameters may comprise/indicate a second gap that may be used between a third uplink transmission of a TRP and a fourth uplink transmission of the TRP. The second gap may be used for a power transient period. The third uplink transmission and the fourth uplink transmission may belong to a PUSCH repetition. The third uplink transmission and the fourth uplink transmission may be scheduled by a single uplink grant. The third uplink transmission and the fourth uplink transmission may be scheduled via a plurality of DCIs. The third uplink transmission and the fourth uplink transmission may be transmitted via a plurality of uplink carriers/cells.

Figure 23:
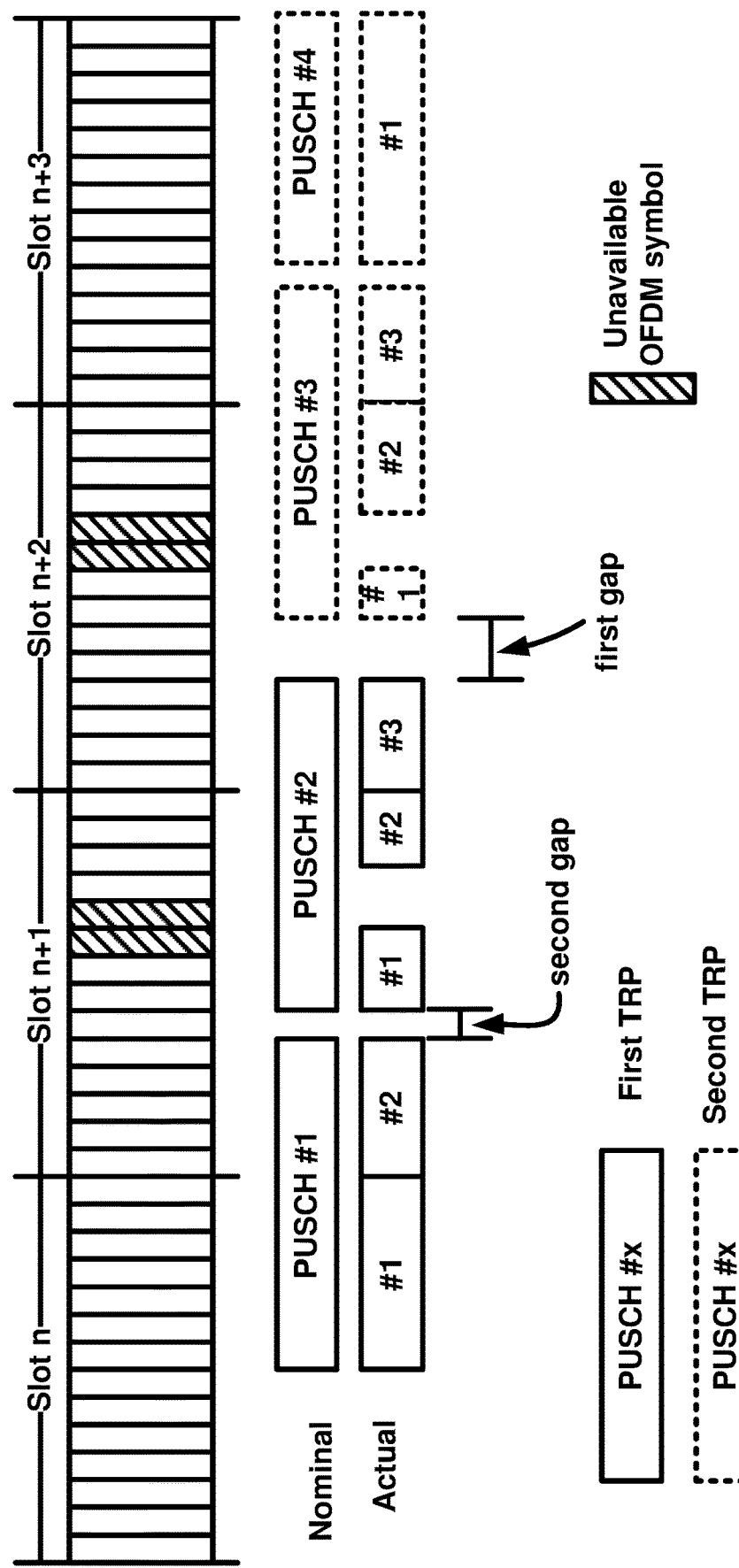
FIG. 23 illustrates a resource determination of a TypeB repetition based on a gap configuration as per an aspect of an example embodiment of the present disclosure.

FIG. 23 illustrates a resource determination of a TypeB repetition based on a gap configuration as per as per an aspect of an example embodiment of the present disclosure. For example, a wireless device may be scheduled with a PUSCH repetition based on a TypeB repetition (or a TypeB PUSCH resource mapping type, a TypeB PUSCH repetition, an enhanced repetition mapping). An uplink grant scheduling the PUSCH repetition may indicate a starting OFDM symbol in a slot n as 8-th OFDM symbol with a duration of 12 OFDM symbols. Based on the TypeB repetition without a gap, the wireless device may determine a first PUSCH from $8^{th}$ OFDM symbol of slot n to $5^{th}$ OFDM symbol of slot n+1, a second PUSCH from $6^{th}$ OFDM symbol of slot n+1 to $3^{rd}$ OFDM symbol of slot n+2, a third PUSCH from $4^{th}$ OFDM symbol of slot n+2 to $1^{st}$ OFDM symbol of slot n+3, and a fourth PUSCH from $2^{nd}$ OFDM symbol of slot n+3 to 13rd OFDM symbol of slot n+3. The wireless device may determine consecutive resources for the plurality of PUSCHs, where each PUSCH of the plurality of PUSCHs may be referred as a nominal PUSCH.

FIG. 23 illustrates that the wireless device is configured with a first gap and a second gap. For example, the first gap may be two OFDM symbols. The second gap may be a OFDM symbol. The wireless device may determine a resource of the first (nominal) PUSCH based on a resource assignment of an uplink grant or based on a configured grant configuration. The wireless device may determine the first PUSCH from $8^{th}$ OFDM symbol of slot n to $5^{th}$ OFDM symbol of slot n+1. The first nominal PUSCH (PUSCH #1) may be segmented to two actual PUSCHs (#1 and #2). The wireless device may segment or end an actual PUSCH in response to a slot boundary or unavailable OFDM symbol. The wireless device may determine a first actual PUSCH ending at the slot boundary of slot n. The wireless device may end a second actual PUSCH ending at the end of the first nominal PUSCH.

The wireless device may determine a starting OFDM symbol of the second PUSCH after a last OFDM symbol of the first PUSCH and the second gap. The wireless device may apply the second gap between a first uplink signal of a TRP and a second uplink signal of the TRP. The wireless device may apply the second gap between the first uplink signal and the second uplink signal in response to a frequency hopping is applied between the first uplink signal and the second uplink signal. The wireless device may not apply the second gap when a first frequency location/resource of the first uplink signal is same to a second frequency location/resource of the second uplink signal.

FIG. 23 illustrates that the wireless device applies the second gap between the first PUSCH and the second PUSCH. The second PUSCH may start from $7^{th}$ OFDM symbol of slot n+1 to $4^{th}$ OFDM symbol of slot n+2. The first PUSCH and the second PUSCH are associated with the first TRP. The wireless device may determine a resource of the third PUSCH based on the first gap.

The wireless device may determine the third PUSCH from 7-th OFDM symbol of the slot n+2 to 4-th OFDM symbol of slot n+3. The wireless device may determine the fourth PUSCH from 6-th OFDM symbol of slot n+3 to $3^{rd}$ OFDM symbol of slot n+4 (not shown in FIG. 23).

The wireless device may segment the second nominal PUSCH (PUSCH #2) to three actual PUSCHs (#1, #2 and #3). A first actual of the second nominal PUSCH (#1) may end before unavailable OFDM symbols determined based on an unavailable symbol pattern. FIG. 23 shows that two symbols of slot n+1 (line-filled symbols) are unavailable and two symbols of slot n+2 are unavailable. A second actual PUSCH of the second nominal PUSCH may end at a slot boundary of slot n+1. A third actual PUSCH of the second nominal PUSCH may end at an end of the second nominal PUSCH.

Similarly, the third nominal PUSCH (PUSCH #3) may be split to three actual PUSCHs. The fourth nominal PUSCH (PUSCH #4) may be segmented/divided to two actual PUSCHs.

The wireless device may transmit the first actual PUSCH and the second actual PUSCH of the first nominal PUSCH based on a first TCI state of the first TRP. The wireless device may transmit three actual PUSCHs of the second nominal PUSCH via the first TCI state. The wireless device may transmit three actual PUSCHs of the third nominal PUSCH based on a second TCI state of the second TRP. The wireless device may transmit two actual PUSCHs of the fourth nominal PUSCH based on the second TCI state. Example embodiments allow switching latency with minimum gap between inter-TRP repetitions.

When the wireless device is scheduled with a plurality of PUSCHs based on a TypeA repetition (e.g., a same set of OFDM symbols in each slot may be used for the plurality of PUSCHs), the wireless device may skip a slot a gap between two consecutive PUSCHs may not be sufficient.

Figure 24:
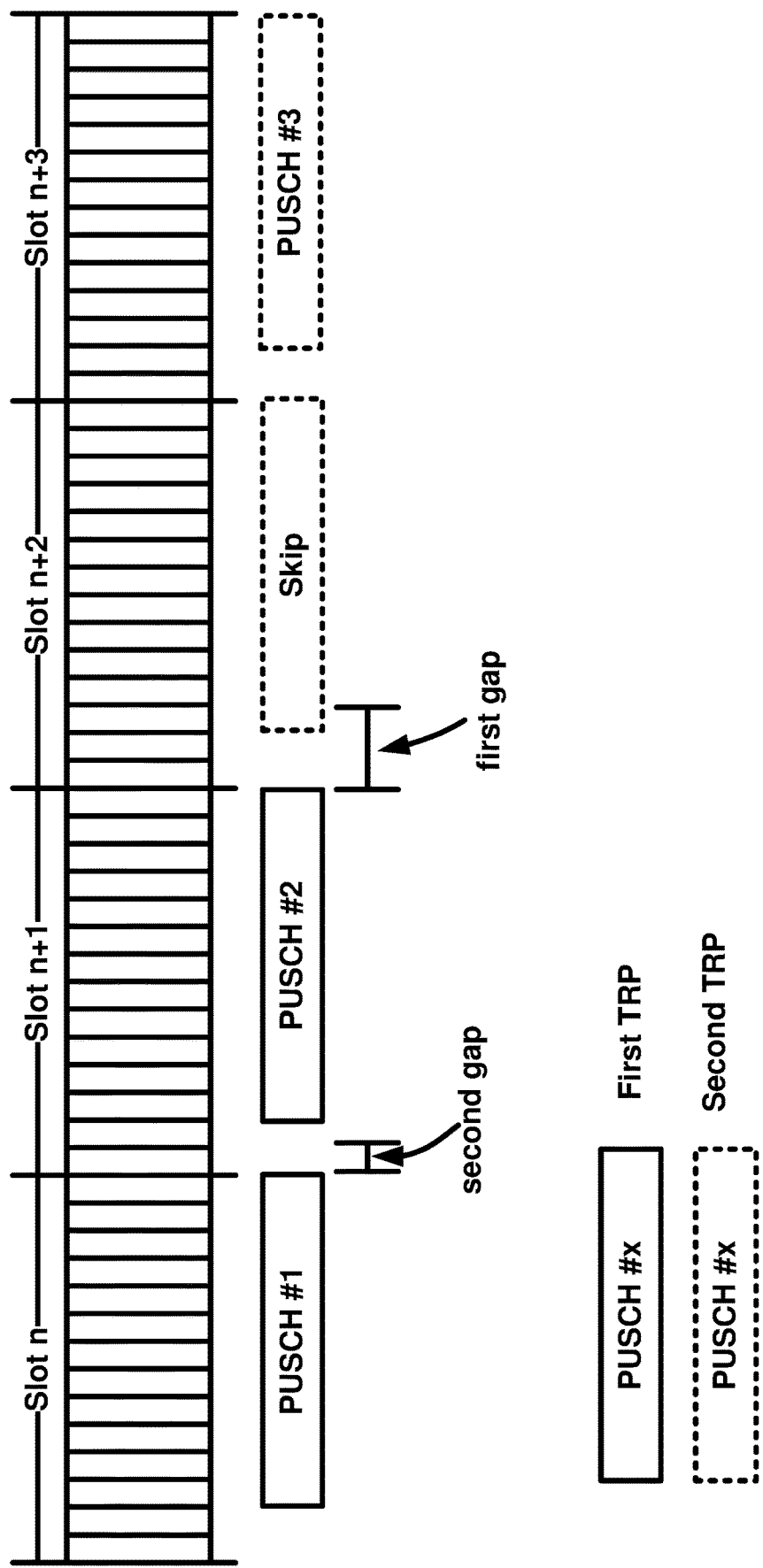
FIG. 24 illustrates a resource determination of a TypeA repetition based on a gap configuration as per an aspect of an example embodiment of the present disclosure.

FIG. 24 illustrates a resource determination of a TypeA repetition based on a gap configuration as per as per an aspect of an example embodiment of the present disclosure. For example, a wireless device is scheduled with a PUSCH repletion of four PUSCHs. A time domain resource assignment may comprise a resource between $3^{rd}$ OFDM symbol to $14^{th}$ OFDM symbol (e.g., a duration of 12 OFDM symbols). The wireless device is configured with a first gap (between inter-TRP PUSCHs) of three OFDM symbols. The wireless device is configured with a second gap (between intra-TRP PUSCHs across a frequency hop) of one OFDM symbol. The wireless device may determine a gap between a first PUSCH and a second PUSCH is sufficient to accommodate the second gap. The wireless device may determine a resource of the second PUSCH in the slot n+1 with a same set of OFDM symbols to the first PUSCH.

The wireless device may determine a gap between the second PUSCH and a potential resource of a third PUSCH may not be sufficient compared to the first gap (e.g., 2 OFDM symbols <=3 OFDM symbols). The wireless device may determine to skip the slot n+2 for mapping the third PUSCH. The wireless device may determine a resource in the slot n+3 with the same set of OFDM symbols to the first PUSCH for the third PUSCH. Though not shown in FIG. 24, the wireless device may determine a resource of a fourth PUSCH in slot n+4. Example embodiments allow a gap for a switching latency, timing advance offset and/or the like based on TypeA repetition.

In an example, a wireless device may determine a first gap (between inter-TRP PUSCH) based on a resource assignment. The wireless device may be scheduled with a plurality of PUSCHs comprising a first PUSCH and a second PUSCH. The first PUSCH may be associated with a first TRP. The second PUSCH may be associated with a second TRP.

A set of OFDM symbols in a slot allocated for the first PUSCH may be same to a set of OFDM symbols in a second slot allocated for the second PUSCH. The wireless device may determine a resource of the second PUSCH based on a time domain resource assignment indicated by an uplink grant or a configured grant configuration.

In an example, a wireless device may receive an uplink grant. The uplink grant may indicate a time domain resource assignment of a first nominal physical uplink shared channel (PUSCH). The uplink grant may indicate a number of repetitions. The uplink grant may further indicate one or more first PUSCHs based on a first transmission configuration indicator (TCI) state associated with a first transmission and reception point (TRP). The uplink grant may further indicate one or more second PUSCHs based on a second TCI state associated with a second TRP. The wireless device may determine a gap between last symbol of resources of the one or more PUSCHs and first symbol of resources of the one or more second PUSCHs. The one or more first PUSCHs may be followed by the one or more second PUSCHs in a time domain. The wireless device may determine a first index of first OFDM symbol of an earliest PUSCH of the one or more second PUSCHs based on the gap and a second index of first OFDM symbol of an earliest PUSCH of the one or more first PUSCHs.

The wireless device may determine a resource of the earliest PUSCH of the one or more second PUSCHs having a same set of symbols to the earliest PUSCH of the one or more first PUSCHs. The wireless device may transmit the one or more first PUSCHs based on the first TCI state. The wireless device may transmit the one or more second PUSCHs, occurring after the gap, based on the second TCI state.

According to an example embodiment, the first index may be same to the second index. The wireless device may transmit, to a base station, one or more first radio resource control (RRC) messages indicating a minimum gap. The wireless device may receive one or more second RRC messages indicating the gap that is equal to or larger than the minimum gap. The wireless device may determine the gap based on the gap configured by the one or more second RC messages.

According to an example embodiment, the wireless device may skip one or more one or more symbols between the last symbol of resources of the one or more PUSCHs and the first symbol of resources of the one or more second PUSCHs.

According to an example embodiment, the wireless device may determine a third index of first OFDM symbol of a next earliest PUSCH of the one or more second PUSCHs based on the gap and a fourth index of first OFDM symbol of a next earliest PUSCH of the one or more first PUSCHs. A similar mechanism may be applied to k-th earliest PUSCH of the one or more second PUSCHs based on the gap and k-th earliest PUSCH of the one or more first PUSCHs.

Figure 25:
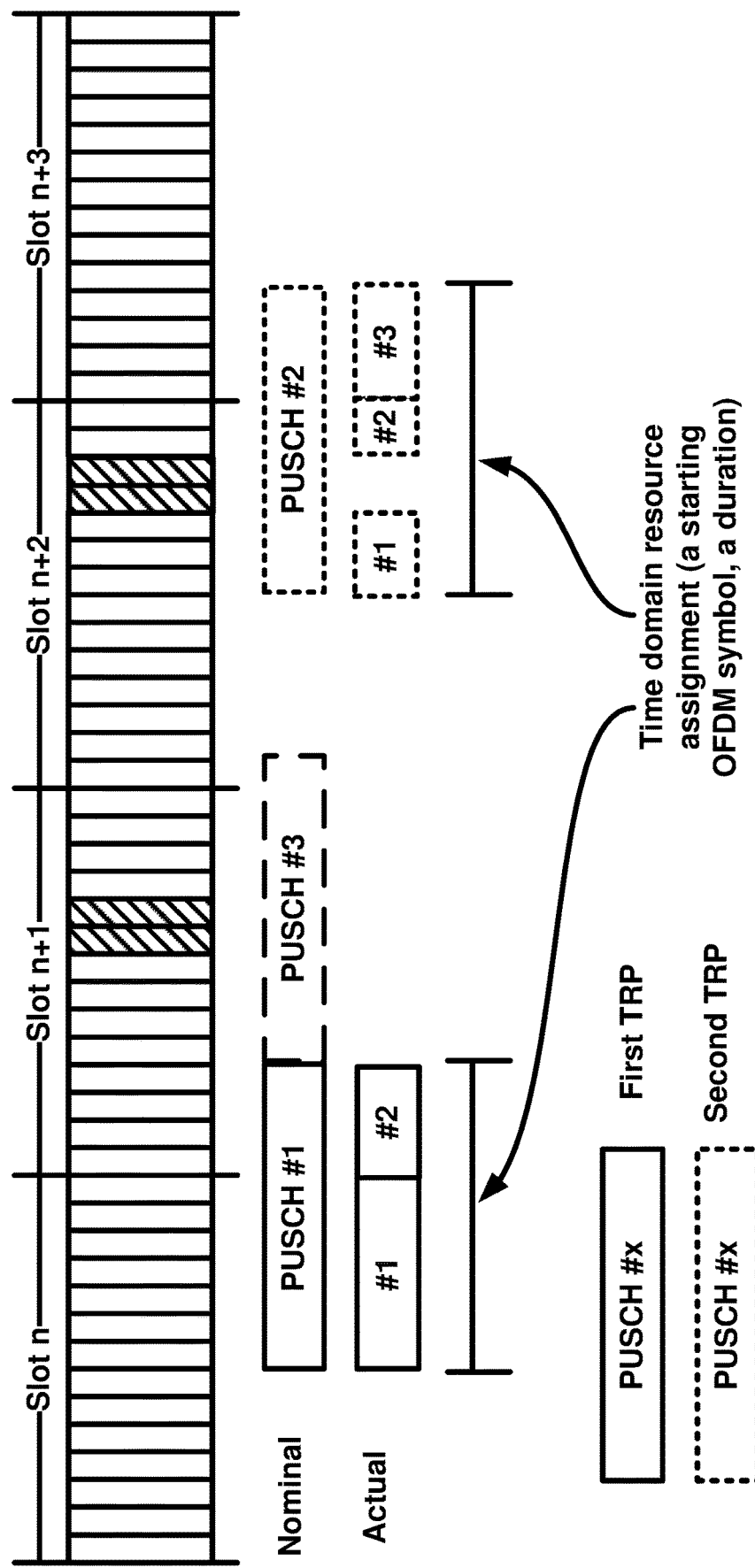
FIG. 25 illustrates a resource determination of a TypeB repetition based on a gap configuration as per an aspect of an example embodiment of the present disclosure

The wireless device may determine a second gap between last symbol of the one or more first PUSCHs and first symbol of the one or more second PUSCHs based on the determining. In an example, the second gap may not be sufficient compared to the minimum gap. The wireless device may determine to skip a slot for mapping the earliest PUSCH of the one or more second PUSCHs. The wireless device may determine a resource in a next slot with the same set of OFDM symbols to the earliest PUSCH of the one or more first PUSCHs for the earliest PUSCH of the one or more second PUSCHs FIG. 25 illustrates a resource determination of a TypeB repetition based on a gap configuration as per as per an aspect of an example embodiment of the present disclosure. The wireless device may be scheduled with a PUSCH repetition comprising a first PUSCH and a second PUSCH. The first PUSCH (a first nominal PUSCH, PUSCH #1), associated with a first TRP, is scheduled between 7-th OFDM symbol of slot n to 4-th OFDM symbol of slot n+1. The first nominal PUSCH may be segmented to two actual PUSCHs (#1 and #2) based on a slot boundary of the slot n. The wireless device may determine a second PUSCH, associated with a second TRP, a same set of OFDM symbols to the first PUSCH. The wireless device may determine a resource between 7-th OFDM symbol of slot n+2 to 4-th OFDM symbol of slot n+3 for the second PUSCH.

The wireless device may determine an earliest PUSCH of the second TRP to having a same set of OFDM symbols to an earliest PUSCH of the first TRP. The wireless device may determine the earliest PUSCH of the second TRP as a first/earliest PUSCH of one or more second PUSCHs of a plurality of PUSCHs, where the one or more second PUSCHs are associated with the second TRP and the plurality of PUSCHs are for a PUSCH repetition. The wireless device may determine the earliest PUSCH of the first TRP as a first/earliest PUSCH of one or more first PUSCHs of the plurality of PUSCHs, where the one or more first PUSCHs are associated with the first TRP. A starting OFDM symbol of the earliest PUSCH of the first TRP may be determined based on an offset or a starting OFDM symbol based on the time domain resource assignment.

For example, when a plurality of PUSCHs are associated with the first TRP (or the second TRP), the wireless device may determine resources of the plurality of PUSCHs based on a TypeB repetition resource allocation mechanism. For example, in FIG. 25, when the wireless device is configured with four PUSCH repetitions where first two PUSCHs are associated with the first TRP and last two PUSCHs are associated with the second TRP, a third PUSCH (PUSCH #3) that is a second repetition may be determined consecutively from the first PUSCH. A resource of the third PUSCH may be determined to have a same set of OFDM symbols to the first PUSCH. A fourth PUSCH (though not shown in FIG. 25) associated with the second TRP may have a same set of OFDM symbols to the third PUSCH.

Example embodiments allow consistent resource assignments for the first TRP and the second TRP even based on the TypeB repetition.

In an example, a wireless device may be configured with a plurality of panels. Each panel may be associated with a TRP or a coreset pool. Each set of TCI states may be associated with each panel. For example, a wireless device may be configured with a first set of TCI states for a first panel. The wireless device may be configured with a second set of TCI states for a second panel. The wireless device may transmit a first signal based on a TCI state of the one or more first TCI states in response to the first signal is associated with the first panel or the first signal is scheduled via the first panel. Similarly, the wireless device may transmit a second signal based on a second TCI state of the one or more second TCI states in response to the second signal is associated with the second panel or the second signal is scheduled via the second panel.

In an example, a first wireless device may support simultaneous transmission of a first uplink signal associated with a first panel and a second uplink signal associated with a second panel. A second wireless device may not support simultaneous transmission of a first uplink signal associated with a first panel and a second uplink signal associated with a second panel. A wireless device may transmit one or more RRC messages indicating a capability whether the wireless device supports simultaneous transmission of uplink signals associated with the plurality of panels. The one or more RRC messages may indicate a capability of simultaneous transmission across multiple panels per frequency band and/or frequency band combinations. Based on the capability, the wireless device may determine to drop one signal of a plurality of signals when the plurality of signals are associated with a plurality of panels and the wireless device does not support simultaneous transmission across the plurality of panels.

For example, when the wireless device is configured with a first cell, a second cell and a third cell, the wireless device may support simultaneous transmission across multiple TRPs/panels when uplink signals are scheduled via the first cell and the third cell. The wireless device may not support simultaneous transmission across multiple TRPs/panels when uplink signals are scheduled via the first cell and the second cell. Supporting simultaneous transmission across multiple panels/TRPs may be dependent on a combination of one or more serving cells/carriers/frequency bands/band combinations.

In an example, a wireless device may be scheduled with a first uplink signal of a first uplink carrier. The wireless device may be scheduled with a second uplink signal of a second uplink carrier. The first uplink signal may overlap with the second uplink signal. In an example, the first uplink signal may overlap with the second uplink signal in response to a gap between last symbol of the first uplink signal and first symbol of the second uplink signal being smaller than a minimum gap (assuming the first uplink signal occurs before the second uplink signal). The minimum gap may be a delay or a duration that the wireless device may need to switch between two TRPs or switch beams/TCI states across inter-TRPs. When a gap between two uplink signals of inter-TRPs is smaller than a minimum gap (or allowed gap) required by a wireless device, the wireless device may consider two uplink signals are overlapped even if they are overlapped in physical resources/time.

The first uplink signal may be associated with a first panel/TRP. The second uplink signal may be associated with a second panel/TRP. The wireless device may not support simultaneous transmission via the first panel/TRP and the second panel/TRP when uplink signals are scheduled via the first uplink carrier and the second uplink carrier.

The wireless device may determine to drop the first uplink signal or the second uplink signal based on one or more rules. For example, if the first uplink signal is a PUCCH, drop the first uplink signal and multiplex a UCI of the PUCCH via the second uplink signal. Determination of dropping an uplink signal may be performed after determining to multiplex a UCI of a PUCCH via one or more PUSCHs. The first uplink signal and the second uplink signal may be PUSCHs. When the first uplink signal is a SRS, the wireless device may drop the first uplink signal. When both the first uplink signal and the second uplink signal are SRS, drop an uplink signal with larger index of a cell (e.g., a first index of the first carrier/cell, a second index of the second carrier/cell).

When the first uplink signal and the second uplink signal are PUSCHs, the wireless device may drop the first uplink signal in response to a first priority of the first uplink signal being lower than a second priority of the second uplink signal (e.g., the first priority is low and the second priority is high, a first value of the first priority is lower (or higher) than a second value of the second priority). When the first priority is same as the second priority, the wireless device may determine a uplink signal comprising uplink control information (UCI). A uplink signal comprising UCI may have higher priority than another uplink signal. When both uplink signals comprising UCI, a HARQ-ACK feedback and/or SR may have higher priority than a CSI feedback. When both uplink signals may not comprise UCI, the wireless device may determine/prioritize an uplink signal with a lowest cell index. The wireless device may drop the first signal in response to a first cell index of the first carrier being higher than a second cell index of the second carrier. The uplink signal with a lowest cell index may be prioritized.

In an example, an uplink signal is a nominal PUSCH. The wireless device may drop a nominal PUSCH in response to at least one actual PUSCH of the nominal PUSCH overlaps with a second uplink signal, and the wireless device may not support simultaneous transmission of the at least one actual PUSCH and the second uplink signal.

In an example, an uplink signal is an actual PUSCH. The wireless device may drop the actual PUSCH and may not drop another actual PUSCH, where the actual PUSCH and the another actual PUSCH may belong to a nominal PUSCH. The actual PUSCH may overlap with a second uplink signal and the wireless device may not support simultaneous transmission of the actual PUSCH and the second uplink signal. The another actual PUSCH may not overlap with the second uplink signal. The wireless device may transmit the another actual PUSCH.

In an example, an uplink signal is a plurality of PUSCHs of a PUSCH repetition. When any PUSCH of the plurality of PUSCHs is dropped due to overlapping with a second uplink signal, the wireless device may drop the plurality of PUSCHs.

In an example, an uplink signal is one or more PUSCHs in a slot. When any PUSCH of the one or more PUSCHs overlaps with a second uplink signal and determined as to drop the any PUSCH, the wireless device may determine to drop the one or more PUSCHs in the slot.

Figure 26:
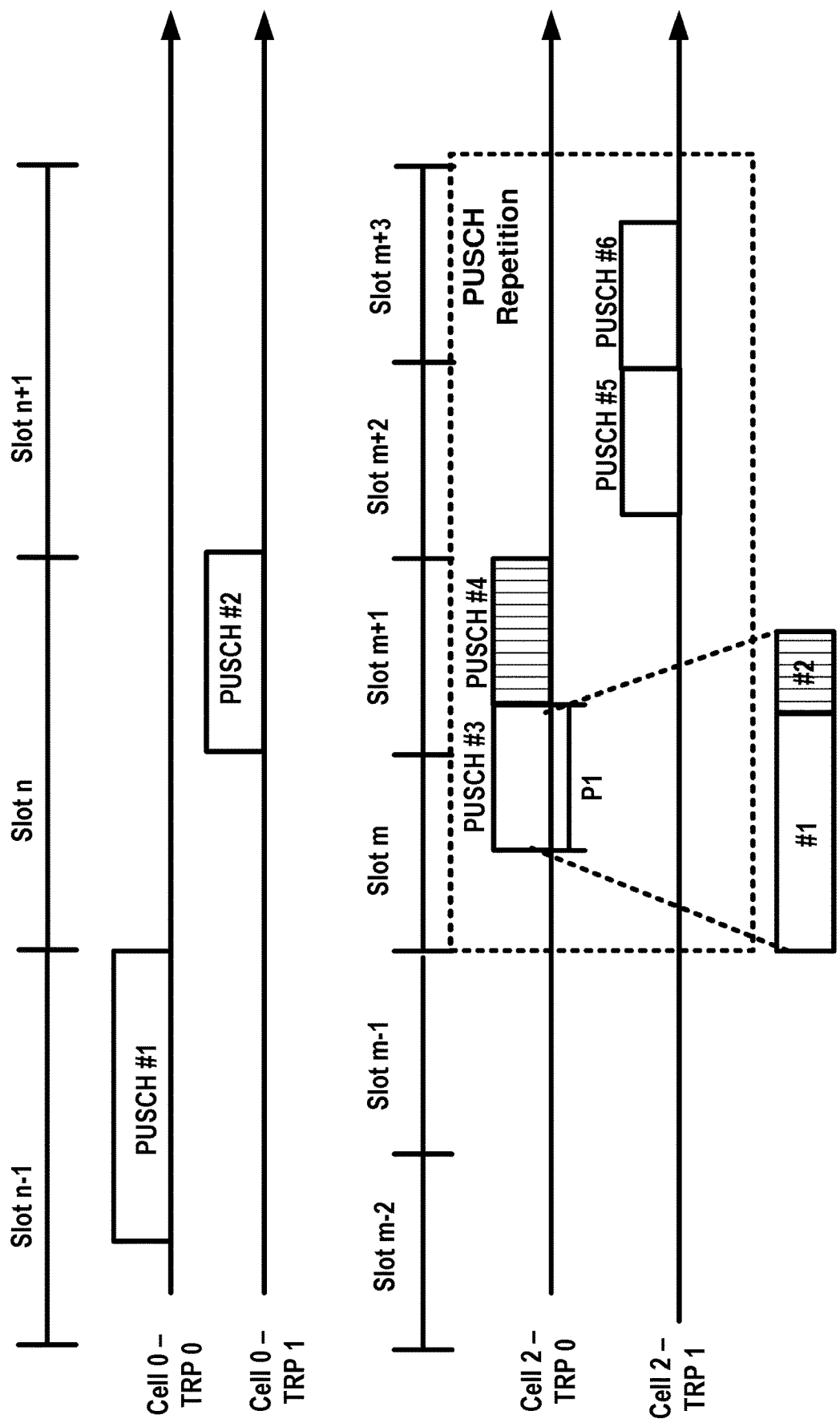
FIG. 26 is a diagram of an aspect of an example embodiment of the present disclosure.

FIG. 26 illustrates an example diagram as per as per an aspect of an example embodiment of the present disclosure. For example, a wireless device may not support simultaneous uplink transmissions via a plurality TRPs/panels across a first cell and a second cell. The wireless device may be scheduled with a first PUSCH via a first TRP/panel (TRP 0) of the first cell (Cell 0) and a second PUSCH via a second TRP/panel (TRP 1) of the first cell. In an example, a cell may have a normal uplink carrier (UL) and a supplemental uplink carrier (SUL). A simultaneous transmission capability may be applied to UL but may not be applied to SUL. A wireless device may support simultaneous transmission between UL and SUL of the cell. A wireless device may not support simultaneous transmission between UL and SUL of the cell.

The wireless device may be scheduled with a PUSCH repetition comprising four PUSCHs (PUSCH #3, PUSCH #4, PUSCH #5 and PUSCH #6). First two PUSCHs are associated with the first TRP/panel of the second cell (Cell 1). Last two PUSCHs are associated with the second TRP/panel of the second cell. A third PUSCH (PUSCH #3) and a fourth PUSCH (PUSCH #4) overlap with the second PUSCH in a slot m and m+1 (slot n for the second PUSCH).

Based on one or more rules, the wireless device may determine to drop the third PUSCH and the fourth PUSCH.

In an example, the wireless device may drop the third PUSCH and the fourth PUSCH. For example, the third PUSCH may comprise two actual PUSCHs (#1 and #2) where a first actual PUSCH (#1) may not overlap with the second PUSCH. A second actual PUSCH (#2) overlaps with the second PUSCH. Regardless of the first actual PUSCH overlapping with the second PUSCH, the wireless device may drop the first actual PUSCH and the second actual PUSCH in response to any actual PUSCH overlapping with the second PUSCH or the nominal PUSCH overlapping with the second PUSCH.

In an example, the wireless device may drop the second actual PUSCH and may not drop the first actual PUSCH in response to the first actual PUSCH not overlapping with the second PUSCH and the second actual PUSCH overlapping with the second PUSCH.

In an example, the wireless device may drop four PUSCHs (e.g., the PUSCH repetition) in response to the third PUSCH and the fourth PUSCH overlapping with the second PUSCH (e.g., any nominal PUSCH overlapping with the second PUSCH).

In an example, the wireless device may drop first two PUSCHs in response to any nominal PUSCH associated with the first TRP overlapping with the second PUSCH. The first two PUSCHs are associated with the first TRP.

Example embodiments may reduce a complexity of the wireless device in supporting multiple TRPs/panels.

In an example, a base station and a wireless device may support a first mode (e.g., first TCI indication mechanism, a first spatial domain filter parameter (e.g., spatial filter parameter) update mechanism, a first type, a separate beam update mechanism) to update and/or apply a TCI state for a downlink channel (PDCCH, PDSCH) or an uplink channel (PUSCH, PUCCH). For example, the following shows an example of the first mode to determine a TCI state of a PDSCH (or PUSCH). In response to receiving the one or more RRC messages of the TCI-states (e.g., a mother set of TCI states) initially (e.g., RRC configuration of TCI-states first time) until the wireless device may receive the one or more MAC CE commands to activating a subset of TCI-states from the mother set of TCI states, the wireless device may assume that DM-RS ports of a PDSCH of a serving cell are QCL-ed with an SSB used in an initial access procedure with respect to QCL-Type A and QCL-TypeD if applicable. Based on the one or more MAC CE commands to activate a subset of TCI-states, the wireless device may apply one TCI state from the activated TCI-states for DM-RS ports of a PDSCH of the serving cell. A wireless device may receive an RRC message indicating tci-PresentInDCI is enabled for a CORESET carrying a DCI comprising a resource assignment for a downlink PDSCH. In response to enabled tci-PresentInDCI, the wireless device may expect the DCI field 'Transmission Configuration Indication' in a first DCI comprising a resource assignment based on one or more first DCI formats (e.g., DCI format 1_1). The wireless device may not expect the DCI field 'Transmission Configuration Indication' in a second DCI comprising a resource assignment based on one or more second DCI formats (e.g., DCI format 1_0). A wireless device may determine QCL information of DM-RS ports of a PDSCH based on at least:

in response to tci-PresentInDCI being enabled for a first CORESET carrying a first DCI comprising a resource assignment for a first PDSCH;
the first DCI indicating K0, a timing offset between a PDCCH and its corresponding PDSCH, that is larger than or equal to a Threshold-Sched-Offset, determining TCI information based on the indicated TCI state by the first DCI;
otherwise (e.g., K0 is smaller than the Threshold-Sched-Offset), determining QCL/TCI information (e.g., a default TCI state) based on one or more CORESETs within an active BWP of the serving cell where the one or more CORESETs are monitored by the wireless device in the latest slot and the index of the one or more CORESETs; selecting a lowest indexed CORESET from the one or more CORESETs and determining the QCL/TCI information based on a QCL/TCI state of the lowest indexed CORESET;

in response to tci-PresentInDCI not being enabled for a second CORESET carrying a second DCI comprising a resource assignment for a first PDSCH or a third DCI is based on the one or more second DCI formats (e.g., DCI format 1_0):
  the second DCI indicating K0, a timing offset between a PDCCH and its corresponding PDSCH, that is larger than or equal to a Threshold-Sched-Offset, determining QCL/TCI information based on the QCL/TCI state of the second CORESET;
  otherwise (e.g., K0 is smaller than the Threshold-Sched-Offset), determining QCL/TCI information (e.g., a default TCI state) based on one or more CORESETs within an active BWP of the serving cell where the one or more CORESETs are monitored by the wireless device in the latest slot and the index of the one or more CORESETs; selecting a lowest indexed CORESET from the one or more CORESETs and determining the QCL/TCI information based on a QCL/TCI state of the lowest indexed CORESET.

Similarly, an uplink grant may comprise a TCI state indicating a spatial domain filter parameter or a QCL parameter or a TCI state for a PUSCH.

In an example, an uplink grant may comprise a SRI indicating a spatial domain filter parameter or a QCL parameter or a TCI state for a PUSCH. The wireless device may determine a TCI state of a PUSCH based on a SRS resource indicator (SRI) associated with the PUSCH.

In an example, a base station and a wireless device may support a second mode (e.g., second TCI indication mechanism, a second spatial domain filter update mechanism, a second type, a common beam update, beamUpdate-Type2) to update and/or apply a TCI state for a downlink channel or an uplink channel. In a second mode, a TCI state may be applied to one or more downlink channels such as PDCCH and PDSCH. A second TCI may be applied to one or more uplink channels such as PUSCH and PUCCH. The TCI state may be same as the second TCI state. Each TCI state may be different per serving cell. A TCI state may be shared over one or more serving cells. For example, a base station may indicate a DL TCI state (e.g., DL common beam, a separate DL TCI state, a joint DL TCI state) for downlink channels/signals such as PDCCH, PDSCH and CSI-RS transmission. The base station may indicate the DL TCI state via a DCI or a MAC CE. The base station may update the DL TCI state via another DCI or another MAC-CE. The base station may indicate a UL TCI state (e.g., UL common beam, a separate UL TCI state, a joint UL TCI state) for uplink channels/signals such as PUCCH, PUSCH and SRS. The base station may indicate the UL TCI via a DCI or a MAC CE. The base station may update the UL TCI state via another DCI or another MAC-CE. For example, the base station may indicate a first DL TCI state for downlink for a first coreset pool and a second DL TCI state for downlink for a second coreset pool, when the wireless device is configured with a plurality of coreset pools. When the wireless device is configured with a single coreset pool or not configured with a coreset pool, the wireless device may apply the DL TCI state for a cell. In an example, the base station may indicate a plurality of DL TCI states for downlink. The base station may indicate a plurality of UL TCI states for uplink. A DL TCI state may be same as a UL TCI state where a common beam may be used for both downlink and uplink.

The base station may transmit one or more RRC messages comprising configuration parameters. The configuration parameters may indicate a set of TCI states for downlink and uplink or a first set of TCI states for downlink and a second set of TCI states for uplink. The base station may configure a joint set of TCI states for downlink and uplink of a cell. The base station may configure separate set of TCI states for downlink of the cell and the uplink of the cell respectively. For example, the second mode may not be applied to a supplemental uplink of the cell, if the supplemental uplink is configured/associated with the cell.

Figure 27:
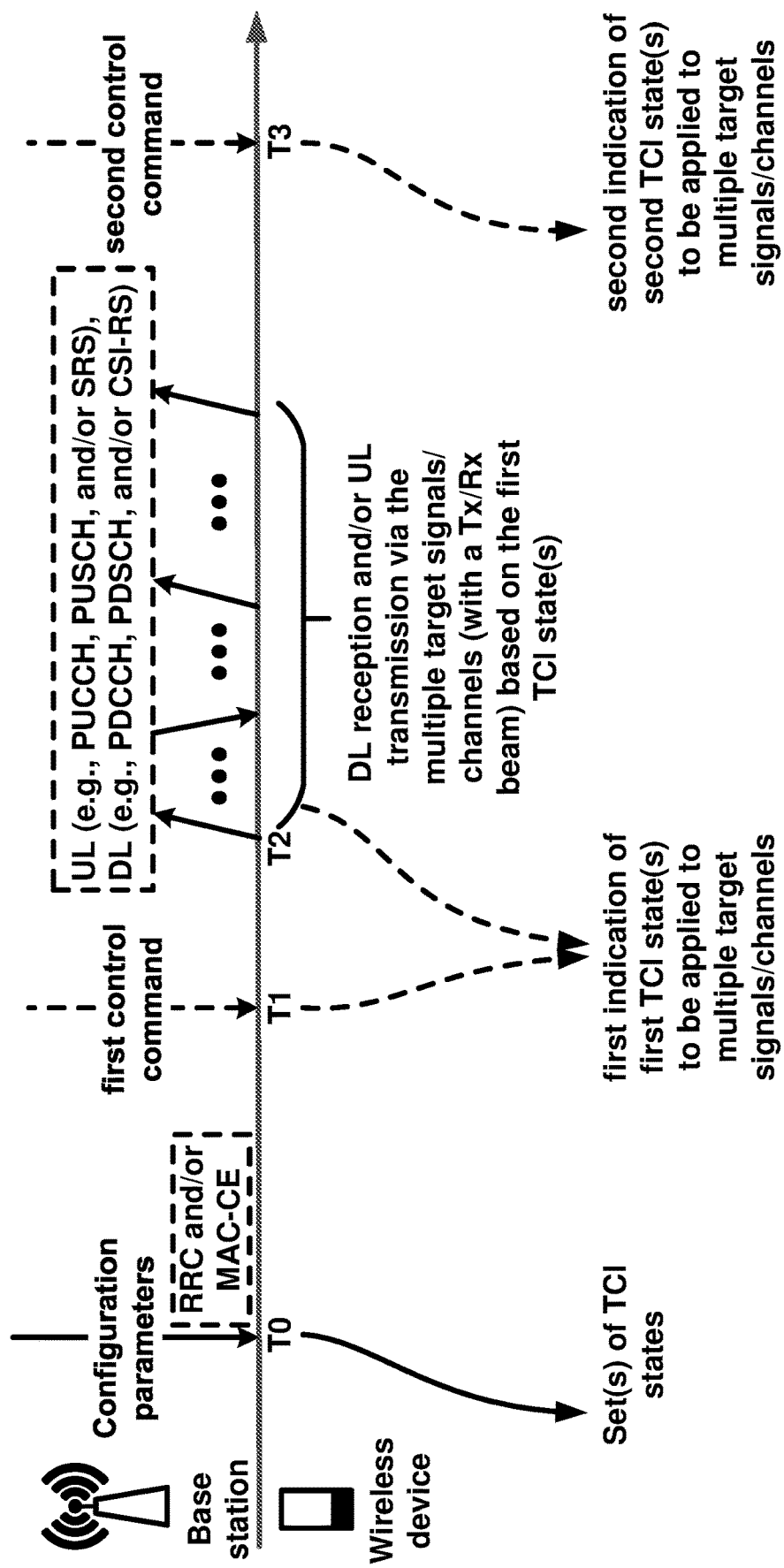
FIG. 27 illustrates an example TCI state update mechanism as per an aspect of an example embodiment of the present disclosure.

FIG. 27 shows an example of a second mode to update and/or apply a TCI state for downlink of a cell or uplink of the cell. The base station may transmit one or more RRC messages or MAC CE messages to indicate/comprise configuration parameters. The configuration parameters may comprise/indicate at least one set of TCI states. For example, when a single or joint TCI state is applied for downlink of a cell and uplink of the cell jointly/unified manner, the configuration parameters indicate/comprise a set of TCI states for the cell. The set of TCI states may be applied to downlink and uplink of the cell. When a first TCI state of downlink of the cell may be independently indicated or separately indicated or separately configured or separately enabled from a second TCI state of uplink of the cell, the configuration parameters may indicate a first set of TCI states for the downlink and a second set of TCI states for the uplink of the cell respectively. For a notation, a DL TCI state may refer a TCI state used for receiving downlink signals/channels of a cell when the base station independently indicates TCI states for DL and UL of the cell. Similarly, a UL TCI may refer a TCI state used for transmitting uplink signals/channels of the cell when independent indication is used. When a joint indication between DL and UL of the cell is used (e.g., a common TCI is applied to downlink and uplink), a joint TCI state may refer a TCI state used for both downlink signals/channels of the cell and uplink signals/channels of the cell.

In an example, a TCI state (e.g., a DL TCI state, a UL TCI state or a joint TCI state) may comprise at least one source RS, where the at least one source RS may provide a reference (e.g., a spatial-domain reference, a reference for a QCL type and/or a spatial relation, or a QCL assumption for the wireless device, etc.) for determining a QCL (relationship) and/or a spatial (domain) filter. In an example, the at least one TCI state (e.g., a DL TCI state, a UL TCI state or a joint TCI state) may indicate (e.g., be associated with, or comprise, etc.) at least one TRP ID (e.g., a cell index, a reference signal index, a CORESET group (or pool) index (e.g., CORESETPoolIndex), or a CORESET group (or pool) index of a CORESET group from which the at least one TCI state is indicated/signaled, etc.), where the at least one source RS (e.g., transmitted from a TRP identified by the at least one TRP ID) may provide a reference (e.g., a spatial-domain reference, a reference for a QCL type and/or a spatial relation, or a QCL assumption for the wireless device, etc.) for determining a QCL (relationship) and/or a spatial (domain) filter. For example, a TCI state may be indicated for downlink and/or uplink for a TRP or a panel of a cell. For example, for a cell, a first TCI state may be used for a first TRP/panel and a second TCI state may be used for a second TRP/panel. For example, a TCI may be indicated for a cell regardless of a plurality of coreset pools or a single coreset pool (or multi-TRPs or a single TRP). A single TCI state may be used for a plurality of serving cells with a same coreset pool index. A single TCI state may be used for a plurality of serving ells regardless of coreset pool index. A single TCI state may be use for both downlink and uplink channels/signals. A single TCI may be used only for downlink or uplink operation.

In an example, one or more TCI states (e.g., M TCI states) may be used for downlink signals/channels of a cell. One or more reference signals of the one or more TCI states may provide common QCL information at least for reception (e.g., device-dedicated reception, UE-dedicated reception, etc.) on a PDSCH and one or more CORESETs in a serving cell (e.g., an activated serving-cell (configured with a PDCCH monitoring), or a component carrier (CC), etc.). The common QCL information may refer that a QCL property is shared or commonly used for a plurality of downlink/uplink channels/signals such as PDCCH/PDSCH for downlink and PUSCH/PUCCH for uplink. Similarly, one or more TCI states (e.g., N TCI states) may be used for uplink signals/channels of a cell. One or more TCI states (e.g., M TCI states) may be used for downlink signals/channels of a TRP of a cell. One or more reference signals of the one or more TCI states may provide common QCL information at least for reception (e.g., device-dedicated reception, UE-dedicated reception, etc.) on a PDSCH and one or more CORESETs in a TRP of a serving cell (e.g., an activated serving-cell (configured with a PDCCH monitoring), or a component carrier (CC), etc.). One or more reference signals of the one or more TCI states may provide common QCL information at least for reception (e.g., device-dedicated reception, UE-dedicated reception, etc.) on a PDSCH and one or more CORESETs in a TRP/panel of a plurality of serving cells (e.g., a plurality of activated serving-cell (configured with a PDCCH monitoring), or a plurality of component carriers (CCs), etc.). Similarly, one or more TCI states (e.g., N TCI states) may be used for uplink signals/channels of a TRP/panel of a cell. One or more TCI states (e.g., N TCI states) may be used for uplink signals/channels of a TRP of a plurality of cells. One or more reference signals of the one or more TCI states may provide common QCL information at least for transmission (e.g., device-dedicated transmission, UE-dedicated transmission, etc.) on a PUSCH and one or more PUCCH resources in a TRP/panel of a plurality of serving cells (e.g., a plurality of activated serving-cell (configured with a PDCCH monitoring), or a plurality of component carriers (CCs), etc.).

In an example, the common QCL information may be applied to at least one CSI-RS resource, e.g., for CSI feedback/reporting, for beam management (configured with a parameter, e.g., repetition), for tracking (configured with a parameter, e.g., trs-Info). In an example, the common QCL information may be applied to determining a PDSCH default beam, e.g., in response to a mode (e.g., the second mode, etc.) for TCI indication (being configured/indicated, etc.) based on the at least one joint TCI. In an example, the wireless device may determine a PDSCH default beam as identical to an indicated (e.g., configured, activated, updated, or selected, etc.) (joint) TCI states, e.g., of the M (joint) TCIs, e.g., in response to a mode (e.g., the second mode, etc.) for TCI indication (being configured/indicated, etc.) based on the at least one TCI state. In an example, the PDSCH default beam may be used for a PDSCH reception based on certain condition(s), e.g., when a time offset between a reception of a DCI scheduling a PDSCH and a reception of the PDSCH is equal to or lower than a threshold (e.g., Threshold-Sched-Offset), when a CORESET delivering a DCI scheduling a PDSCH is not configured with a higher layer parameter (e.g., TCI-PresentInDCI), when a higher layer parameter (e.g., TCI-PresentInDCI) associated with a CORESET delivering a DCI scheduling a PDSCH is not enabled (e.g. not set as "enabled", not turned on, or disabled), when an explicit signaling from the base station for enabling the PDSCH default beam is given, or based on a pre-defined/pre-configured rule, etc.

The PDSCH default beam (e.g., for the second mode for TCI indication), as identical to an indicated (e.g., configured, activated, updated, or selected, etc.) (joint) TCI state, e.g., of the M (joint) TCI states, may be different (e.g., independent, or separately, etc.) from a first PDSCH default beam for the first mode which may be as identical to a second TCI-state or a second QCL assumption applied for a CORESET with a lowest ID (e.g., CORESET-specific index being the lowest) or as identical to a third TCI-state with a lowest ID (e.g., among activated TCI-states in a BWP), e.g., TCI-state ID being the lowest among active TCI-states in a BWP. In an example, a wireless device (e.g., the first wireless device, or the second wireless device, etc.) may receive an indication, e.g., from the base station, etc., of applying a method for determining a PDSCH default beam, where the method may comprise at least one of: a first method for determining a PDSCH default beam, based on the performing the default PDSCH RS selection, etc., e.g., as identical to a second TCI-state or a second QCL assumption applied for a CORESET with a lowest ID (e.g., CORESET-specific index being the lowest) or as identical to a third TCI-state with a lowest ID (e.g., among activated TCI-states in a BWP), e.g., TCI-state ID being the lowest among active TCI-states in a BWP, e.g., as applied based on the first mode for TCI state indication, and a second method for determining a PDSCH default beam as being identical to an indicated (e.g., configured, activated, updated, or selected, etc.) (joint) TCI state, e.g., of the M (joint) TCI states, e.g., as applied based on the second mode for TCI state indication, etc.

In an example, the indication of applying a method for determining a PDSCH default beam, e.g., where the indication may select one method among at least the first method, and the second method, etc., may be received via an RRC message. In an example, the indication of applying a method for determining a PDSCH default beam, e.g., where the indication may select one method among at least the first method, and the second method, etc., may be received via a MAC-CE message (e.g., and/or a dynamic indication via a DCI, etc.). Example embodiments may improve a flexibility and efficiency in a communication network (e.g., comprising at least a base station and a wireless device, etc.) by selectively applying a mode for TCI indication over at least one channel (e.g., a control channel, a data channel, and a shared channel, etc.) for a wireless device, and/or by selectively applying a method for determining a PDSCH default beam, e.g., based on the base station's efficient operational strategy. Example embodiments may reduce an overhead and a latency in control signaling for TCI indication, based on applying a single TCI-state over multiple channels (e.g., a downlink control channel and a downlink shared channel, etc.), e.g., based on the second mode for TCI indication.

In an example, reference signals of N TCI states (e.g., UL-TCIs, or UL-TCI states, etc.), where N is one or an integer greater than zero, may provide a reference for determining common uplink Tx spatial (domain) filter(s) at least for dynamic-grant-based (or configured-grant based) PUSCH and one or more (device-dedicated, e.g., UL-dedicated) PUCCH resources in a CC (e.g., a serving-cell, etc.). In an example, one or more PUCCH resources of a cell may be protected (e.g., restricted, or kept, etc.) from being affected by the reference for determining common uplink Tx spatial (domain) filter(s). In an example, the common uplink Tx spatial (domain) filter(s) may not be applied (e.g., used, etc.) for the one or more PUCCH resources. In an example, the one or more PUCCH resources in the CC may be a pre-defined PUCCH resource (e.g., from the lowest indexed PUCCH resource) in the CC, which may be used for a special purpose, e.g., as a secured fallback (or default) PUCCH resource, e.g., when an ambiguity situation (e.g., due to a re-configuration of a control signaling, etc.) arises between a wireless device (e.g., the first wireless device, or the second wireless device, etc.) and the base station. In an example, the common uplink Tx spatial (domain) filter(s) may be applied to one or more SRS resources in SRS resource set(s), where an SRS resource set of the SRS resource set(s) may be configured for antenna switching, codebook-based uplink, or non-codebook-based uplink, etc. In an example, the common uplink Tx spatial (domain) filter(s) may be applied to at least one SRS resource in an SRS resource set configured for beam management (via a parameter, e.g., usage, set to 'beamManagement', etc.), in response to receiving an explicit signaling from the base station for enabling the applying the common uplink Tx spatial (domain) filter(s) to the at least one SRS resource for beam management, or based on a pre-defined/pre-configured rule, etc.

In FIG. 27, the base station transmits a first control command (e.g., a DCI) indicating one or more first TCI states. For example, the DCI may indicate a first TCI state for downlink channels/signals of a cell, and a second TCI state for uplink channels/signals of the cell. For example, the first command or the DCI may indicate one or more TCI states for downlink/uplink channels/signals of the cell. The one or more TCI states may be jointly/commonly used for downlink/uplink channels/signals of the cell. For example, the first command or the DCI may indicate a TCI state for downlink/uplink channels/signals of the cell. The wireless device receives the first control command at a time T1. At a time T2, the wireless device may update one or more DL TCI states, one or more UL TCI states or one or more joint TCI states for the cell in response to receiving the first control command. For example, T1 and T2 may be same. For example, T2 may occur after processing delay or an offset after T1. The wireless device receives downlink channels/signals (e.g., PDCCH, PDSCH and/or CSI-RS) based on the one or more DL TCI states or the one or more joint TCI states after updating the one or more DL states or the one or more joint TCI states. The wireless device transmits uplink channels/signals (e.g., PUCCH, PUSCH, and/or SRS) based on the one or more DL TCI states or the one or more joint TCI states after updating the one or more UL states or the one or more joint TCI states. The wireless device receives a second control command (e.g., a second DCI) at a time T3. The wireless device updates the one or more DL TCI states, the one or more UL TCI states or the one or more joint TCI states based on the second control command in response to the receiving.

In the specification, a common beam update mechanism may refer a second mode to update TCI state(s) for downlink and/or uplink channels/signals of a cell. The downlink and/or uplink channels/signals may comprise one or more PDCCHs scheduled via one or more coresets, one or more PDSCHs of the cell, or CSI-RS or one or more PUCCH resources, one or more PUSCHs of the cell, or SRS. For example, the one or more coresets may not comprise a coreset #0 or may not comprise one or more second coresets (e.g., coreset #0, a coreset associated with a search space for SIB/RAR/paging, such as Type0/0A/2-PDCCH CSS). For example, the one or more PUCCH resources may not comprise PUCCH resources (e.g., default PUCCH resources) configured/indicated by SIB message(s). For example CSI-RS may comprise non-zeropower CSI-RSs used for CSI feedback but may not comprise CSI-RSs for a beam failure measurement.

The common beam update mechanism determines at least one DL TCI state (e.g., at least one DL common beam, at least one common beam) of a TRP (e.g., a coreset pool) of a serving cell, where the wireless device may receive downlink signals/channels (e.g., PDCCH, PDSCH and/or CSI-RS) based on the at least one DCI TCI state from the TRP of the serving cell. The at least one DL TCI state may apply to a plurality of channels based on the common beam update mechanism. Similarly, the common beam update mechanism determines at least one UL TCI state (e.g., at least one UL common beam, at least one common beam) of a TRP (e.g., a coreset pool, a panel associated with the TRP, a panel associated with the coreset pool) of a serving cell. An example of the common beam update is shown in FIG. 27. The at least one DL TCI of the TRP of the serving cell may be called as a DL TCI state (a common DL beam, a DL common beam, a common DL TCI state) of the TRP (or a coreset pool) of the serving cell. The at least one UL TCI of the TRP (or the panel) of the serving cell may be called as an UL TCI state (a UL common beam, a UL common beam, a common UL TCI state) of the TRP (or a coreset pool) of the serving cell.

In an example, a DL TCI state (a DL common beam, a selected DL TCI state, a DL common TCI state) may comprise a reference signal providing a qcl-TypeD properties for receiving downlink control/data channels/signals. The wireless device may apply/use the qcl-TypeD properties of the reference signal that has QCL-ed with a DM-RS or a CSI-RS of a downlink control/data channel/signal. In an example, a DL TCI state may comprise a plurality of reference signals. For example, the plurality of reference signals may comprise a first reference signal for a first TRP, a second reference signal for a second TRP. The plurality of reference signals may be used for a repetition of a control channel or for a repetition of a data channel. For example, a data, based on the DL TCI state, may be transmitted via a TRP switching where a first transmission/repetition of the data may be transmitted via the first TRP based on the first reference signal, and a second transmission/repetition of the data may be transmitted via the second TRP based on the second reference signal. In the specifications, the DL TCI state may refer the one or more TCI states, or the one or more reference signals used for receiving a single DCI via a PDCCH or a plurality of PDCCHs. In the specifications, the DL TCI state may refer the one or more TCI states, or the one or more reference signals used for receiving a transport block via a PDSCH or a plurality of PDSCHs or a PDSCH with a multiple layers, In the specifications, the DL TCI state may refer the one or more TCI states, or the one or more reference signals used for receiving a CSI-RS or a plurality of CSI-RSs, In an example, a UL TCI state (e.g., an UL common beam, a selected UL TCI state, an UL common TCI state) may comprise a plurality of reference signals. For example, the plurality of reference signals may comprise a first reference signal for a first panel (or a first TRP), a second reference signal for a second panel (or a second TRP). The plurality of reference signals may be used for a repetition of a control channel or for a repetition of a data channel. For example, a data, based on the UL TCI state, may be transmitted via a panel/TRP switching where a first transmission/repetition of the data may be transmitted via the first panel/TRP based on the first reference signal, and a second transmission/repetition of the data may be transmitted via the second panel/TRP based on the second reference signal. In the specifications, the UL TCI state may refer the one or more TCI states, or the one or more reference signals used for transmitting a single UCI via a PUCCH or a plurality of PUCCHs or a single PUSCH or a plurality of PUSCHs. In the specifications, the UL TCI state may refer the one or more TCI states, or the one or more reference signals used for transmitting a transport block via a PUSCH or a plurality of PUSCHs or a PUSCH with a multiple layers, In the specifications, the UL TCI state may refer the one or more TCI states, or the one or more reference signals used for receiving a SRS or a plurality of SRSs, In an example, a wireless device may be configured with an inter-TRP/panel PUSCH repetition. The wireless device may receive an uplink grant based on a first DCI format (e.g., DCI format 0_1 or a DCI format 0_2). The first DCI format may comprise one or more first DCI fields indicating one or more SRIs. The one or more first DCI fields may indicate a single SRI value where the single SRI value may indicate a first SRI and a second SRI. The one or more first DCI fields may indicate a first SRI and a second SRI respectively. The wireless device may determine a power control parameter based on the first SRI for one or more first uplink transmission associated with a first TRP. The wireless device may determine a second power control parameter based on the second SRI for one or more second uplink transmission associated with a second TRP.

The first SRI field may indicate no transmission for the first TRP (e.g., a value of the first SRI='00' or '11' or 1). In response to the indication, the wireless device may determine the one or more first uplink transmission being NULL (none). The wireless device may not determine the power for the one or more first uplink transmission.

The second SRI may indicate no transmission for the second TRP (e.g., a value of the first SRI='00' or '11' or 1). In response to the indication, the wireless device may determine the one or more second uplink transmission being NULL (none). The wireless device may not determine the power for the one or more second uplink transmission.

In an example, the wireless device may determine a first TCI state or a first spatial domain filter parameter for the one or more first uplink transmissions (when the first SRI indicates the one or more first uplink transmissions) based on a first uplink TCI state (a common uplink beam for the first TRP). The wireless device may determine a second TCI state or a second spatial domain filter parameter for the one or more second uplink transmissions (when the second SRI indicates the one or more second uplink transmissions) based on a second uplink TCI state (a common uplink beam for the second TRP.

Figure 28:
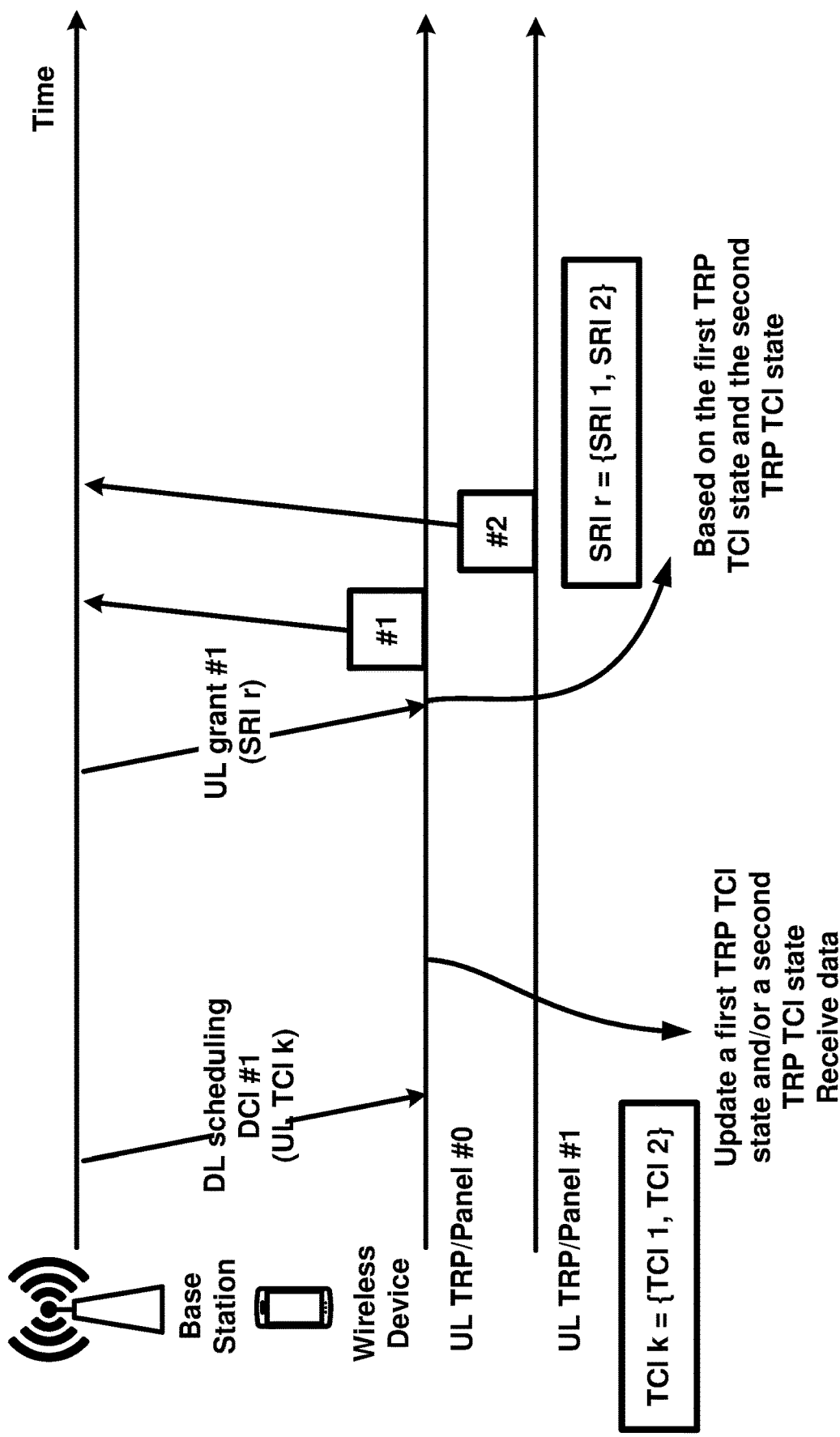
FIG. 28 illustrates an aspect of an example embodiment of the present disclosure.

FIG. 28 illustrates an example embodiment as per as per an aspect of an example embodiment of the present disclosure. This may be another example to accommodate a common beam update and an inter-TRP repetition. The base station may transmit a first DCI (DL scheduling DCI #1) comprising/indicating one or more TCI s for updating a common uplink TCI state for the first TRP (a first uplink TCI state) and a common uplink TCI state for the second TRP (a second uplink TCI state). For example, the first DCI indicates a TCI=TCI k (a TCI). The TCI may comprise a first TCI and a second TCI (e.g., TCI k={TCI 1, TCI 2}). The first TCI may correspond to the first TRP. The second TCI may correspond to the second TRP. The wireless device may update the first uplink TCI state for the first TRP based on the first TCI. The wireless device may update the second uplink TCI state for the second TRP.

The wireless device may receive downlink data based on the first DCI.

The wireless device may receive a second DCI (UL grant #1) where the second DCI may comprises one or more SRIs. The one or more SRIs may indicate whether to transit via a single TRP or a plurality of TRPs of scheduled uplink transmission(s). FIG. 28 shows that the second DCI comprises a single SRI (SRI r). The single SRI may comprise a first SRI and a second SRI. The first SRI may correspond to the first TRP. The second SRI may correspond to the second SRI. The wireless device may determine to transmit at least one uplink signal via the first TRP in response to the first SRI indicating transmission based on a valid SRS resource. The wireless device may determine not to transmit via the first TRP in response to the first SRI indicating an invalid SRS resource or indicating a predetermined value.

The wireless device may determine to transmit at least one uplink signal via the second TRP in response to the second SRI indicating transmission based on a valid SRS resource. The wireless device may determine not to transmit via the second TRP in response to the second SRI indicating an invalid SRS resource or indicating a predetermined value.

FIG. 28 shows that the single SRI (SRI r) indicating the first SRI (SRI 1) and the second SRI (SRI 2), where both indicating value SRS resources. The wireless device may transmit a first uplink signal/transmission (#1) via the first TRP. The wireless device may transmit a second uplink signal/transmission (#2) via the second TRP.

The wireless device may determine a first spatial domain filter parameter or a first TCI state of the first uplink signal/transmission based on the first uplink TCI state for the first TRP. The wireless device may determine a second spatial domain filter parameter or a second TCI state of the second uplink signal/transmission based on the second uplink TCI state for the second TRP.

In the example, the second DCI (the uplink grant #1) may comprise/indicate one or more TPC values. For example, the second DCI may indicate a first TPC value for the first TRP and a second TPC value for the second TRP. The wireless device may apply the first TPC value for one or more first power control processes associated with the first TRP in response to the second DCI indicating at least one uplink signal/transmission via the first TRP. For example, the first SRI may indicate a valid SRS resource, the wireless device may apply the first TPC value (e.g., update a transmission power accumulation for the first TRP). Otherwise, the wireless device may ignore the first TPC value and may not update the one or more first power control processes. Alternatively, the wireless device may apply the first TPC value for update the one or more first power control processes regardless whether the wireless device transmits uplink signal via the first TRP or not or regardless whether the second DCI indicates the at least one uplink signal/transmission via a valid SRS resource for the first TRP.

The wireless device may apply the second TPC value for one or more second power control processes associated with the second TRP in response to the second DCI indicating at least one uplink signal/transmission via the second TRP. For example, the second SRI may indicate a valid SRS resource, the wireless device may apply the second TPC value (e.g., update a transmission power accumulation for the second TRP). Otherwise, the wireless device may ignore the second TPC value and may not update the one or more second power control processes. Alternatively, the wireless device may apply the second TPC value for update the one or more second power control processes regardless whether the wireless device transmits uplink signal via the second TRP or not or regardless whether the second DCI indicates the at least one uplink signal/transmission via a valid SRS resource for the second TRP.

In the example, the second DCI (the uplink grant #1) may comprise/indicate one or more TCI states. For example, the second DCI may indicate a first TCI state for the first TRP and a second TCI state for the second TRP. The wireless device may apply the first TCI value for the first uplink TCI state associated with the first TRP in response to the second DCI indicating at least one uplink signal/transmission via the first TRP. For example, the first SRI may indicate a valid SRS resource, the wireless device may apply the first TCI state and update the first uplink TCI state for the first TRP. Otherwise, the wireless device may ignore the first TCI state and may not update the first uplink TCI state. Alternatively, the wireless device may apply the first TCI state for update the first uplink TCI state regardless whether the wireless device transmits uplink signal via the first TRP or not or regardless whether the second DCI indicates the at least one uplink signal/transmission via a valid SRS resource for the first TRP.

The wireless device may apply the second TCI value for the second uplink TCI state associated with the second TRP in response to the second DCI indicating at least one uplink signal/transmission via the second TRP. For example, the second SRI may indicate a valid SRS resource, the wireless device may apply the second TCI state and update the second uplink TCI state for the second TRP. Otherwise, the wireless device may ignore the second TCI state and may not update the second uplink TCI state. Alternatively, the wireless device may apply the second TCI state for update the second uplink TCI state regardless whether the wireless device transmits uplink signal via the second TRP or not or regardless whether the second DCI indicates the at least one uplink signal/transmission via a valid SRS resource for the second TRP.

Example embodiments may allow to update a common beam with a multi-TRP independently from a scheduling one or more PUSCHs via the multi-TRP.

Figure 29:
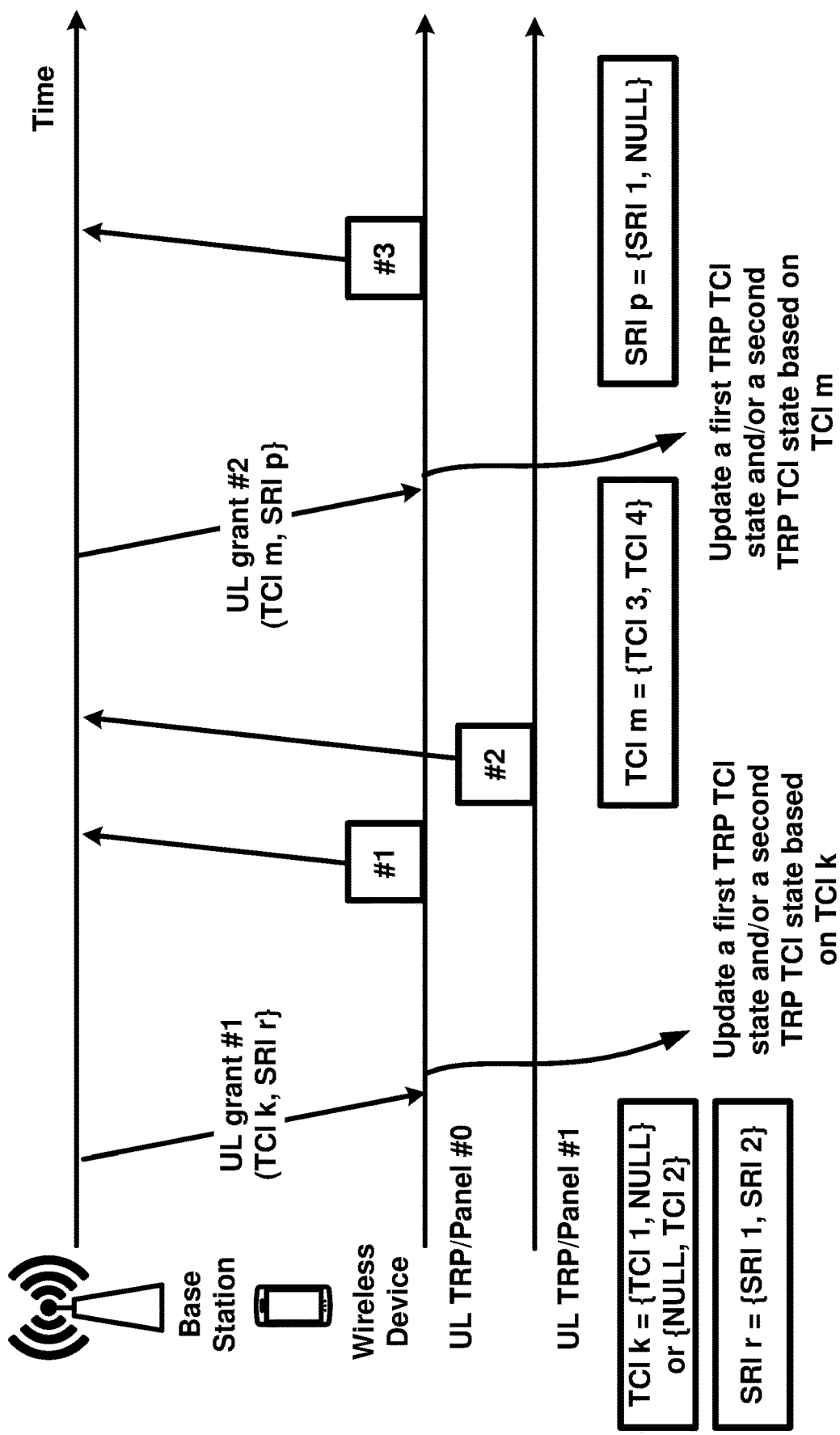
FIG. 29 illustrates an aspect of an example embodiment of the present disclosure.

FIG. 29 illustrates an example embodiment as per as per an aspect of an example embodiment of the present disclosure. An uplink grant may comprise/indicate a first field and a second field. The first field may indicate/comprise a TCI field indicating a TCI state or a first TCI field and a second TCI field. The TCI field may indicate a first TCI state and a second TCI state. The first TCI field may indicate the first TCI state. The second field may indicate/comprise a SRI field indicating a SRI or a first SRI field and a second SRI field. The SRI field may indicate a first SRI and a second SRI. The first SRI field may indicate the first SRI. The second SRI field may indicate the second SRI. The second TCI field may indicate the second TCI state.

For example, a first DCI (UL grant #1) may comprise a TCI (TCI k) and a SRI (SRI r). The TCI may indicate a first TCI state (TCI 1) for a first TRP and NULL (e.g., no TCI state for the second TRP). The TCI may indicate NULL (e.g., no TCI state for the first TRP) and a second TCI state (TCI 2) for the second TRP. The SRI may indicate a first SRI (SRI 1) and a second SRI (SRI 2).

In response to receiving the first DCI, the wireless device may update a first uplink TCI state (e.g., a first common beam for the first TRP) based on the first TCI state of the first DCI (if the first TCI is not NULL). In response to receiving the second DCI, the wireless device may update a second uplink TCI state (e.g., a second common beam for the second TRP) based on the second TCI state of the first DCI (if the second TCI is not NULL). The wireless device may transmit one or more first uplink signals (#1) via the first TRP based on the first uplink TCI state, in response to the first SRI being valid (e.g., indicating a valid SRS resource). The wireless device may transmit one or more second uplink signals (#2) via the second TRP based on the second uplink TCI state, in response to the second SRI being valid (e.g., indicating a valid SRS resource).

The wireless device may receive a second DCI (UL grant #2). The second DCI comprises a second TCI (TCI m) and a second SRI (SRI p). The second TCI comprises a third TCI state (TCI 3) for the first TRP. The second TCI comprises a fourth TCI state (TCI 4) for the second TRP. The wireless device may update the first uplink TCI state based on the third TCI state for the first TRP in response to receiving the second DCI. The wireless device may update the second uplink TCI state based on the fourth TCI state for the second TRP in response to receiving the second DCI. The second SRI indicates SRI 1 for the first TRP. The second SRI indicates NULL for the second TRP or may indicate an invalid SRS resource for the second TRP. In response to the second SRI indicating invalid SRS resource, the wireless device may not transmit uplink signal via the second TRP based on the second DCI.

The wireless device may transmit one or more third uplink signals (#3) via the first TRP based on the first uplink TCI state.

The second DCI may indicate a first TPC value for the first TRP and a second TPC value for the second TRP. The wireless device may apply the first TPC value for one or more first power control processes associated with the first TRP in response to the second DCI indicating a valid SRS resource for the first TRP. The wireless device may not apply the second TPC value for one or more second power control processes associated with the second TRP in response to the second DCI indicating an invalid SRS resource or NULL for the second TRP.

Example embodiments may allow to update a common beam with a multi-TRP independently from a scheduling one or more PUSCHs via the multi-TRP.

In an example, a wireless device may receive an uplink grant. The uplink grant may indicate a time domain resource assignment of a first nominal physical uplink shared channel (PUSCH). The uplink grant may indicate a number of repetitions. The uplink grant may further indicate one or more first PUSCHs based on a first transmission configuration indicator (TCI) state associated with a first transmission and reception point (TRP). The uplink grant may further indicate one or more second PUSCHs based on a second TCI state associated with a second TRP. The wireless device may determine a gap between last symbol of resources of the one or more PUSCHs and first symbol of resources of the one or more second PUSCHs. The one or more first PUSCHs may be followed by the one or more second PUSCHs in a time domain. The wireless device may determine a first index of first OFDM symbol of an earliest PUSCH of the one or more second PUSCHs based on the gap and a second index of first OFDM symbol of an earliest PUSCH of the one or more first PUSCHs.

The wireless device may determine a resource of the earliest PUSCH of the one or more second PUSCHs having a same set of symbols to the earliest PUSCH of the one or more first PUSCHs. The wireless device may transmit the one or more first PUSCHs based on the first TCI state. The wireless device may transmit the one or more second PUSCHs, occurring after the gap, based on the second TCI state.

According to an example embodiment, the first index may be same to the second index. The wireless device may transmit, to a base station, one or more first radio resource control (RRC) messages indicating a minimum gap. The wireless device may receive one or more second RRC messages indicating the gap that is equal to or larger than the minimum gap. The wireless device may determine the gap based on the gap configured by the one or more second RC messages.

According to an example embodiment, the wireless device may skip one or more one or more symbols between the last symbol of resources of the one or more PUSCHs and the first symbol of resources of the one or more second PUSCHs.

According to an example embodiment, the wireless device may determine a third index of first OFDM symbol of a next earliest PUSCH of the one or more second PUSCHs based on the gap and a fourth index of first OFDM symbol of a next earliest PUSCH of the one or more first PUSCHs. A similar mechanism may be applied to k-th earliest PUSCH of the one or more second PUSCHs based on the gap and k-th earliest PUSCH of the one or more first PUSCHs.

In an example, a wireless device may receive an uplink grant. The uplink grant may indicate a time domain resource assignment of a first nominal physical uplink shared channel (PUSCH). The uplink grant may indicate a number of repetitions. The uplink grant may further indicate one or more first PUSCHs based on a first transmission configuration indicator (TCI) state associated with a first transmission and reception point (TRP). The uplink grant may further indicate one or more second PUSCHs based on a second TCI state associated with a second TRP. The wireless device may determine a gap between last symbol of resources of the one or more PUSCHs and first symbol of resources of the one or more second PUSCHs. The one or more first PUSCHs may be followed by the one or more second PUSCHs in a time domain. The wireless device may determine resources of the one or more second PUSCHs based on the gap. The wireless device may transmit the one or more first PUSCHs based on the first TCI state. The wireless device may transmit the one or more second PUSCHs, occurring after the gap, based on the second TCI state.

In an example, a wireless device may receive one or more radio resource control (RRC) messages. The one or more RRC messages may indicate/comprise a first invalid symbol pattern associated with a first transmission and reception point (TRP) and a second invalid symbol pattern associated with a second TRP. The wireless device may receive an uplink grant. The uplink grant may indicate one or more first PUSCHs based on a first transmission configuration indicator (TCI) state associated with the first TRP. The uplink grant may indicate one or more second PUSCHs based on a second TCI state associated with the second TRP. The uplink grant may indicate enabling to apply an invalid symbol pattern. The wireless device may determine one or more first actual PUSCHs of the one or more first PUSCHs based on the first invalid symbol pattern. The wireless device may determine one or more second actual PUSCHs of the one or more second PUSCHs based on the second invalid symbol pattern. The wireless device may transmit the one or more first actual PUSCHs based on the first TCI state. The wireless device may transmit the one or more second actual PUSCHs based on the second TCI state.

In an example, a wireless device may determine a first uplink signal of a first carrier overlapping in time with a second uplink signal of a second carrier. The first uplink signal may have a first priority. The first uplink signal may be associated with a first uplink TRP/panel. The second uplink signal may have a second priority. The second uplink signal may be associated with a second uplink TRP/panel. The wireless device may determine to drop the first uplink signal in response to one or more conditions being met and a capability of the wireless device to support simultaneous uplink transmissions associated with the first uplink TRP/panel and the second uplink TRP/panel in a time. Based on the determining, the wireless device may drop the first uplink signal. The wireless device may transmit the second uplink signal.

According to an example embodiment, the first uplink signal may be an actual physical uplink shared channel (PUSCH) of a plurality of PUSCHs of a PUSCH repetition. The wireless device may drop the plurality of PUSCHs in response to dropping the first uplink signal. According to an example embodiment, the first uplink signal may be a nominal PUSCH of a plurality of PUSCHs of a PUSCH repetition. The wireless device may drop one or more actual PUSCHs of the nominal PUSCH in response to dropping the first uplink signal. According to an example embodiment, the one or more conditions may comprise that the first priority is lower than the second priority. The one or more conditions may comprise that the first priority is equal to the second priority, and the second uplink signal comprise an uplink control information. The one or more conditions may comprise that the first priority is equal to the second priority, and a first cell index of the first cell is larger than a second cell index of the second cell.

According to an example embodiment, the one or more conditions may comprise that the second uplink signal comprises a hybrid automatic repeat request (HARQ) feedback. According to an example embodiment, the one or more conditions may comprise that the second uplink signal belongs to a plurality of PUSCHs of a PUSCH repetition.

In an example, a wireless device may receive a downlink control information (DCI). The DCI may comprise a first field indicating an index of a transmission configuration indicator (TCI) of one or more TCIs. The DCI may comprise a second field indicating an index of a sounding reference signal resource indicator (SRI) of one or more SRIs. The DCI may comprise a frequency domain resource assignment for a plurality of physical uplink shared channels (PUSCHs). In response to the TCI indicating a first TCI state and a second TCI state, determining to update a first UL TCI state based on the first TCI state and to update a second UL TCI state based on the second TCI state. In response to the SRI indicating a first SRI value and a second SRI value, the wireless device may transmit a first PUSCH of the plurality of PUSCHs based on the first TCI state and a second PUSCH of the plurality of PUSCHs based on the second TCI state.

According to an example embodiment, the first UL TCI may be a common uplink TCI state of a first transmission and reception point (TRP) or a first uplink panel. The second UL TCI may be a common uplink TCI state of a second TRP or a second uplink panel.

In an example, a wireless device may receive a first downlink control information (DCI). The first DCI may comprise a first field indicating an index of an uplink transmission configuration indicator (TCI) of one or more TCIs and a frequency domain resource assignment for a downlink data. In response to the receiving the first DCI, the wireless device may determine to update a first UL TCI state based on the uplink TCI comprising a first TCI state and to update a second UL TCI state based on the uplink TCI comprising a second TCI state. The wireless device may receive a second DCI. The second DCI may comprise a second field indicating an index of a sounding reference signal resource indicator (SRI) of one or more SRIs and a frequency domain resource assignment for a plurality of physical uplink shared channels (PUSCHs). In response to the SRI indicating a first SRI value and a second SRI value, the wireless device may transmit a first PUSCH of the plurality of PUSCHs based on the first TCI state and a second PUSCH of the plurality of PUSCHs based on the second TCI state.

ADDITIONAL EXAMPLES

An example method comprising: receiving, by a wireless device, one or more configuration parameters indicating a time gap for switching between different spatial domain filters for uplink repetitions; receiving downlink control information (DCI) scheduling repetitions of a transport block, wherein the DCI indicates: a first spatial domain filter for a first repetition of the repetitions; and a second spatial domain filter for a second repetition of the repetitions; and transmitting, with the second spatial domain filter, the second repetition starting from a starting symbol determined based on a last symbol of the first repetition and the time gap.

The above example method, wherein the first spatial domain filter is different from the second spatial domain filter.

One of the above-example methods, wherein the DCI further indicates a first starting symbol of the first repetition.

One of the above-example methods, further comprising transmitting, with the first spatial domain filter, the first repetition of the transport block based on the first starting symbol.

One of the above-example methods, further comprising transmitting one or more second configuration parameters indicating a minimum gap.

One of the above-example methods, wherein the minimum gap indicates at least one of: a panel activation latency; a timing advance adjustment; a power adjustment latency; or a power transient gap.

One of the above-example methods, wherein the time gap is a minimum gap between a last symbol of a first uplink transmission associated with a first transmission-and-reception point (TRP) and a starting symbol of a second uplink transmission associated with a second TRP.

One of the above-example methods, wherein: the first uplink transmission is the first repetition of the transport block; and the second uplink transmission is the second repetition of the transport block.

One of the above-example methods, wherein the repetitions of the transport block are Type B physical uplink shared channel (PUSCH) repetitions.

One of the above-example methods, wherein the repetitions of the transport block are Type A physical uplink shared channel (PUSCH) repetitions.

A non-transitory computer-readable medium comprising instructions that, when executed by one or more processors, cause the one or more processors to perform one or more of the above example methods.

An example wireless device comprising: one or more processors; and memory storing instructions that, when executed by the one or more processors, cause the wireless device to: receive one or more configuration parameters indicating a time gap for switching between different spatial domain filters for uplink repetitions; receive downlink control information (DCI) scheduling repetitions of a transport block, wherein the DCI indicates: a first spatial domain filter for a first repetition of the repetitions; and a second spatial domain filter for a second repetition of the repetitions; and transmit, with the second spatial domain filter, the second repetition starting from a starting symbol determined based on a last symbol of the first repetition and the time gap.

The above-example wireless device, wherein the first spatial domain filter is different from the second spatial domain filter.

The above-example wireless device, wherein the DCI further indicates a first starting symbol of the first repetition.

The above-example wireless device, wherein the memory further storing instructions that, when executed by the one or more processors, cause the wireless device to transmit, with the first spatial domain filter, the first repetition of the transport block based on the first starting symbol.

The above-example wireless device, wherein the memory further storing instructions that, when executed by the one or more processors, cause the wireless device to transmit one or more second configuration parameters indicating a minimum gap.

The above-example wireless device, wherein the minimum gap indicates at least one of: a panel activation latency; a timing advance adjustment; a power adjustment latency; or a power transient gap.

The above-example wireless device, wherein the time gap is a minimum gap between a last symbol of a first uplink transmission associated with a first transmission-and-reception point (TRP) and a starting symbol of a second uplink transmission associated with a second TRP.

The above-example wireless device, wherein: the first uplink transmission is the first repetition of the transport block; and the second uplink transmission is the second repetition of the transport block.

The above-example wireless device, wherein the repetitions of the transport block are Type B physical uplink shared channel (PUSCH) repetitions.

A system comprising: a base station comprising one or more first processors and first memory storing instructions that, when executed by the one or more first processors, cause the base station to: transmit one or more configuration parameters indicating a time gap for switching between different spatial domain filters for uplink repetitions; and transmit downlink control information (DCI) scheduling repetitions of a transport block, wherein the DCI indicates: a first spatial domain filter for a first repetition of the repetitions; and a second spatial domain filter for a second repetition of the repetitions; and a wireless device comprising one or more second processors and second memory storing instructions that, when executed by the one or more second processors, cause the wireless device to: receive the one or more configuration parameters and the DCI; and transmit, with the second spatial domain filter, the second repetition starting from a starting symbol determined based on a last symbol of the first repetition and the time gap.

What is claimed is:
1. A method comprising:
  receiving, by a wireless device, one or more configuration parameters indicating a time gap for switching between different spatial domain filters for uplink repetitions;
  receiving downlink control information (DCI) scheduling repetitions of a transport block, wherein the DCI indicates:
    a first spatial domain filter for a first repetition of the repetitions; and a second spatial domain filter for a second repetition of the repetitions; and transmitting, with the second spatial domain filter, the second repetition starting from a starting symbol determined based on a last symbol of the first repetition and the time gap.

2. The method of claim 1, wherein the first spatial domain filter is different from the second spatial domain filter.

3. The method of claim 1, wherein the DCI further indicates a first starting symbol of the first repetition.

4. The method of claim 3, further comprising transmitting, with the first spatial domain filter, the first repetition of the transport block based on the first starting symbol.

5. The method of claim 1, further comprising transmitting one or more second configuration parameters indicating a minimum gap.

6. The method of claim 5, wherein the minimum gap indicates at least one of:
a panel activation latency;
a timing advance adjustment;
a power adjustment latency; or
a power transient gap.

7. The method of claim 1, wherein the time gap is a minimum gap between a last symbol of a first uplink transmission associated with a first transmission-and-reception point (TRP) and a starting symbol of a second uplink transmission associated with a second TRP.

8. The method of claim 7, wherein:
the first uplink transmission is the first repetition of the transport block; and
the second uplink transmission is the second repetition of the transport block.

9. The method of claim 1, wherein the repetitions of the transport block are Type B physical uplink shared channel (PUSCH) repetitions.

10. The method of claim 1, wherein the repetitions of the transport block are Type A physical uplink shared channel (PUSCH) repetitions.

11. A wireless device comprising:
one or more processors; and
memory storing instructions that, when executed by the one or more processors, cause the wireless device to:
receive one or more configuration parameters indicating a time gap for switching between different spatial domain filters for uplink repetitions;
receive downlink control information (DCI) scheduling repetitions of a transport block, wherein the DCI indicates:
a first spatial domain filter for a first repetition of the repetitions; and
a second spatial domain filter for a second repetition of the repetitions; and
transmit, with the second spatial domain filter, the second repetition starting from a starting symbol determined based on a last symbol of the first repetition and the time gap.

12. The wireless device of claim 11, wherein the first spatial domain filter is different from the second spatial domain filter.

13. The wireless device of claim 11, wherein the DCI further indicates a first starting symbol of the first repetition.

14. The wireless device of claim 13, wherein the memory further storing instructions that, when executed by the one or more processors, cause the wireless device to transmit, with the first spatial domain filter, the first repetition of the transport block based on the first starting symbol.

15. The wireless device of claim 11, wherein the memory further storing instructions that, when executed by the one or more processors, cause the wireless device to transmit one or more second configuration parameters indicating a minimum gap.

16. The wireless device of claim 15, wherein the minimum gap indicates at least one of:
a panel activation latency;
a timing advance adjustment;
a power adjustment latency; or
a power transient gap.

17. The wireless device of claim 11, wherein the time gap is a minimum gap between a last symbol of a first uplink transmission associated with a first transmission-and-reception point (TRP) and a starting symbol of a second uplink transmission associated with a second TRP.

18. The wireless device of claim 17, wherein:
the first uplink transmission is the first repetition of the transport block; and
the second uplink transmission is the second repetition of the transport block.

19. The wireless device of claim 11, wherein the repetitions of the transport block are Type B physical uplink shared channel (PUSCH) repetitions.

20. A system comprising:
a base station comprising one or more first processors and first memory storing instructions that, when executed by the one or more first processors, cause the base station to:
transmit one or more configuration parameters indicating a time gap for switching between different spatial domain filters for uplink repetitions; and
transmit downlink control information (DCI) scheduling repetitions of a transport block, wherein the DCI indicates:
a first spatial domain filter for a first repetition of the repetitions; and
a second spatial domain filter for a second repetition of the repetitions; and
a wireless device comprising one or more second processors and second memory storing instructions that, when executed by the one or more second processors, cause the wireless device to:
receive the one or more configuration parameters and the DCI; and
transmit, with the second spatial domain filter, the second repetition starting from a starting symbol determined based on a last symbol of the first repetition and the time gap.

* * * * *